(12) United States Patent
Park et al.

(10) Patent No.: US 8,483,410 B2
(45) Date of Patent: Jul. 9, 2013

(54) APPARATUS AND METHOD FOR INPUTTING A COMMAND, METHOD FOR DISPLAYING USER INTERFACE OF MEDIA SIGNAL, AND APPARATUS FOR IMPLEMENTING THE SAME, APPARATUS FOR PROCESSING MIX SIGNAL AND METHOD THEREOF

(75) Inventors: Sung Ho Park, Seoul (KR); Kyeong Su Im, Seoul (KR)

(73) Assignee: LG Electronics Inc., Seoul (KR)

(*) Notice: Subject to any disclaimer, the term of this patent is extended or adjusted under 35 U.S.C. 154(b) by 678 days.

(21) Appl. No.: 12/312,929

(22) PCT Filed: Dec. 3, 2007

(86) PCT No.: PCT/KR2007/006198
§ 371 (c)(1),
(2), (4) Date: Aug. 28, 2009

(87) PCT Pub. No.: WO2008/066364
PCT Pub. Date: Jun. 5, 2008

(65) Prior Publication Data
US 2010/0014693 A1    Jan. 21, 2010

Related U.S. Application Data

(60) Provisional application No. 60/868,307, filed on Dec. 1, 2006, provisional application No. 60/868,308, filed on Dec. 1, 2006.

(30) Foreign Application Priority Data

Jun. 26, 2007 (KR) .......... 10-2007-0063206
Jun. 26, 2007 (KR) .......... 10-2007-0063303
Jun. 26, 2007 (KR) .......... 10-2007-0063304

(51) Int. Cl.
*H04B 1/00* (2006.01)

(52) U.S. Cl.
USPC ............ 381/119; 381/333; 715/716

(58) Field of Classification Search
USPC .............. 381/119, 333, 388; 715/716; 700/94
See application file for complete search history.

(56) References Cited

U.S. PATENT DOCUMENTS 5,212,733 A     5/1993  DeVitt et al.
5,852,800 A *  12/1998  Modeste et al. .......... 704/270.1
(Continued)

FOREIGN PATENT DOCUMENTS
EP         1 691 348 A1      8/2006
(Continued)

OTHER PUBLICATIONS

Barry D., et al., "Sound Source Separation: Azimuth Discrimination and Resynthesis" Process of the 7$^{th}$ Int. Conference on Digital Audio Effects (DAFX-04), Naples, Italy, Oct. 2004, pp. 1-5.

*Primary Examiner* — Vivian Chin
*Assistant Examiner* — Con P Tran
(74) *Attorney, Agent, or Firm* — Birch, Stewart, Kolasch & Birch, LLP

(57) ABSTRACT

An apparatus for inputting commands required for controlling a mix signal and method thereof are disclosed. The present invention includes an input unit, a control unit converting an input signal received via the input unit to a per-source menu display command, the control unit controlling a per-source menu display image to be outputted based on a source information corresponding to a mix signal in accordance with the per-source menu display command, and a display for outputting the per-source menu display. Accordingly, a volume level is adjusted per a source signal included in such a mix signal as a video signal, an audio signal, and the like or an ambience (relative position) is adjusted. And, a user is always able to confirm information on a source signal (or object signal) associated with a mix signal (or synthetic object signal).

8 Claims, 49 Drawing Sheets

U.S. PATENT DOCUMENTS

| | | |
|---|---|---|
| 5,943,427 A | 8/1999 | Massie et al. |
| 6,288,319 B1 | 9/2001 | Catona |
| 6,879,952 B2 | 4/2005 | Acero et al. |
| 7,774,707 B2 * | 8/2010 | Sim et al. .................. 715/727 |
| 2002/0008780 A1 | 1/2002 | Han |
| 2003/0091204 A1 * | 5/2003 | Gibson ..................... 381/119 |
| 2004/0013277 A1 * | 1/2004 | Crocitti et al. ............. 381/109 |
| 2004/0102955 A1 | 5/2004 | Choi et al. |
| 2004/0111171 A1 | 6/2004 | Jang et al. |
| 2004/0148157 A1 | 7/2004 | Horn et al. |
| 2005/0036628 A1 * | 2/2005 | Devito ....................... 381/61 |

FOREIGN PATENT DOCUMENTS

| | | |
|---|---|---|
| JP | 2001-298680 A | 10/2001 |
| JP | 2004-29720 A | 1/2004 |
| JP | 2007/094439 A | 4/2007 |
| KR | 1999-0030985 A | 5/1999 |
| KR | 2001-0018186 A | 3/2001 |
| KR | 10-2004-0037437 A | 5/2004 |
| KR | 10-2004-0046281 A | 6/2004 |
| KR | 10-2004-0051324 A | 6/2004 |
| KR | 10-2004-0087561 A | 10/2004 |
| KR | 10-2005-0111701 A | 11/2005 |
| KR | 10-2005-0118495 A | 12/2005 |
| KR | 10-2006-0005833 A | 1/2006 |
| KR | 10-2006-0066812 A | 6/2006 |

* cited by examiner

| 1. Voice  | [====·········      +] |
| 2. Piano  | [====············   +] |
| 3. Violin | [====············   +] |
| 4. Flute  | [====········       +] |

To adjust level (volume) of each source,
move cursor to corresponding source and
then use direction key (Navi. Key) or
pointing device (touch-pen).

Voice Mute!

Voice in mix signal muted.
To cancel voice mute,
press Voice Mute key.

Voice Volume up!

Level of voice (volume level) in mix signal
adjusted high. To re-adjust level of voice,
press Voice Volume key.

user position

Ambience Adjust Image
Adjust ambience
(relative position per source)
by moving source icon.

Piano Mute!

Piano sound in mix signal is muted.
To cancel Piano Mute,
press Piano Mute key again.

Violin Mute!

Violin sound in mix signal is muted.
To cancel Violin Mute,
press Violin Mute key again.

FIG. 23

Shortcut Key Registration Selected.

– First of all, select a key to set to shortcut key.

– Select source from the following.
    o Voice
    o Piano
    o Violin
    o Flute – Select function to set.
    o Sound mute
    o Ambience adjustment "Music Title: 'Elaborate Lives' of opera 'Aida' " selected.
Instruments of the music correspond to icons
displayed on screen. To control each instrument,
click icon on screen.

"Music Title: 'Elaborate Lives' of opera 'Aida' " selected.
Instruments of the music correspond to icons
displayed on screen. To control each instrument,
click icon on screen.

'Flute' in "Music Title: 'Elaborate Lives' of opera 'Aida' " selected. To adjust level (volume) of selected instrument, move control bar on screen or press volume key.

Level (volume) of 'Flute' in "Music Title: 'Elaborate Lives' of opera 'Aida' " is adjusted high.

'Piano' in "Music Title: 'Elaborate Lives' of opera 'Aida'" selected. To adjust equalizer of selected instrument, move control bar on screen.

'Piano' in "Music Title: 'Elaborate Lives' of opera 'Aida'" selected. To adjust ambience (virtual position) of selected instrument, move icon on screen.

APPARATUS AND METHOD FOR INPUTTING A COMMAND, METHOD FOR DISPLAYING USER INTERFACE OF MEDIA SIGNAL, AND APPARATUS FOR IMPLEMENTING THE SAME, APPARATUS FOR PROCESSING MIX SIGNAL AND METHOD THEREOF

This application is the National Phase of PCT/KR2007/006198 filed on Dec. 3, 2007, which claims priority under 35 U.S.C. 119(e) to U.S. Provisional Application Nos. 60/868,307 filed on Dec. 1, 2006, and 60/868,308 filed on Dec. 1, 2006, and under 35 U.S.C. 119(a) to Patent Application Nos. 10-2007-0063206, 10-2007-0063303 and 10-2007-0063304 all filed in the Republic of Korea on Jun. 26, 2007, respectively. All of which are hereby expressly incorporated by reference into the present application.

TECHNICAL FIELD

The present invention relates to an input apparatus and method thereof, and more particularly, to an apparatus for inputting commands required for controlling a mix signal and method thereof. The present invention relates to an apparatus for displaying an interface of a mix signal and method thereof. Although the present invention is suitable for a wide scope of applications, it is particularly suitable for providing a user with an interface for a mix signal such as an audio signal, a video signal and the like. And, the present invention relates to an apparatus for processing a mix signal and method thereof.

BACKGROUND ART

Generally, stereo signals are generated and used most frequently and widely by consumers. Recently, multi-channel signals tend to be popularly used. Yet, limitation is put on mix signals which are processed not by a source signal unit but by a channel signal unit. So, in case of processing a mix signal by a channel signal unit, it is unable to independently process a specific source signal configuring the mix signal. For instance, it is impossible to raise a volume of background music only while a volume for actors' voices is maintained uniform in viewing a movie.

Moreover, in order to independently process and remix a mix signal (or synthetic object signal) per a source, i.e., per a specific source signal, a user has to raise or lower a volume level per a source signal (or mute a sound by setting a level to zero) or adjust a relative position of a source signal.

DISCLOSURE OF THE INVENTION

Technical Problem

However, a remote controller according to a related art is just able to adjust an overall volume level of a mix signal but unable to adjust volume levels of source signals included in a mix signal or an ambience thereof.

Moreover, in order to remix a mix signal (or synthetic object signal) per a source, i.e., per a source signal, a user has to know what kind of source signals are included in a corresponding mix signal. For instance, in case that a mix signal includes a music file, a user has to know whether source signals associated with the music file correspond to piano, violin, flute, and the like. Yet, in the related art, information on a mix signal (or synthetic object signal) is displayed only. So, there occurs a problem that information indicating what is the information of source signals associated with the mix signal is not displayed.

Technical Solution

Accordingly, the present invention is directed to an apparatus for inputting commands required for controlling a mix signal and method thereof, an apparatus for displaying an interface of a mix signal and method thereof, and an apparatus for processing a mix signal and method thereof that substantially obviate one or more of the problems due to limitations and disadvantages of the related art.

An object of the present invention is to provide an inputting apparatus and method thereof, by which a volume level can be adjusted per a source signal included in such a mix signal as a video signal, an audio signal, and the like or by which an ambience (relative position) can be adjusted.

Another object of the present invention is to provide an apparatus for displaying an interface of a mix signal and method thereof, by which information on a source signal (or object signal) associated with a mix signal (or synthetic object signal) can be displayed to enable a user to check the information all the time.

Another object of the present invention is to provide an apparatus for displaying an interface of a mix signal and method thereof, by which information on a source signal (or object signal) associated with a mix signal (or synthetic object signal) can be provided via a graphic user interface (GUI).

Another object of the present invention is to provide an apparatus for displaying an interface of a mix signal and method thereof, by which an image representing a source signal associated with a mix signal (or synthetic object signal) can be displayed by being diversely varied per a time in the course of reproducing such a mix signal (or synthetic object signal) as an audio signal, a video signal, and the like.

Another object of the present invention is to provide a method of generating side information per a source signal using a signal similar to a source signal in case that the source signal included in a mix signal fails to exist separately.

Another object of the present invention is to provide a method of generating side information in a decoder using a mix signal and method thereof, in which the side information is used to remix the mix signal.

Another object of the present invention is to provide an apparatus for replacing a specific source signal included in a mix signal by a source signal provided by a user and a method thereof.

Another object of the present invention is to provide an apparatus for processing a signal and method thereof, by which a user is able to modify a mix signal using a source signal.

Another object of the present invention is to provide an apparatus for processing a signal and method thereof, by which a user is able to control a mix signal by a source signal unit.

Another object of the present invention is to provide an apparatus for processing a signal and method thereof, by which a user is able to receive specific remix information transmitted by a remix information providing server.

Another object of the present invention is to provide an apparatus for processing a signal and method thereof, by which remix information generated by a user can be uploaded to a remix information providing server.

A further object of the present invention is to provide an apparatus for processing a signal and method thereof, by which a mix signal having a partial source signal excluded therefrom can be received or generated.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, an inputting apparatus according to the present invention includes an input unit, a control unit converting an input signal received via the input unit to a per-source menu display command, the control unit controlling a per-source menu display image to be outputted based on a source information corresponding to a mix signal in accordance with the per-source menu display command, and a display for outputting the per-source menu display.

Preferably, the inputting apparatus further includes a pointing device and the control unit converts the input signal received via the pointing device to a per-source level adjust command.

Preferably, the inputting apparatus further includes a direction key and the control unit converts the input signal received via the direction key to a per-source level adjust command.

To further achieve these and other advantages and in accordance with the purpose of the present invention, an inputting apparatus according to the present invention includes an input unit, a control unit converting an input signal received via the input unit to a per-source menu display command, and a wireless communication unit transmitting the command converted by the control unit to an external device.

Preferably, the wireless communication unit receives data about a per-source menu image from the external device and may further include a display for displaying the per-source menu image.

To further achieve these and other advantages and in accordance with the purpose of the present invention, an inputting apparatus according to the present invention includes an input unit and a control unit converting an input signal received via the input unit to a voice mute command or a voice level adjust command, the control unit outputting a control information on a mix signal based on the voice mute command or the voice level adjust command.

To further achieve these and other advantages and in accordance with the purpose of the present invention, an inputting apparatus according to the present invention includes an input unit, a control unit converting an input signal received via the input unit to an ambience image display command, the control unit controlling an ambience image to be outputted based on a source information corresponding to a mix signal in accordance with the ambience image display command, and a display to which the ambience image is outputted.

Preferably, the inputting apparatus further includes a pointing device or a direction key and the control unit converts the input signal received via the pointing device or the direction key to an ambience adjust command and then outputs a control information on the mix signal based on the ambience adjust command.

To further achieve these and other advantages and in accordance with the purpose of the present invention, an inputting apparatus according to the present invention includes an input unit, a control unit converting an input signal received via the input unit to a source sound mute command, the control unit outputting a control information on a mix signal based on the source sound mute command, wherein the source sound mute command enables a specific source signal included in the mix signal not to be played back.

To further achieve these and other advantages and in accordance with the purpose of the present invention, an inputting method according to the present invention includes receiving a shortcut key register command, selecting one of a plurality of keys, one of a plurality of sources, and one of at least one or more functions, and storing by matching the selected function for the selected source to the selected key, wherein a plurality of the sources comprise at least one of a source of an audio signal and a source of a video signal and wherein the at least one function comprises at least one of a sound mute, an ambience adjustment, and a level adjustment.

Preferably, in the selecting, one of a plurality of numeral keys is selected.

To further achieve these and other advantages and in accordance with the purpose of the present invention, an inputting apparatus according to the present invention includes an input unit for selecting one of a plurality of keys, one of a plurality of sources, and one of at least one or more functions, a memory unit storing a command information for each of a plurality of the keys, and a control unit matching the selected function for the selected source to the selected key, the control unit storing a result of the matching in the memory unit, wherein a plurality of the sources comprise at least one of an object of an audio signal and an object of a video signal and wherein the at least one function comprises at least one of a sound mute, an ambience adjustment, and a level adjustment.

To further achieve these and other advantages and in accordance with the purpose of the present invention, a method of displaying an interface of a mix signal according to the present invention includes having a specific mix signal selected and displaying a list of a source signal by inquiring an information on the source signal corresponding to the mix signal, wherein the displaying is maintained while the mix signal is selected.

Preferably, the information on the source signal may be extracted from a side information corresponding to the mix signal.

Preferably, the list of the source signal may include at least one of a musical instrument name, a singer name and a character of the source signal included in the mix signal.

Preferably, the method may further include having a single source selected from the list of the source signal and further displaying metadata for the selected source.

More preferably, the metadata is extracted from a side information corresponding to the mix signal and may include at least one of a musical instrument player name and a manufacturing data of the source signal.

Preferably, the method may further include having a single source selected from the list of the source signal and further displaying a volume level adjust image for the selected source.

Preferably, the method may further include having a single source selected from the list of the source signal and displaying an equalizer adjust image for the selected source.

Preferably, the method may further include having a single source selected from the list of the source signal and displaying an ambience adjust image for the selected source.

To further achieve these and other advantages and in accordance with the purpose of the present invention, an apparatus for displaying an interface of a mix signal according to the present invention includes an input unit for selecting one of a plurality of mix signals, a control unit displaying a list of a source signal by inquiring an information on the source signal corresponding to the mix signal, and a display for displaying the list of the source signal, wherein the displaying is maintained while the mix signal is selected.

Preferably, the apparatus further includes a second display, the input unit is to select a single source from the list of the source signal, and the control unit displays at least one of metadata, a volume level adjust image, an equalizer adjust image and an ambience adjust image for the selected source on the second display.

Preferably, the display may display the list of the source signal by a presence or non-presence of flickering of a plurality of light emitting devices.

More preferably, the display and the second display can be constructed with a single panel.

To further achieve these and other advantages and in accordance with the purpose of the present invention, a method of displaying an interface of a mix signal according to the present invention includes having a specific mix signal selected and displaying an icon corresponding to a source signal based on an information on the source signal by inquiring the information on the source signal corresponding to the mix signal.

Preferably, the information on the source signal is extracted from a side information corresponding to the mix signal.

Preferably, the method may further include extracting metadata corresponding to the mix signal. And, the icon may include an image matching the metadata.

More preferably, the metadata is extracted from a side information corresponding to the mix signal and may include at least one of an instrument player name and a vocalist name of the source signal.

Preferably, the method may further include, if an execution command for one of the icons is received, displaying a level adjust image of the source signal corresponding to the selected icon.

Preferably, the method may further include, if a command for a level adjustment is received, varying a shape of the selected icon in accordance with an adjusted level. And, the shape of the selected icon may include at least one of a size, a color, a brightness, and a position within the image.

Preferably, the method may further include, if one of the icons is selected, displaying an equalizer image of the source signal corresponding to the selected icon.

More preferably, the method may further include, if a command for a per-subband level adjustment is received, remixing the mix signal by adjusting a subband level of the source signal corresponding to the selected icon.

Preferably, the method may further include, if one of the icons is selected, displaying an ambience adjust image of the source signal corresponding to the selected icon. And, the ambience adjust image displays a per-source signal relative position.

Preferably, the method may further include, if a command for an ambience adjustment is received, varying a shape of the selected icon. And, the shape of the icon may include at least one of a size, a color, and a brightness.

Preferably, the method may further include, if a signal about a command for an ambience adjustment is received, remixing the mix signal by adjusting a relative position of the source signal corresponding to the selected icon. And, the relative position can be determined in accordance with a position of another source position and a virtual user position.

To further achieve these and other advantages and in accordance with the purpose of the present invention, an apparatus for displaying an interface of a mix signal according to the present invention includes an input unit for selecting one of a plurality of mix signals, a control unit displaying an icon corresponding to a source signal based on an information on the source signal corresponding to the mix signal selected by the input unit, and a display unit for displaying the icon corresponding to the source signal.

Preferably, the apparatus may further include a memory unit storing per-icon image data. And, the icon may include image data stored in the memory unit.

To further achieve these and other advantages and in accordance with the purpose of the present invention, a method of displaying an interface of a mix signal according to the present invention includes receiving a playback command for the mix signal and if a level of a source signal corresponding to the mix signal varies per a time, displaying a shape of an image of the source signal by varying the shape per the time, wherein the shape of the image includes at least one of a size, a color, a brightness, and a position within the image.

Preferably, the level of the source signal includes a per-subband level of the source signal. And, the displaying may include varying the shape of the image of the source signal in part.

Preferably, the displaying includes setting a size of the image of the source signal except the source signal having a highest level at a specific timing point to zero.

Preferably, the image may match metadata corresponding to the mix signal.

To further achieve these and other advantages and in accordance with the purpose of the present invention, an apparatus for displaying an interface of a mix signal according to the present invention includes an input unit for inputting a playback command for the mix signal, a control unit, if a level of a source signal corresponding to the mix signal varies per a time, the control unit controlling a shape of an image of the source signal to be displayed by varying the shape per the time, and a display unit for displaying the image corresponding to the source signal, wherein the shape of the image comprises at least one of a size, a color, a brightness, and a position within the image.

To further achieve these and other advantages and in accordance with the purpose of the present invention, a method of processing a signal, which is carried out by a remix information providing server connected to a user terminal via a communication network, according to the present invention includes having a remix information requested by the user terminal and transmitting the requested remix information to the user terminal, wherein the remix information comprises at least one of a mix signal, a source signal included in the mix signal, a mix parameter for controlling the mix signal per the source signal, an up-mix signal for upmixing the mix signal, and an icon or emoticon for representing the source signal.

Preferably, the remix information includes a modified mix signal generated from excluding a partial source signal from the source signal included in the mix signal.

More preferably, if a request for a transmission of the modified mix signal is made by the user terminal, the method further includes enabling a user to select a source signal to be excluded from the mix signal and generating the modified mix signal from which the selected source signal is excluded, wherein in the transmitting, the modified mix signal is transmitted to the user terminal.

Preferably, the transmitting includes transmitting the remix information to the user terminal if a payment for the remix information is made.

More preferably, the remix information providing server is connected to a banking organ or a mobile communication service provider via the communication network and the payment is made in a manner of making a request for user terminal authentication information to the user terminal, requesting an authentication by transmitting the authentication information inputted by the user terminal to the banking organ or the mobile communication service provider, and if the user terminal authentication is completed, requesting the payment by transmitting a payment information to the banking organ or the mobile communication service provider.

To further achieve these and other advantages and in accordance with the purpose of the present invention, a method of processing a signal, which is carried out by a user terminal connected to a remix information providing server via a communication network, according to the present invention includes making a request for a remix information by accessing the remix information providing server, transmitting a payment information requested by the remix information providing server to the remix information providing server, and if a payment if made, receiving the remix information from the remix information providing server, wherein the remix information comprises at least one of a mix signal, a source signal included in the mix signal, a mix parameter for controlling the mix signal per the source signal, an up-mix signal for upmixing the mix signal, and an icon or emoticon for representing the source signal.

To further achieve these and other advantages and in accordance with the purpose of the present invention, a remix information providing server, which is connected to a user terminal via a communication network, according to the present invention includes a transceiving unit having a remix information requested by the user terminal, the transceiving unit transmitting the requested remix information to the user terminal, a database unit extracting the requested remix information in response to a request made by the user terminal, a payment processing unit, if a use of the remix information is charged for, the payment processing unit processing a payment for the use of the remix information, and a control unit controlling the remix information requested by the user terminal to be transmitted to the user terminal, wherein the remix information comprises at least one of a mix signal, a source signal included in the mix signal, a mix parameter for controlling the mix signal per the source signal, an up-mix signal for upmixing the mix signal, and an icon or emoticon for representing the source signal.

To further achieve these and other advantages and in accordance with the purpose of the present invention, a user terminal, which is connected to a remix information providing server via a communication network, according to the present invention includes a communication unit making a request for a remix information to the remix information providing server, the communication unit receiving the requested remix information, a user interface for receiving a control information, a remix rendering unit remixing a source signal included in a mix signal using the remix information and the control information, and a control unit controlling the source signal included in the mix signal to be remixed by controlling the user terminal overall, wherein the remix information comprises at least one of a mix signal, a source signal included in the mix signal, a mix parameter for controlling the mix signal per the source signal, an up-mix signal for upmixing the mix signal, and an icon or emoticon for representing the source signal.

It is to be understood that both the foregoing general description and the following detailed description are exemplary and explanatory and are intended to provide further explanation of the invention as claimed.

Advantageous Effects

According to one embodiment of the present invention, a volume level can be adjusted per a source signal included in such a mix signal as a video signal, an audio signal, and the like or an ambience can be adjusted. Hence, a user is facilitated to remix a mix signal.

According to another embodiment of the present invention, it is able to eliminate a human voice from sources included in a mix signal only or adjust a volume level of the voice only. Hence, a user is able to listen to the accompaniment of music only by simply eliminating a singer's voice using an input device (remote controller) in the course of playing back a music file.

According to another embodiment of the present invention, after a user has registered a source frequently remixed by a user as a shortcut key in a specific key (e.g., numeral key #1), when the user adjusts a level per a source or an ambience using the shortcut key, the user is facilitated to perform remixing using an input device (e.g., remote controller) set suitable for user's taste.

According to another embodiment of the present invention, since information on a source signal (or object signal) associated with a mix signal (or synthetic object signal) keeps being displayed on a screen, a user is able to check what kind of sources are included in the mix signal in the course of reproducing or remixing the mix signal.

According to another embodiment of the present invention, since a user is always able to check what kind of sources (per instrument audio signal, etc.) are included in the mix signal in the course of reproducing or remixing the mix signal, it is unnecessary to perform a procedure for confirming what kind of sources are included in the mix signal prior to adjusting a level per a source or an ambience.

According to another embodiment of the present invention, since information on a source signal (or object signal) associated with a mix signal (or synthetic object signal) keeps being displayed on a screen, a user is able to check what kind of sources are included in the mix signal in the course of reproducing or remixing the mix signal.

According to another embodiment of the present invention, since a user is always able to check what kind of sources (per instrument audio signal, etc.) are included in the mix signal in the course of reproducing or remixing the mix signal, it is unnecessary to perform a procedure for confirming what kind of sources are included in a corresponding mix signal prior to adjusting a level per a source or an ambience.

And, in a signal processing method according to the present invention, a user receives to use remix information transferred from a remix information providing server.

Moreover, in a signal processing method and apparatus according to the present invention, a modified mix signal having a specific source signal excluded therefrom is provided and used.

Besides, in a signal processing method according to the present invention, a user generates or modifies remix information and is then able to upload the corresponding remix information to a remix information providing server.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 23 is an exemplary diagram of an image displayed after a shortcut key register command has been inputted;

BEST MODE

Mode for Invention

Reference will now be made in detail to the preferred embodiments of the present invention, examples of which are illustrated in the accompanying drawings.

First of all, in this disclosure, a terminology 'input unit' or 'key' is understood as a means for inputting a specific input signal and is not limited to an input system such as a button key, a touch sensor, and the like only.

A mix signal of the present invention includes an audio signal, a video signal, and the like and is also understood as including a synthetic object signal.

The present invention provides algorithm capable of processing a mix signal by a source (object) signal unit. In case of processing a mix signal by a source signal unit, it is able to generate considerably various effects. For instance, it is possible for a user to raise a volume of background music only by maintaining a volume for actor/actress voice at a fixed level while viewing a movie. In the present invention, a source signal includes at least one source (e.g., piano) configuring a mix signal. And, processing by a source signal unit means that characteristics (e.g., localization, gain, etc.) associated with a specific source signal configuring a mix signal can be 'individually' amended in processing the mix signal. The 'individually' means that amendment of a characteristic associated with a specific source does not affect characteristics of other source signals or has hardly perceptible influence on characteristics of other source signals. For clarity and convenience of description, a stereo signal will be taken as an example. And, it is understood that the present invention is not limited to the stereo signal only. In the present invention, a small size of side information is transferred as well as a format (e.g., PCM, MP3, MPEG-AAC) of a general mix signal. Hence, it is able to generate a remix signal using the mix signal and the side information.

Figure 1:
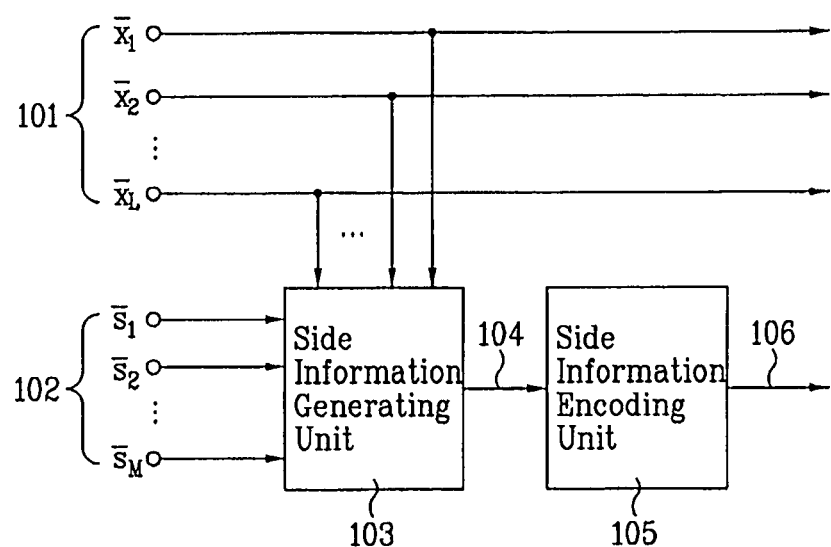
FIG. 1 is a block diagram of a first signal processing apparatus according to one embodiment of the present invention.

FIG. 1 is a block diagram of a first signal processing apparatus according to one embodiment of the present invention.

Referring to FIG. 1, a first signal processing apparatus includes a side information generating unit 103 and a side information encoding unit 105.

The side information generating unit 103 generates side information 104 using a general mix signal 101 and a source signal 102 configuring the mix signal.

The mix signal 101 can include a mono, stereo or multi-channel audio signal.

The source signal 102 can include a portion or whole part of source signals configuring the mix signal 101.

And, the side information 104 means information used in processing the mix signal by a source signal unit. The side information 104 includes a mix parameter for remixing the mix signal. The mix parameter includes an encoder mix parameter generated by an encoder using a source signal and may selectively include a blind mix parameter generated using a mix signal only. A gain value for each source signal, a subband power, and the like can be examples of the mix parameter. A specific definition and generation method for the side information 104 will be described in FIG. 2.

The present invention includes a method of generating the side information 104 using the source signal 102 configuring the mix signal only.

And, the side information encoding unit 105 generates an encoded side information signal 106 by encoding the generated side information 104. The mix signal 101 and the side information signal 106 are transferred to a decoding device.

Figure 2:
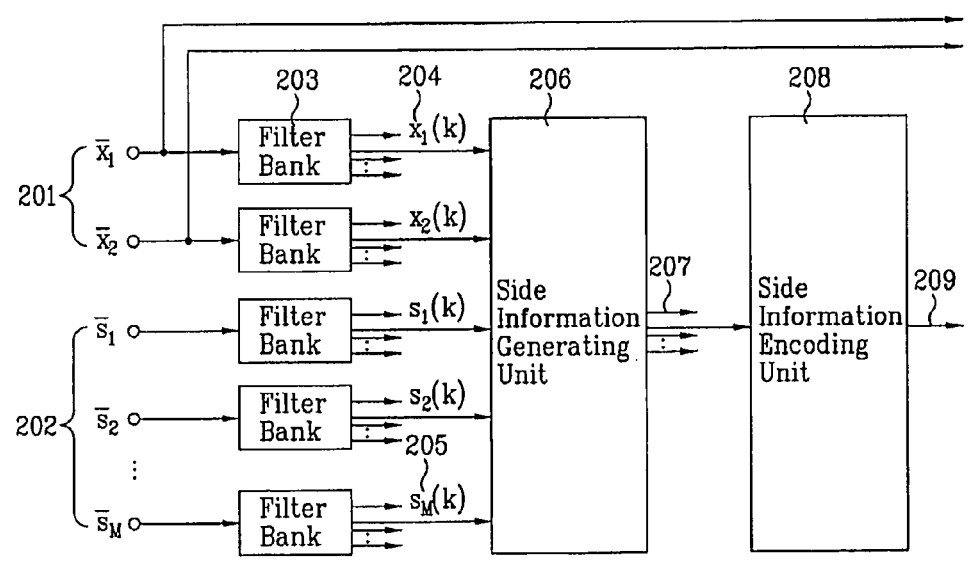
FIG. 2 is a detailed block diagram of the first signal processing apparatus shown in FIG. 1 in case of using a stereo signal.

FIG. 2 is a detailed block diagram of the first signal processing apparatus shown in FIG. 1 in case of using a stereo signal. As mentioned in the foregoing description, a mix signal used by the present invention can include a mono, stereo or multi-channel audio signal. For clarity and convenience, a stereo signal 201 is taken as an example.

The stereo signal 201 $\bar{x}_1(n)$ and $\bar{x}_2(n)$ can be represented as a sum of source signals constructing the stereo signal, where 'n' indicates a time index. Hence, the stereo signal 201 can be represented as Formula 1.

$$\bar{x}_1(n) = \sum_{i=1}^{I} a_i \tilde{s}_i(n)$$

$$\bar{x}_2(n) = \sum_{i=1}^{I} b_i \tilde{s}_i(n),$$

[Formula 1]

In this case, 'I' indicates the number of source signals included in the stereo signal and '$\tilde{s}_i(n)$' indicates a source signal. And, '$a_i$' and '$b_i$' are values for determining an amplitude panning and a gain for each source signal, respectively. Each $\tilde{s}_i(n)$ is independent. Every $\tilde{s}_i(n)$ can be a pure source signal or can include a pure source signal to which little reverberation and sound effect signal components are added. For instance, a specific reverberation signal component can be represented a two source signal, i.e., a signal mixed to a left channel and a signal mixed to a right channel.

The object of the present invention is to modify a stereo signal including source signals in order to remix M source signals ($0 \leq M \leq I$). The source signals can be remixed into a stereo signal with different gain factors. A remix signal can be represented as Formula 2.

$$\tilde{y}_1(n) = \sum_{i=1}^{M} c_i \tilde{s}_i(n) + \sum_{i=M+1}^{I} a_i \tilde{s}_i(n)$$

$$\tilde{y}_2(n) = \sum_{i=1}^{M} d_i \tilde{s}_i(n) + \sum_{i=M+1}^{I} b_i \tilde{s}_i(n),$$

[Formula 2]

In Formula 2, '$c_i$' and '$d_i$' are new gain factors for M source signals to be remixed. The '$c_i$' and '$d_i$' can be provided by a decoder end. In this case, a side information generating unit 206 is able to generate side information 207 using the stereo signal 201 and M source signals 202.

As mentioned in the foregoing description, the object of the present invention is to remix a general stereo signal by a source signal unit if the general stereo signal and small side information are given.

It is not possible to perfectly generate a remix signal represented as Formula 2 from a mix signal represented as Formula 1 using a very small quantity of side information.

So, without accessing each source signal $\tilde{s}_i(n)$, in case that a general mix signal represented as Formula 1 is given, the object of the present invention is to perceptually imitate a remix signal represented as Formula 2.

Referring to FIG. 2, a general stereo signal 201 and M source signals 202 included in the stereo signal 201 are inputted to a first signal processing apparatus. The stereo signal 201 is delayed to be synchronized with side information and is then directly usable as an output signal.

In order to generate side information, the stereo signal 201 and the source signals 202 are decomposed into signals per subband 204 and 205 in time-frequency domain through filter banks 203. In particular, the stereo signal 201 and the source signals 202 are processed in the time-frequency domain. And, the time-frequency domain will be explained later.

The signal per subband 204 is similarly processed on a center frequency of each subband. A subband pair 204 of the stereo signal 201 on a specific frequency is represented as $x_1(k)$ and $x_2(k)$. In this case, 'k' is a time index of each subband signal. Similarly, the subband signals 205 of the M source signals 202 are represented as $S_1(k), S_2(k), \ldots, S_M(k)$. For clarity, a subband (frequency) index is not used.

If the subband signals 205 of the source signals 202 are given, a side information generating unit 206 generates a short-time subband power per subband $E\{s_i^2(k)\}$.

And, the side information generating unit 206 generates gain factors $a_i$ and $b_i$ per a subband using the subband pair 204 of the stereo signal 201. The gain factors $a_i$ and $b_i$ can be directly given from outside. Side information per subband 207 is generated using the short-time subband power per subband and the gain factors per subband.

The side information generating unit 206 can generate different information associated with the stereo signal as the side information 207 as well as the short-time subband power and the gain factors.

And, a side information encoding unit 208 generates an encoded side information signal 209 using the side information per subband 207.

For a number of stereo signals 201, gain factors $a_i$ and $b_i$ shall be fixed. If the gain factors $a_i$ and $b_i$ are variable in accordance with a time k, the gain factors will be generated as a function of time. Instead of being directly quantized and coded, the gain factors can be transformed into different values more suitable for quantization and coding.

And, $E\{s_i^2(k)\}$ can be normalized into a value relative to a subband power of the stereo signal 201. This makes the present invention strong against a change if a general encoding device is used to encode a stereo signal efficiently. For instance, $a_i$ and $b_i$ can be transformed into a gain and decibel (dB) unit level difference represented as Formula 3 and then transported.

$$g_i = 10\log_{10}(a_i^2 + b_i^2) \qquad \text{[Formula 3]}$$

$$l_i = 20\log_{10}\frac{b_i}{a_i}.$$

And, instead of being directly encoded as side information, $E\{s_i^2(k)\}$ can be transformed into a value defined relative to a stereo signal, which is represented as Formula 4, and then transported.

$$A_i(k) = 10\log_{10}\frac{E\{s_i^2(k)\}}{E\{x_1^2(k)\} + E\{x_2^2(k)\}}. \qquad \text{[Formula 4]}$$

To generate a short-time, the present invention uses single-pole averaging. Namely, $E\{s_i^2(k)\}$ can be calculated as Formula 5.

$$E\{s_i^2(k)\} = \alpha s_i^2(k) + (1-\alpha)E\{s_i^2(k-1)\}, \qquad \text{[Formula 5]}$$

In Formula 5, $\alpha \in [0, 1]$ determines a time-constant of an estimation window that decreases exponentially as Formula 6.

$$T = \frac{1}{\alpha f_s}, \qquad \text{[Formula 6]}$$

In Formula 6, $f_s$ indicates a subband sampling frequency. For instance, it is able to use T=40 ms.

In the following description, $E\{\ \}$ indicates short-time averaging. If $a_i$ and $b_i$ are not given, they need to be generated by the side information generating unit 206. Since $E\{s_i(n)\overline{x_1(n)}\} = a_i E\{s_i^2(n)\}$, $a_i$ can be calculated by Formula 7.

$$a_i = \frac{E\{\tilde{s}_i(n)\tilde{x}_1(n)\}}{E\{\tilde{s}_i^2(n)\}}. \qquad \text{[Formula 7]}$$

Similarly, $b_i$ can be calculated by Formula 8.

$$b_i = \frac{E\{\tilde{s}_i(n)\tilde{x}_2(n)\}}{E\{\tilde{s}_i^2(n)\}}. \qquad \text{[Formula 8]}$$

Figure 3:
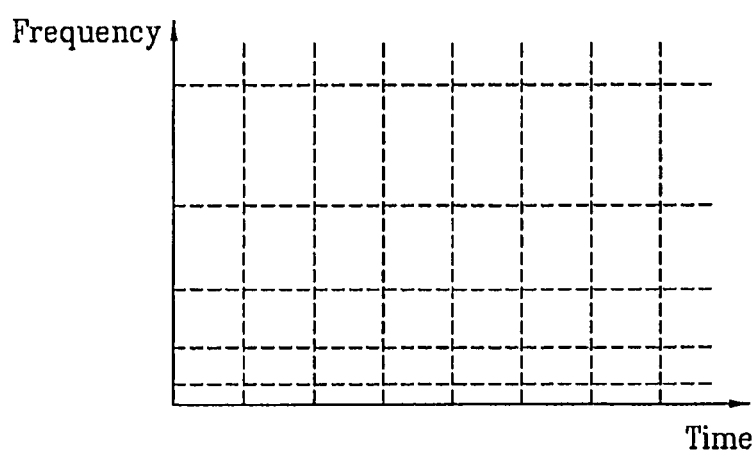
FIG. 3 is a graph of a domain for processing a media signal according to one embodiment of the present invention.

FIG. 3 shows a domain for processing a media signal according to one embodiment of the present invention.

As mentioned in the foregoing description, audio signal and side information are processed as a signal per subband in a time-frequency domain as shown in FIG. 3.

The signal per subband in the time-frequency domain is perceptually induced. For instance, it is able to generate a signal per subband using STFT (short time Fourier transform) having a sine analysis and synthesis window of about 20 ms. In this case, STFT coefficients can be grouped in a manner that one group has a bandwidth about two times greater than ERB (equivalent rectangular bandwidth).

Figure 4:
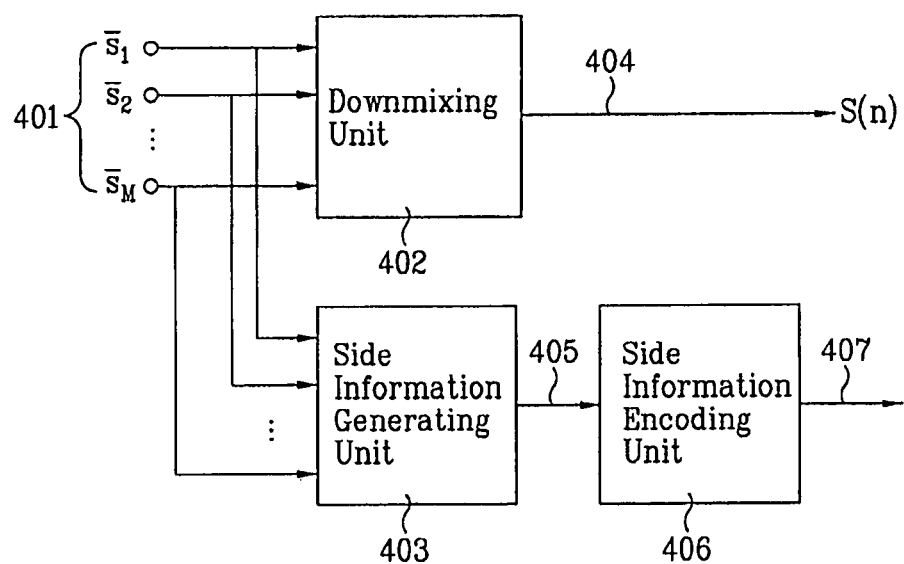
FIG. 4 is a block diagram of a second signal processing apparatus according to one embodiment of the present invention.

FIG. 4 is a block diagram of a second signal processing apparatus according to one embodiment of the present invention.

Referring to FIG. 4, a downmixing unit 402 generates a sum signal by adding a plurality of source signals 401 together. Unlike the first signal processing apparatus, a second signal processing apparatus transports the sum signal 404 instead of transporting a stereo signal.

A side information generating unit 403 generates side information 405 using the source signals 401. The side information 405 includes a subband power and a gain factor corresponding to each of the source signals. And, the side information 405 can include a parameter corresponding to a delay in a remix rendering unit. Similar to that in the first signal processing apparatus, the side information 405 can be transported by being transformed into a different value more suitable for quantization and encoding.

A side information encoding unit 406 generates a side information signal 407 using the generated side information 405.

The generated sum signal 405 and the generated side information signal 407 are transported to a decoding device.

The present invention also includes an encoding device failing to have the downmixing unit 402. In this case, source signals 401 are not transformed into a sum signal 404 but are directly transported.

Figure 5:
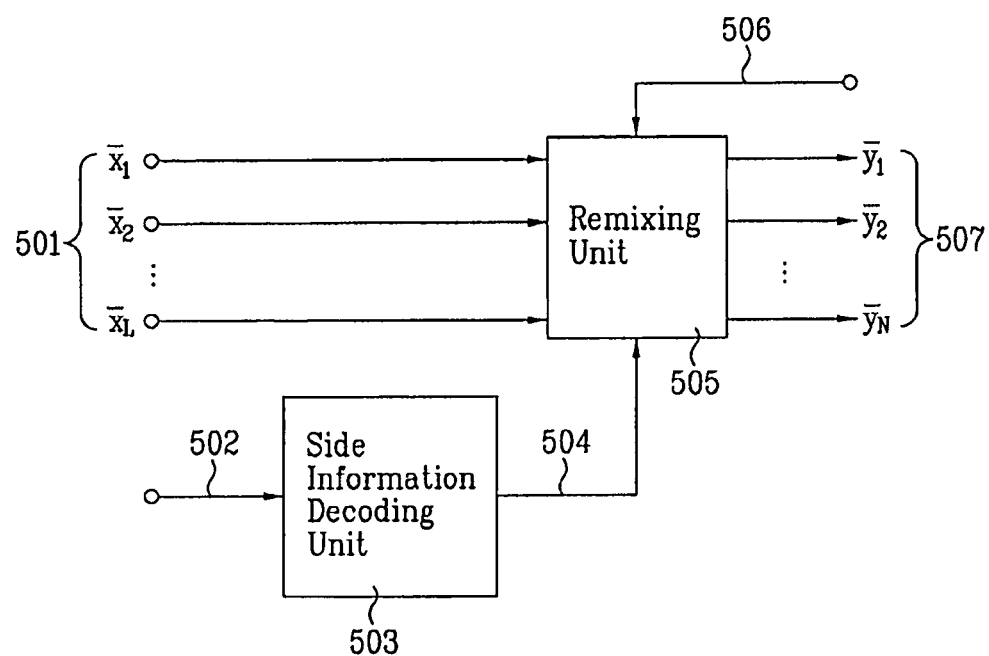
FIG. 5 is a block diagram of a third signal processing apparatus according to one embodiment of the present invention.

FIG. 5 is a block diagram of a third signal processing apparatus according to one embodiment of the present invention.

Referring to FIG. 5, a third signal processing apparatus according to one embodiment of the present invention includes a side information decoding unit 503 and a remix rendering unit 505.

A mix signal 501 and a side information signal 502 are inputted to the third signal processing apparatus. The mix signal 501 can include a mono, stereo or multi-channel audio signal.

The side information decoding unit 503 generates side information 504 by decoding the side information signal 502. The side information 504 includes gain factors and subband powers of source signals included in the transported audio signal 501.

A user-mix parameter 506 generated using control information directly provided by a user can be inputted to the remix rendering unit 505.

The remix rendering unit 505 generates a remix signal 507 using the mix signal 501, the transported side information 504, and the user-mix parameter 506. Details of a method for generating the remix signal will be explained later with reference to FIG. 6.

The remix signal 507 is generated into an eq-channel mix signal having a channel number equal to that of the transported mix signal or can be generated as an up-channel mix signal having a channel number greater than that of the mix signal.

Figure 6:
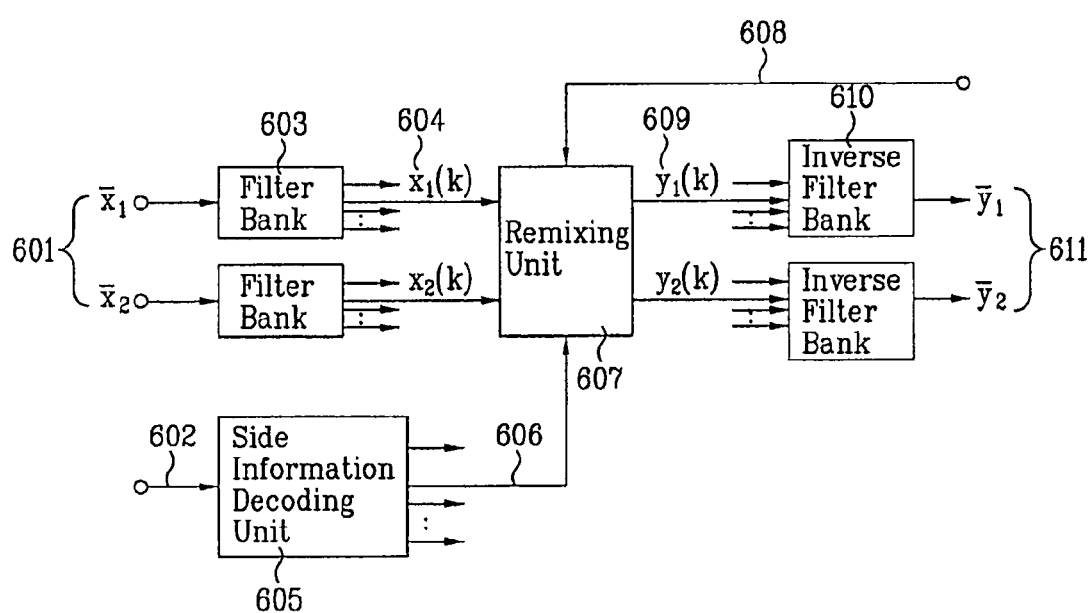
FIG. 6 is a detailed block diagram of the third signal processing apparatus shown in FIG. 5 in case of using a stereo signal.

FIG. 6 is a detailed block diagram of the third signal processing apparatus shown in FIG. 5 in case of using a stereo signal. As mentioned in the foregoing description, a transported mix signal can include a mono, stereo or multi-channel audio signal. For convenience, it is assumed that the transported mix signal includes a stereo signal 601.

Referring to FIG. 6, the stereo signal 601 is decomposed into signals per subband 604 in time-frequency domain via filter banks 603. The signals per subband 604 on a specific frequency are represented as $x_1(k)$ and $x_2(k)$, respectively.

A side information decoding unit 605 generates a side information per subband 606 by decoding a transported side information signal 602.

A user-mix parameter 608 generated using control information provided by a user can be inputted to a remix rendering unit 607. And, the user-mix parameter 608 can be provided per a subband.

As mentioned in the foregoing description, the side information 606 includes a subband power represented as gain factors per subband $a_i$ and $b_i$ and $E\{s_i^2(k)\}$ for M source signals to be remixed.

The remix rendering unit 607 generates a remix signal per subband 609 ($y_1(k)$, $y_2(k)$) using the stereo signal 604 generated per the subband, the transported side information 606, and the user-mix parameter 608. A method of generating the remix signal 609 will be explained in detail. The remix signals 609 are transformed into a stereo signal ($\overline{y_1}$, $\overline{y_2}$) 611, in a time domain via inverse filter tanks 610.

A method of generating the remix signal 609 from the remix rendering unit 607 is explained as follows.

First of all, Formula 1 and Formula 2 are effective on the signals per subband 604 and 609. In this case, a source signal $\overline{s_i}(n)$ is replaced by a source signal per subband $s_i(k)$.

$$x_1(k) = \sum_{i=1}^{I} a_i s_i(k) \quad \text{[Formula 9]}$$

$$x_2(k) = \sum_{i=1}^{I} b_i s_i(k),$$

The remix signals per subband 609 can be represented as Formula 10.

$$y_1(k) = \sum_{i=1}^{M} c_i s_i(k) + \sum_{i=M+1}^{I} a_i s_i(k) \quad \text{[Formula 10]}$$

$$y_2(k) = \sum_{i=1}^{M} d_i s_i(k) + \sum_{i=M+1}^{I} b_i s_i(k).$$

To generate the remix signal 609, least squares estimation can be used. If the mix signals per subband ($x_1(k)$, $x_2(k)$) 604 are given, remix signals per subband 609 having different gains, as shown in Formula 11, can be estimated as a linear combination of the mix signals per subband 604.

$$\hat{y}_1(k) = w_{11}(k)x_1(k) + w_{12}(k)x_2(k) \quad \text{[Formula 11]}$$

$$\hat{y}_2(k) = w_{21}(k)x_1(k) + w_{22}(k)x_2(k),$$

In Formula 11, $w_{11}(k)$, $w_{12}(k)$, $w_{21}(k)$ and $w_{22}(k)$ are weight factors, respectively. In this case, generated estimation error can be defined as Formula 12.

$$e_1(k) = y_1(k) - \hat{y}_1(k) \quad \text{[Formula 12]}$$
$$= y_1(k) - w_{11}(k)x_1(k) - w_{12}(k)x_2(k)$$
$$e_2(k) = y_2(k) - \hat{y}_2(k)$$
$$= y_2(k) - w_{21}(k)x_1(k) - w_{22}(k)x_2(k).$$

The weight factors $w_{11}(k)$, $w_{12}(k)$, $w_{21}(k)$ and $w_{22}(k)$ can be generated per a subband to minimize mean square errors $E\{e_1^2(k)\}$ and $E\{e_2^2(k)\}$ For this, it is able to use a fact that the mean square error can be minimized when $e_1(k)$ and $e_2(k)$ become orthogonal to $x_1(k)$ and $x_2(k)$, respectively. The generated $w_{11}(k)$ and $w_{12}(k)$ can be represented as Formula 13.

$$w_{11} = \frac{E\{x_2^2\}E\{x_1 y_1\} - E\{x_1 x_2\}E\{x_2 y_1\}}{E\{x_1^2\}E\{x_2^2\} - E^2\{x_1 x_2\}} \quad \text{[Formula 13]}$$

$$w_{12} = \frac{E\{x_1 x_2\}E\{x_1 y_1\} - E\{x_1^2\}E\{x_2 y_1\}}{E^2\{x_1 x_2\} - E\{x_1^2\}E\{x_2^2\}}.$$

In Formula 13, $E\{x_1^2\}$, $E\{x_2^2\}$ and $E\{x_1 x_2\}$ can be directly generated. Yet, $E\{x_1 y_1\}$ and $E\{x_2 y_1\}$ can be generated by Formula 14 using the transported side information 606 (e.g., $E\{s_i^2\}$, $a_i$, $b_i$) and the control information 608 (e.g., gain factors $c_i$ and $d_i$) provided by a user.

$$E\{x_1 y_1\} = E\{x_1^2\} + \sum_{i=1}^{M} a_i(c_i - a_i)E\{s_i^2\} \quad \text{[Formula 14]}$$

$$E\{x_2 y_1\} = E\{x_1 x_2\} + \sum_{i=1}^{M} b_i(c_i - a_i)E\{s_i^2\}.$$

Similarly, $w_{21}$ and $w_{22}$ can be generated by Formula 15.

$$w_{21} = \frac{E\{x_2^2\}E\{x_1 y_2\} - E\{x_1 x_2\}E\{x_2 y_2\}}{E\{x_1^2\}E\{x_2^2\} - E^2\{x_1 x_2\}} \quad \text{[Formula 15]}$$

$$w_{22} = \frac{E\{x_2 x_2\}E\{x_1 y_2\} - E\{x_1^2\}E\{x_2 y_2\}}{E^2\{x_1 x_2\} - E\{x_1^2\}E\{x_2^2\}}.$$

In Formula 15, $E\{x_1y_2\}$ and $E\{x_2y_2\}$ can be represented as Formula 16.

$$E\{x_1y_2\} = E\{x_1x_2\} + \sum_{i=1}^{M} a_i(d_i - b_i)E\{s_i^2\}$$

$$E\{x_2y_2\} = E\{x_2^2\} + \sum_{i=1}^{M} b_i(d_i - b_i)E\{s_i^2\}.$$

[Formula 16]

If phases of the mix signal 604 are coherent to each other or almost become coherent, a value represented as Formula 17 approximates 1.

$$\phi = \frac{E\{x_1x_2\}}{\sqrt{E\{x_1^2\}E\{x_2^2\}}}$$

[Formula 17]

In this case, the weights can be represented as Formula 18.

$$w_{11} = \frac{E\{x_1y_1\}}{E\{x_1^2\}}$$

$$w_{12} = w_{21} = 0$$

$$w_{22} = \frac{E\{x_2y_2\}}{E\{x_2^2\}}.$$

[Formula 18]

As mentioned in the foregoing description, the above-generated remix signal per subband 609 is transformed into a remix signal 611 in time-frequency domain via the inverse filter bank 610.

The remix signal 611 sounds similar to a remix signal generated from remixing source signals independently using the user-mix parameters $c_i$ and $d_i$ generated using the control information provided by a user.

The remixing of the 2-channel stereo signal has been mainly dealt with so far. Yet, as mentioned in the foregoing description, the present invention is applicable to the remixing of a multi-channel audio signal, e.g., 5.1-channel audio signal as well as to the stereo signal. It is apparent to those skilled in the art that a multi-channel audio signal can be remixed in a manner similar to that applied to the stereo signal described in this disclosure. If so, Formula 11 can be rewritten into Formula 19.

$$\hat{y}_1(k) = \sum_{c=1}^{C} w_{1c}(k)x_c(k)$$

$$\hat{y}_2(k) = \sum_{c=1}^{C} w_{2c}(k)x_c(k)$$

...

$$\hat{y}_C(k) = \sum_{c=1}^{C} w_{Cc}(k)x_c(k).$$

[Formula 19]

Selectively, a specific one of channels of a mix signal can remain intact without being remixed. For instance, remixing is applied to front channels of 5.1 surround channels while two rear channels are not modified. For this, 2- or 3-channel remixing algorithm is applied to front channels.

Figure 7:
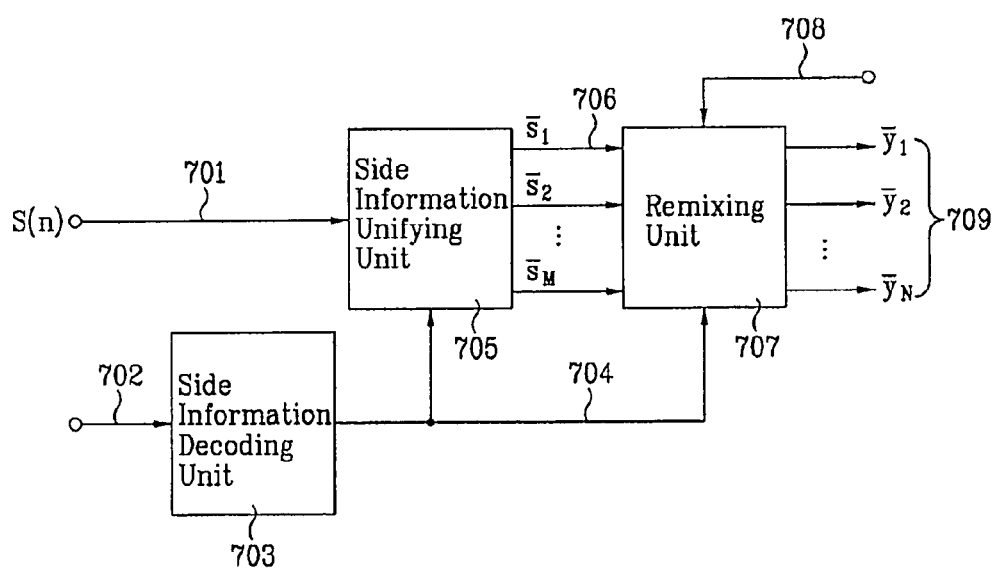
FIG. 7 is a block diagram of a fourth signal processing apparatus according to one embodiment of the present invention.

FIG. 7 is a block diagram of a fourth signal processing apparatus according to one embodiment of the present invention.

Referring to FIG. 7, a fourth signal processing apparatus according to one embodiment of the present invention includes a side information decoding unit 703, a spatial information unifying unit 705, and a remix rendering unit 707.

A sum signal 701 of source signals and a side information signal 702 are inputted to the fourth signal processing apparatus.

The side information decoding unit 703 generates side information 704 by decoding the side information signal 702. The side information 704 includes a gain factor, a delay constant, a subband power, and the like.

The side information unifying unit 705 separates the sum signal 701 into a plurality of source signals 706 using the side information 704.

The remix rendering unit 707 is able to generate a remix signal 709 using the source signals 706. In this case, the remix rendering unit 707 is able to generate the remix signal 709 using a mix parameter carried by the side information.

And, the remix rendering unit 707 is able to generate the remix signal 709 using a user-mix parameter 708 generated using control information provided by a user.

Figure 8:
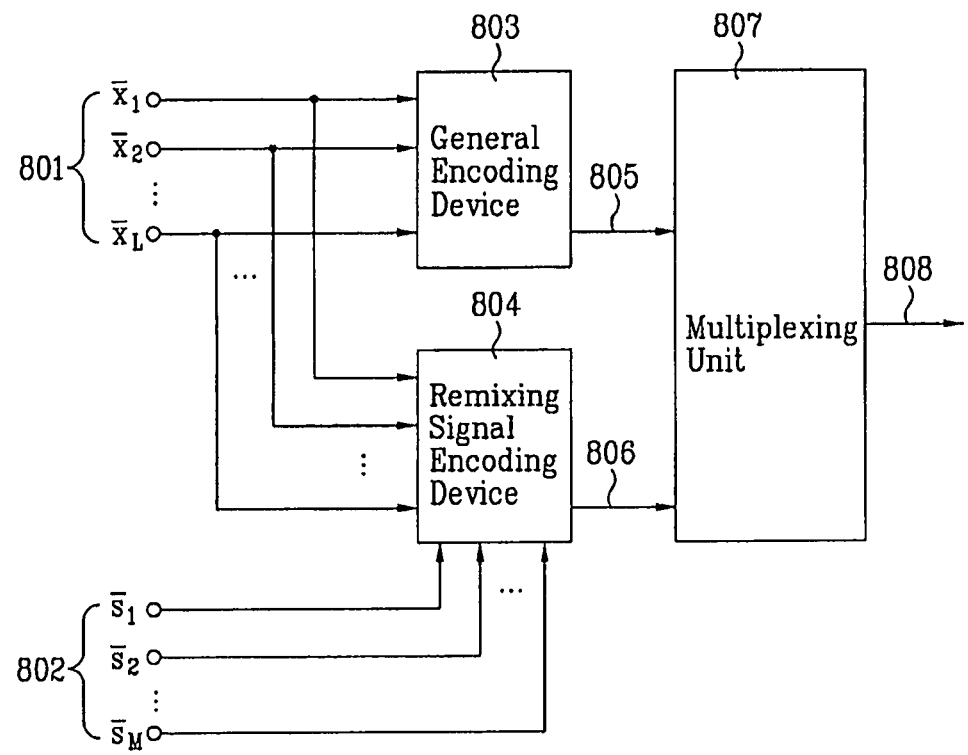
FIG. 8 is a block diagram of a combined configuration of a general encoding device and a signal processing apparatus according to one embodiment of the present invention.

FIG. 8 is a block diagram of a combined configuration of a general encoding device and a signal processing apparatus according to one embodiment of the present invention.

Referring to FIG. 8, a mix signal 801 can be transformed into an encoded mix signal 805 by being encoded by a general encoding device 803. The mix signal 801 can include a signal per channel or a source signal. And, the general encoding device 803 includes an encoder to be developed in the future as well as a conventional encoder such as AAC, MP3 encoder and the like.

A remix signal encoding apparatus 804 according to the present invention generates a side information signal 806 using the mix signal 801 and a source signal 802 included in the mix signal.

A multiplexing unit 807 generates a bitstream 808 using the encoded mix signal 805 and the side information signal 806. As mentioned in the foregoing description, the side information signal 806 can be inserted in an auxiliary data area within a conventional mix signal format to have compatibility with conventional devices.

Figure 9:
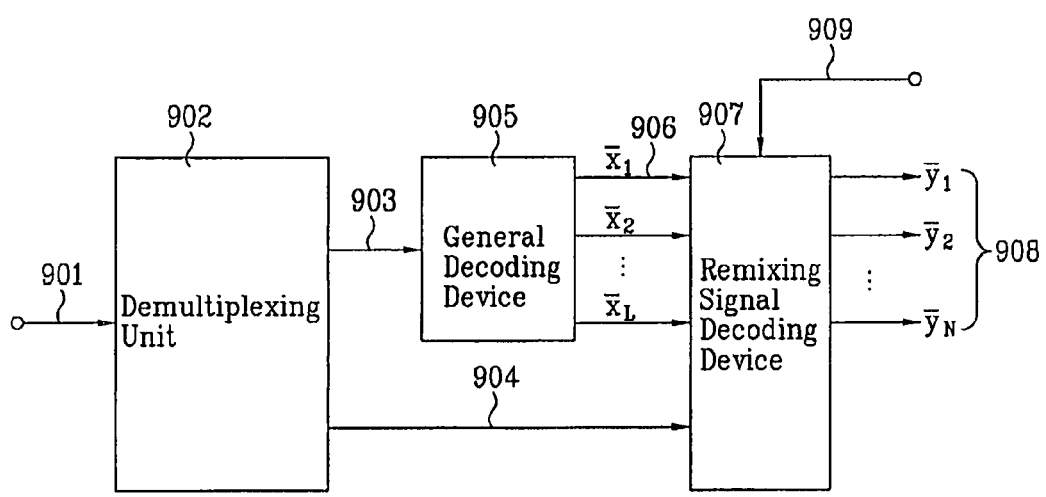
FIG. 9 is a block diagram of a combined configuration of a general decoding device and a signal processing apparatus according to one embodiment of the present invention.

FIG. 9 is a block diagram of a combined configuration of a general decoding device and a signal processing apparatus according to one embodiment of the present invention.

Referring to FIG. 9, a demultiplexing unit 902 separates a transported bitstream 901 into an encoded mix signal 903 and a side information signal 904.

Subsequently, a general decoding device 905 generates a mix signal 906 usable for a remix signal decoding apparatus 907 according to the present invention by decoding the encoded mix signal 903. And, the general decoding device 905 includes a decoder to be developed in the future as well as a conventional decoder such as AAC, MP3 decoder and the like. The mix signal 906 can include a signal per channel or a source signal. The remix signal decoding apparatus 907 according to the present invention is able to transform the mix signal 906 into a remix signal 909 using at least one of the side information signal and a user-mix parameter 908.

Figure 10:
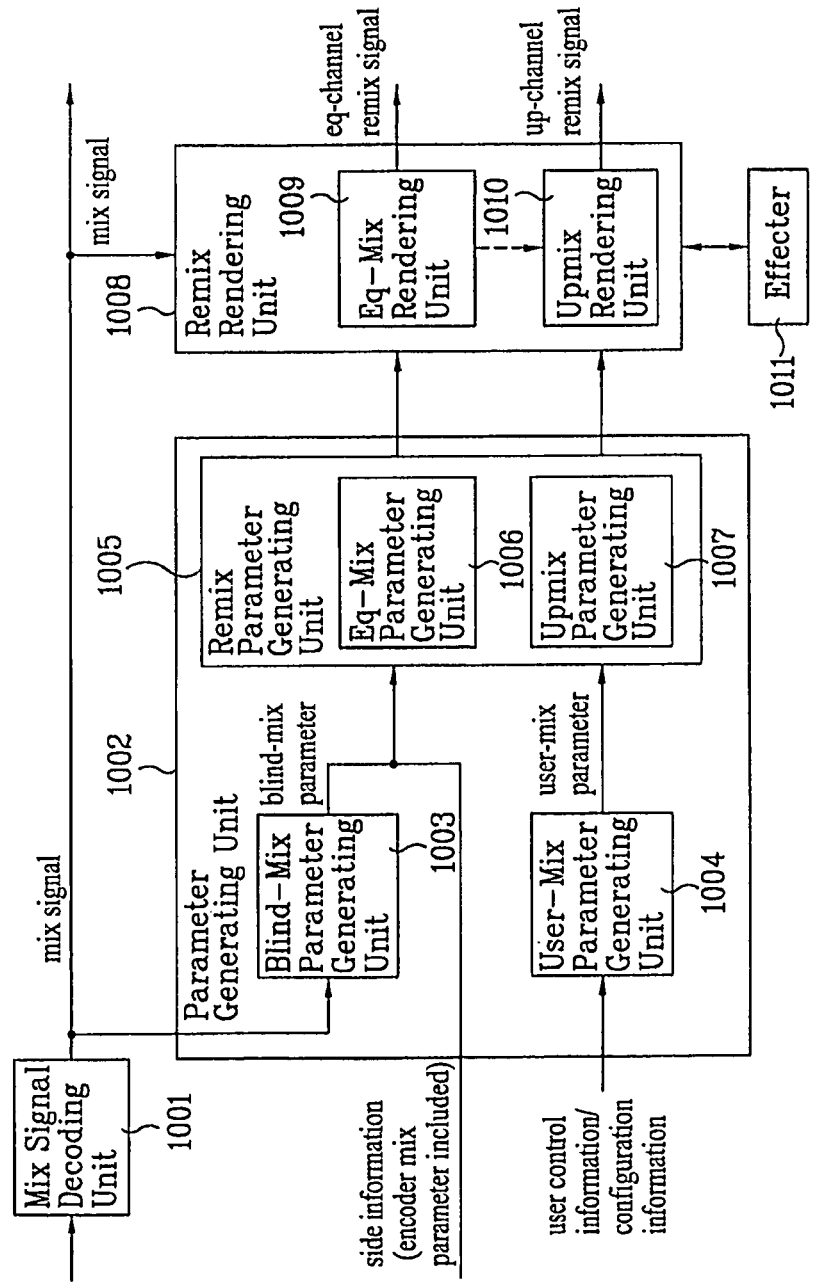
FIG. 10 is a block diagram of a fifth signal processing apparatus according to one embodiment of the present invention.

FIG. 10 is a block diagram of a fifth signal processing apparatus according to one embodiment of the present invention.

Referring to FIG. 10, a fifth signal processing apparatus according to one embodiment of the present invention includes a mix signal decoding unit 1001, a parameter generating unit 1002, and a remix rendering unit 1008. Optionally, the fifth signal processing apparatus may include an effecter 1011.

The parameter generating unit 1002 can include a blind-mix parameter generating unit 1003, a user-mix parameter generating unit 1004, and a remix parameter generating unit 1005.

The remix parameter generating unit 1005 includes an eq-mix parameter generating unit 1006 and may optionally include an upmix parameter generating unit 1007.

The remix rendering unit 1008 includes an eq-mix rendering unit 1009 and may optionally include an upmix rendering unit 1010.

The mix signal decoding unit 1001 generates a mix signal by decoding an encoded mix signal transported by an encoding end.

The parameter generating unit 1002 receives side information and user control information (or configuration information) transported by the encoding end. And, the user control information may be generated from a decoder end instead of being transported by the encoder end.

The user-mix parameter generating unit 1004 generates a user-mix parameter using the user control information. And, an encoder mix parameter may be included in the side information transported by the encoder end.

The blind-mix parameter generating unit 1003 is able to generate a blind-mix parameter using the mix signal. Either the encoder mix parameter or the blind-mix parameter can be selectively inputted to the remix parameter generating unit 1005.

The remix parameter generating unit 1005 generates a remix parameter using the side information and the user-mix parameter. The remix parameter can be generated to be applicable to a channel of the remix signal.

The eq-mix parameter generating unit 1006 included in the remix parameter generating unit 1005 generates a remix parameter used in generating a remix signal having a channel number equal to that of the mix signal.

And, the upmix parameter generating unit 1007 generates a remix parameter used in generating a remix signal having a channel number greater than that of the mix signal. The remix parameter is inputted to the remix rendering unit 1008.

The eq-mix rendering unit 1009 included in the remix rendering unit 1008 generates an eq-channel remix signal having a channel number equal to that of the mix signal using the remix parameter and the mix signal.

The upmix rendering unit 1010, which may be included in the remix rendering unit 1008, generates an up-channel remix signal having a channel number greater than that of the mix signal using the remix parameter generated from the upmix parameter generating unit 1007 and the mix signal. The upmix rendering unit 1010 can generate an up-channel remix signal using the remix signal generated from the eq-channel rendering unit 1009.

Hence, the fifth signal processing apparatus outputs the mix signal transported by the encoding end as it is, outputs the mix signal into the eq-channel remix signal, or outputs the mix signal into the up-channel remix signal. Optionally, using information provided by the effecter 1011, the remix rendering unit can give various effects to the remix signal.

Figure 11:
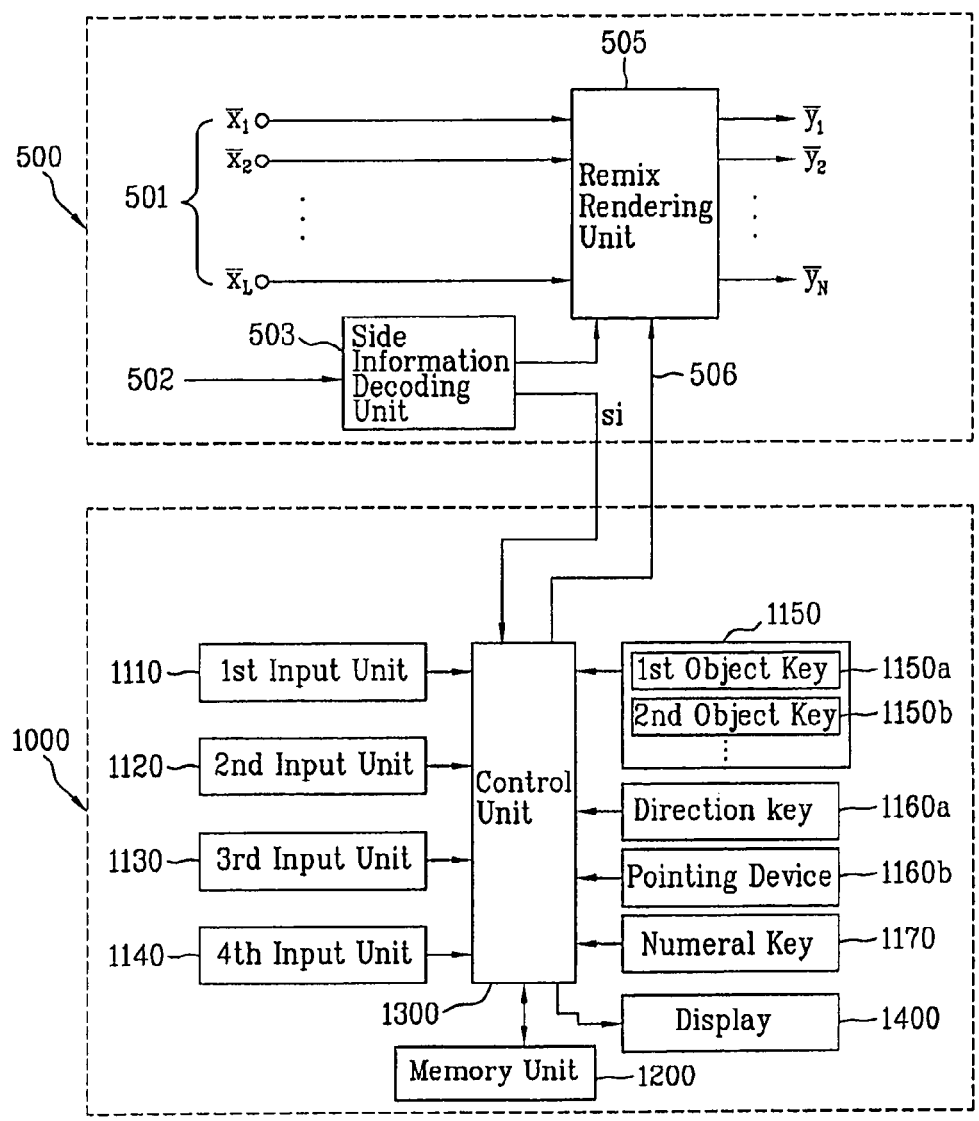
FIG. 11 is a block diagram of an input apparatus according to one embodiment of the present invention.
Figure 12:
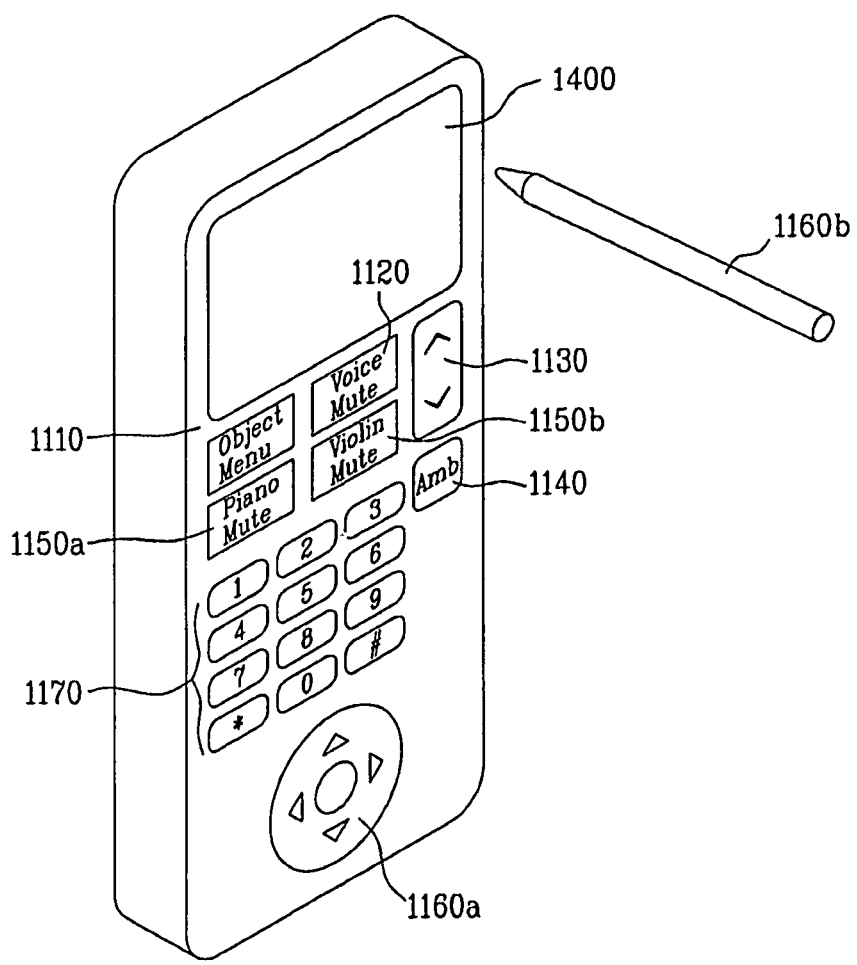
FIG. 12 is an exemplary diagram of an input apparatus according to one embodiment of the present invention.

FIG. 11 is a block diagram of an input apparatus according to one embodiment of the present invention, and FIG. 12 is an exemplary diagram of an input apparatus according to one embodiment of the present invention.

Referring to FIG. 11 and FIG. 12, an input apparatus 1000 according to one embodiment of the present invention is interconnected to a first remix signal decoding device 500 and includes a first input unit (source menu key) 1110, a second input unit (voice mute key) 1120, a third input unit (voice adjust key) 1130, a fourth input unit (ambience adjust key) 1140, a fifth input unit (first source key 1150*a*, piano key) 1150, a second source key (violin key) 1150*b*, a direction key 1160*a*, a pointing device 1160*b*, a numeral key 1170, a memory unit 1200, a control unit 1300, and a display 1400.

Since the first remix signal decoding device 500 has the same configuration of the former remix signal decoding device described with reference to FIG. 5, details of its elements are omitted in the following description. And, elements of the input apparatus 1000 will be explained in detail as follows.

Figures 13, 14:
FIG. 13 is an exemplary diagram of an image displayed after a first input unit (source menu key) has been inputted.
FIG. 14 is an exemplary diagram of an image displayed after a second input unit (voice mute key) has been inputted.

First of all, the first input unit (source menu key) 1110 is an input device of which input signal is converted to a per-source menu display command by the control unit 1300. In this case, a per-source menu is an image for displaying a list of sources included in a specific mix signal. So, a volume level or the like is adjustable per a source while a per-source menu is displayed. FIG. 13 shows an example of an image (per-source menu display image) displayed after a first input unit (source menu key) has been inputted. In this case, the per-source menu display image can be displayed on the display 1400 of a first interface device 550. The first input unit (source menu key) 1110 can be implemented with a toggle type button key or a touch sensor by which a command execution or cancellation is repeated in accordance with a push count, which does not restrict various implementations of the present invention.

The second input unit (voice mute key) 1120 is an input device that converts its input signal to a voice mute command by the control unit 1300. In this case, the voice mute command is a command to set a level of human voice among sources included in a specific mix signal to zero. FIG. 14 shows an example of an image displayed after the second input unit (voice mute key) has been inputted. The second input unit (voice mute key) 1120 can be implemented with a toggle type button key or a touch sensor by which a command execution or cancellation is repeated in accordance with a push count, which does not restrict various implementations of the present invention.

Figure 15:
FIG. 15 is an exemplary diagram of an image displayed after a third input unit (voice adjust key) has been inputted.
Figure 15:

The third input unit (voice adjust key) 1130 is an input device that converts its input signal to a voice level adjust command by the control unit 1300. In this case, the voice level adjust command is a command to raise or lower a level of human voice among sources included in a specific mix signal. FIG. 15 shows an example of an image displayed after the third input unit (voice adjust key) has been inputted. The third input unit (voice adjust key) 1130 is provided to input a level-up command or a level-down command and can be implemented with one of a pair of button keys, a jog-shuttle, a 2-way jog-button, a 2-way touch-scroll, a pair of touch-sensors, a touch-wheel, and the like, by which the present invention is not restricted.

Figure 16:
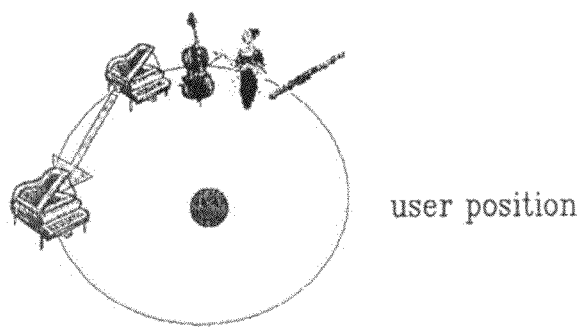
FIG. 16 is an exemplary diagram of an image displayed after a fourth input unit (ambience adjust key) has been inputted.

The fourth input unit (ambience adjust key) 1140 is an input device that converts its input signal to an ambience image display command by the control unit 1300. In this case, an ambience image displays relative positions of sources included in a specific mix signal to enable each of the positions of the sources using the direction key 1160*a* or the pointing device 1160*b*. FIG. 16 shows an example of an image (ambience image) displayed after the fourth input unit (ambience adjust key) has been inputted. The fourth input unit (ambience adjust key) 1140 can be implemented with a toggle type button key or a touch sensor by which a command execution or cancellation is repeated in accordance with a push count, which does not restrict various implementations of the present invention.

Figure 17:
FIG. 17 is an exemplary diagram of an image displayed after a first source key (piano key) of a fifth input unit has been inputted.
Figure 18:
FIG. 18 is an exemplary diagram of an image displayed after a second source key (violin key) of a fifth input unit has been inputted.

The fifth input unit 1150 is an input device that converts its input signal to a source sound mute command by the control unit 1300. In this case, the source sound mute key is a command disabling a source signal corresponding to a specific musical instrument to be played back. For instance, the fifth input unit 1150 can include the first source key (piano key) 1150a to set a level of a source signal corresponding to 'piano' to almost zero or the second source key (violin key) 1150b to set a level of a source signal corresponding to 'violin' to almost zero. FIG. 17 shows an example of an image displayed after the first source key (piano key) of the fifth input unit has been inputted. And, FIG. 18 shows an example of an image displayed after the second source key (violin key) of the fifth input unit has been inputted.

Each of the first and second source keys of the fifth input unit 1150 can be implemented with a toggle type button key or a touch sensor by which a command execution or cancellation is repeated in accordance with a push count, which does not restrict various implementations of the present invention.

The direction key 1160a is an input device that converts its input signal to a command for a direction shift by the control unit 1300. In this case, the command for the direction shift can be a specific source level adjust command In case of a state that a per-source menu image is displayed. Alternatively, the command for the direction shift can be a position adjust command of a specific position In case of a state that an ambience image is displayed. The direction key 1160a can be implemented with four button keys, four touch sensors, 4-way touch-scroll, a touch-wheel or the like, by which various implementations of the present invention are not restricted.

The pointing device 1160b is an input device that converts its input signal to a command for a position designation by the control unit 1300. Like the direction key 1160a, the command for the position designation can be a specific source level command In case of a state that a per-source menu image is displayed. Alternatively, the command for the position designation can be a position adjust command of a specific source In case of a state that an ambience image is displayed. And, the pointing device 1160b can be implemented with a mouse, a track ball, a touchpad, a touchscreen, a touch-panel (& stylus pen) or the like, by which various implementations of the present invention are not restricted.

The numeral key 1170 is an input device that converts its input signal to a command for a numeral input by the control unit 1300. IN this case, the command for the numeral input can be a command for selecting a specific source matching a corresponding number In case of a state that a per-source menu image or an ambience image is displayed. For instance, in case that '1. Voice, 2. Piano, 3>Violin, 4. Flute' is displayed on a per-source menu image, if a user selects a 'key #3' of the numeral key 1170, 'violin' matching the number 3 is selected. The numeral key 1170 can be implemented with ten button keys, 10 touch sensors, a touch panel, or the like, by which various implementations of the present invention are not restricted.

Various kinds of per-key command informations are stored in the memory unit 1200. In this case, the per-key command information means each of the input units (the first input unit 1110, the second input unit 1120, etc.) (the numeral key 1170 included) and a command (per-source menu display command, voice mute command, etc.) corresponding to the input unit. Meanwhile, a user enables the per-key command information to be newly stored or modified through a shortcut key registering process. And, details of the shortcut key registering process will be explained with reference to FIG. 22 later. Besides, data about a per-source menu image, a voice mute image, a voice adjust image, an ambience adjust image, and the like are further stored in the memory unit 1200.

The control unit 1300 converts an input signal received from each of the input units 1110, 1120, 1130, 1140 and 1150 to a corresponding command based on each of the per-key command informations stored in the memory unit 1200. In particular, the control unit 1300 converts an input signal received via the first input unit 1110 to a per-source menu display command. The control unit 1300 converts an input signal received via the second input unit 1120 to a voice mute command and then outputs control information 506 on a mix signal based on the voice mute command. The control unit 1300 converts an input signal received via the third input unit 1130 to a voice level adjust command. The control unit 1300 converts an input signal received via the fourth input unit 1140 to an ambience image display command. And, the control unit 1300 converts an input signal received via the fifth input unit 1150 to a source sound mute command.

In accordance with an input via the input unit 1110, 1140 or the like, the control unit 1300 enables an interface image to be displayed based on source information (si) received from the first remix signal decoding device 500. For instance, in case that a per-source menu display command is inputted via the first input unit 1110, the control unit 1300 controls a per-source menu to be displayed on the display 1400 based on the source information (si). In case that an ambience image display command is inputted via the fourth input unit 1140, the control unit 1300 controls an ambience image to be displayed based on source signal information (Si) corresponding to a mix signal.

Based on a command via the input unit 1120, 1130, 1140 or the like, the control unit 1300 outputs control information 506 on a mix signal and then controls the control information 506 to be inputted to the first remix signal decoding device 500. The control information 506 is described in the foregoing description with reference to FIG. 5 and it details are omitted in the following description. In particular, in case of a state that a per-source menu image is displayed on the display, the control unit 1300 converts an input signal, which is received via the pointing device 1160b or the direction key 1160a, to a per-source level adjust command. In case of a state that an ambience image is displayed on the display, the control unit 1300 converts an input signal, which is received via the pointing device 1160b or the direction key 1160a, to an ambience adjust command. In the course of converting the input signals to the corresponding commands, the control unit 1300 is able to refer to the per-key command informations stored in the memory unit 1200. And, the control unit 1300 is able to output the control information 506 on the mix signal based on the converted command (e.g., per-source level adjust command, ambience adjust command, etc.).

The display 1400 is a display device on which a per-source menu image, an ambience image or the like is displayed under the control of the control unit 1300. Moreover, each of the images (in FIG. 14, FIG. 15, FIG. 17, FIG. 18, etc.), which are displayed after the input units (first input unit 1110, etc.) have been inputted, can be displayed on the display 1400.

Figure 19:
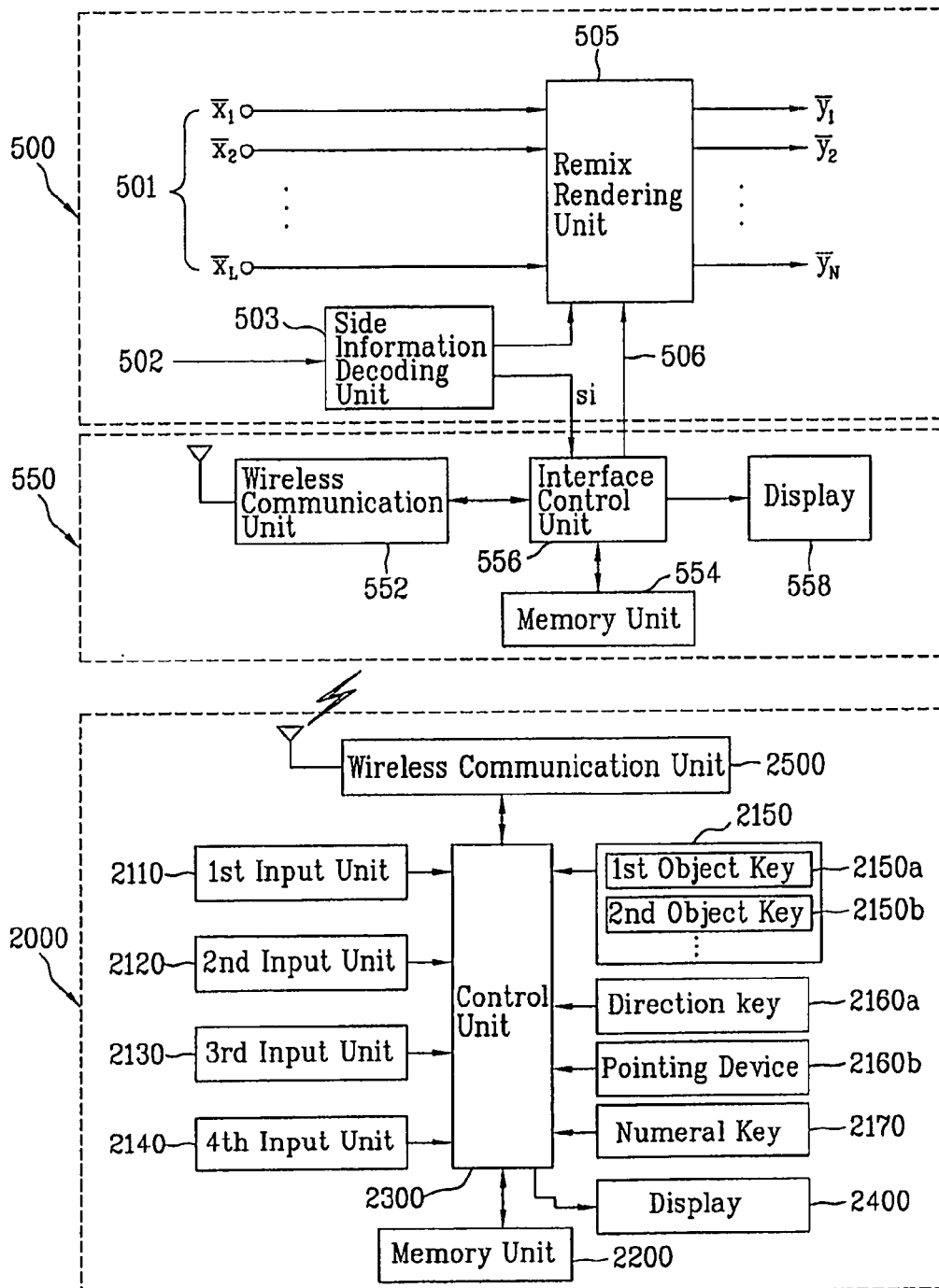
FIG. 19 is a block diagram of an input apparatus according to another embodiment of the present invention.

FIG. 19 is a block diagram of an input apparatus according to another embodiment of the present invention.

Referring to FIG. 19, an input apparatus 2000 according to another embodiment of the present invention (hereinafter named 'input apparatus 2000') is interconnected to a first remix signal decoding device 500 and a first interface device 550. And, the input apparatus 2000 includes a first input unit (source menu key) 2110, a second input unit (voice mute key) 2120, a third input unit (voice adjust key) 2130, a fourth input unit (ambience adjust key) 2140, a fifth input unit (first source key 2150a (piano key)) 2150, a second source key (violin key) 2150b, a direction key 2160a, a pointing device 2160b, a numeral key 2170, a memory unit 2200, a control unit 2300, a display 2400, and a wireless communication unit 2500. Theses elements except the control unit 2300 and the wireless communication unit 2500 are almost identical to the former elements having the same names described with reference to FIG. 11 and FIG. 12, of which details will be omitted in the following description.

The first remix signal decoding device 500 has the same configuration of the former remix signal decoding device described with reference to FIG. 5, of which details will be omitted in the following description.

Meanwhile, the first interface device 550 is a device that provides an interface to the input apparatus 2000. and, the first interface device 550 includes a wireless communication unit 552, a memory unit 554, an interface control unit 556, and a display unit 558.

The wireless communication unit 552 of the first interface device 550 is a device that performs wireless communication with the input apparatus 2000. In this case, the wireless communication unit 552 adopts one of various communication systems such as an infrared communication system. In the memory unit 554, data on a per-source menu image, a voice mute image, a voice adjust image, an ambience adjust image and the like are stored. The interface control unit 556 displays an interface image based on source information (si) received from the first remix signal decoding device 500. And, the interface control unit 556 inputs control information 506 to the first remix signal decoding device 500 based on a command received from the input device 2000. The control information 506 is already described with reference to FIG. 5, of which details are omitted in the following description. The display 558 is a display device on which an interface image is displayed under the control of the interface control unit 556. If the input apparatus 2000 is provided with the display 2400, the display 558 of the first interface device 550 is not an essential element.

The control unit 2300 and the wireless communication unit 2500 among the respective elements of the input apparatus 2000 are explained as follows.

First of all, the control unit 2300 converts an input signal received via the first input unit 2110 to a per-source menu display command. The control unit 2300 converts an input signal received via the second input unit 2120 to a voice mute command. The control unit 2300 converts an input signal received via the third input unit 2130 to a voice level adjust command. The control unit 2300 converts an input signal received via the fourth input unit 2140 to an ambience image display command. And, the control unit 2300 converts an input signal received via the fifth input unit 2150 to a source sound mute command. In case of a state that a per-source menu image is displayed on the display, the control unit 2300 converts an input signal received via the pointing device 2160b or the direction key 2160a to a per-source level adjust command. In case of a state that an ambience image is displayed on the display, the control unit 2300 converts an input signal received via the pointing device 2160b or the direction key 2160a to an ambience adjust command. In the course of converting each of the above-described input signals to the corresponding command, the control unit 2300 is able to refer to each of the per-key command informations stored in the memory unit 2200.

The wireless communication unit 2500 transfers the command converted by the control unit 2300 to an external device (particularly, the first interface device 550). In case that the first interface device 550 transmits the data about the per-source menu image or the data about the ambience image, the wireless communication unit 2500 receives the transmitted data.

Figure 20:
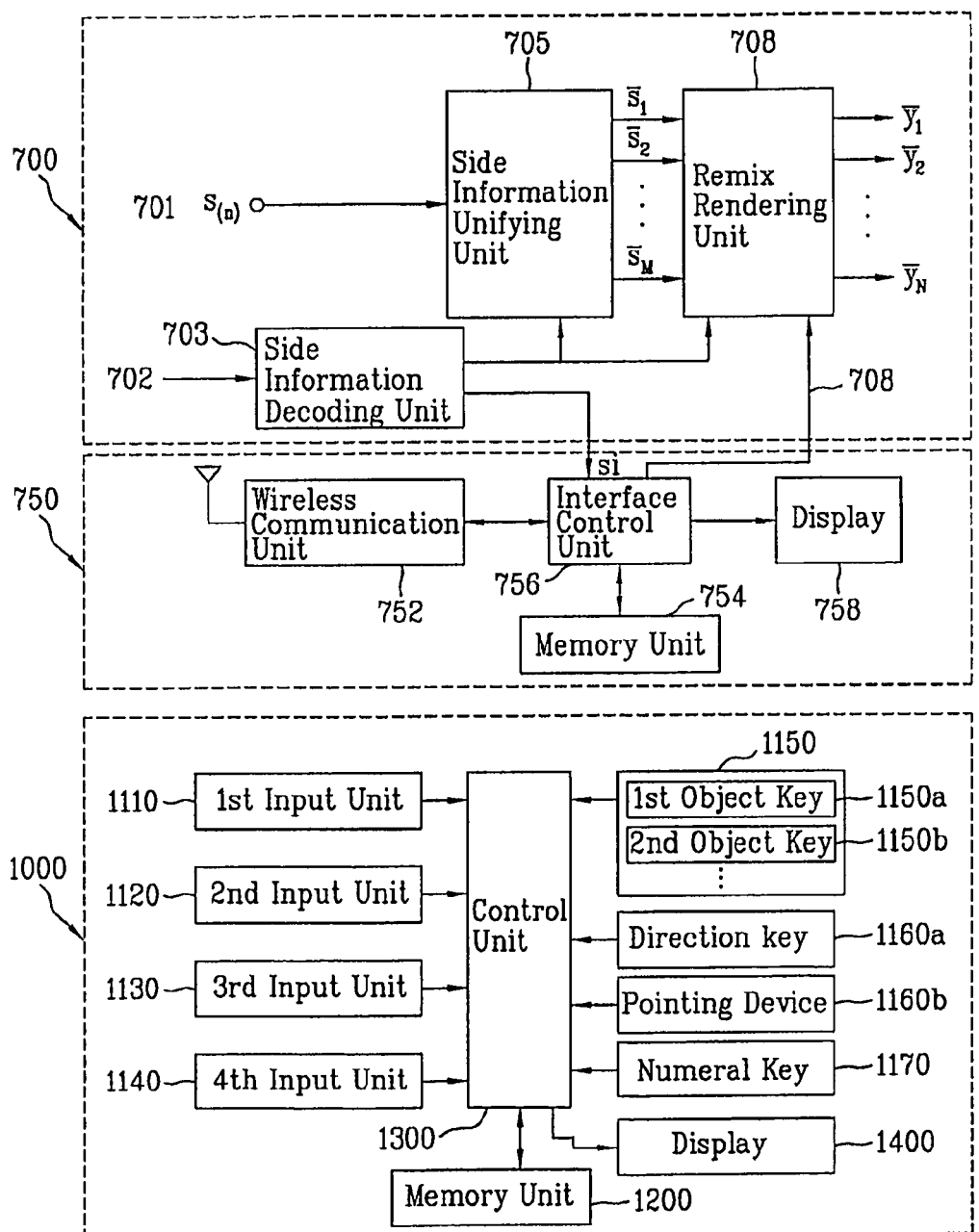
FIG. 20 is a block diagram of a first remix signal decoding device interconnected to an input apparatus according to one embodiment of the present invention.

FIG. 20 is a block diagram of a second remix signal decoding device and a second interface device interconnected to an input apparatus according to one embodiment of the present invention.

Referring to FIG. 20, an input apparatus 1000 is interconnected to a first remix signal decoding device 500. Since, the first remix signal decoding device 500 is already described with reference to FIG. 5, its details are omitted in the following description. A second interface device 750 receives source information (si) not from the first remix signal decoding device 500 but from a second remix signal decoding device 700. And, the rest of elements 752, 754, 756 and 758 of the second interface 750 are almost identical to the former elements 552, 554, 556 and 558 of the first interface device 550, respectively, of which details are omitted in the following description.

Figure 21:
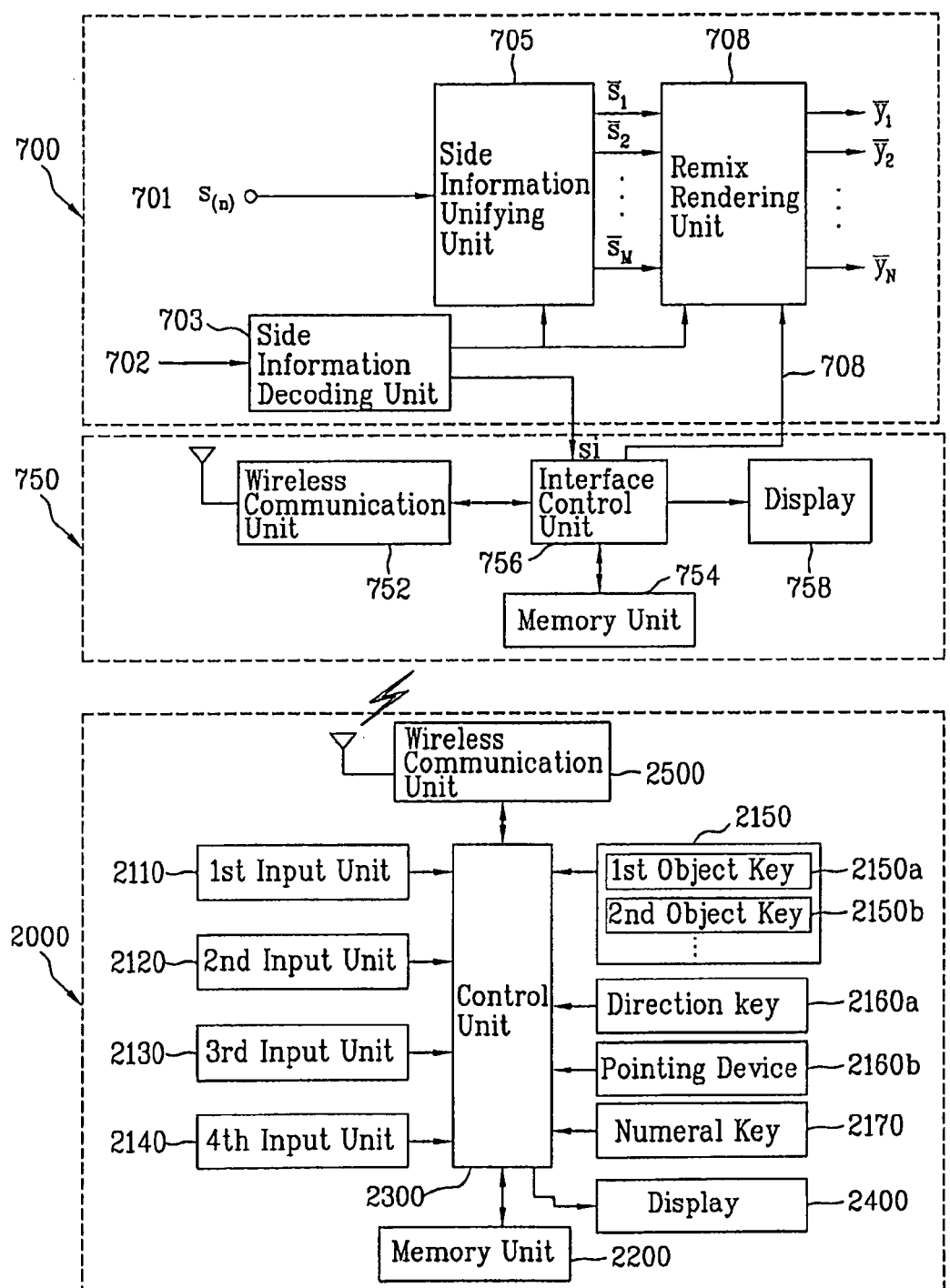
FIG. 21 is a block diagram of a second remix signal decoding device and a second interface device interconnected to an input apparatus according to another embodiment of the present invention.

FIG. 21 is a block diagram of a second remix signal decoding device and a second interface device interconnected to an input apparatus according to another embodiment of the present invention.

Referring to FIG. 21, an input apparatus 2000 is interconnected to a second remix signal decoding device 700 and a second interface device 750. Since, the second remix signal decoding device 700 is already described with reference to FIG. 7, its details are omitted in the following description. A second interface device 750 receives source information (si) not from the first remix signal decoding device 500 but from a second remix signal decoding device 700 and then inputs control information 708 to the second remix signal decoding device 700. And, the rest of elements 752, 754, 756 and 758 of the second interface 750 are almost identical to the former elements 552, 554, 556 and 558 of the first interface device 550, respectively, of which details are omitted in the following description.

Figure 22:
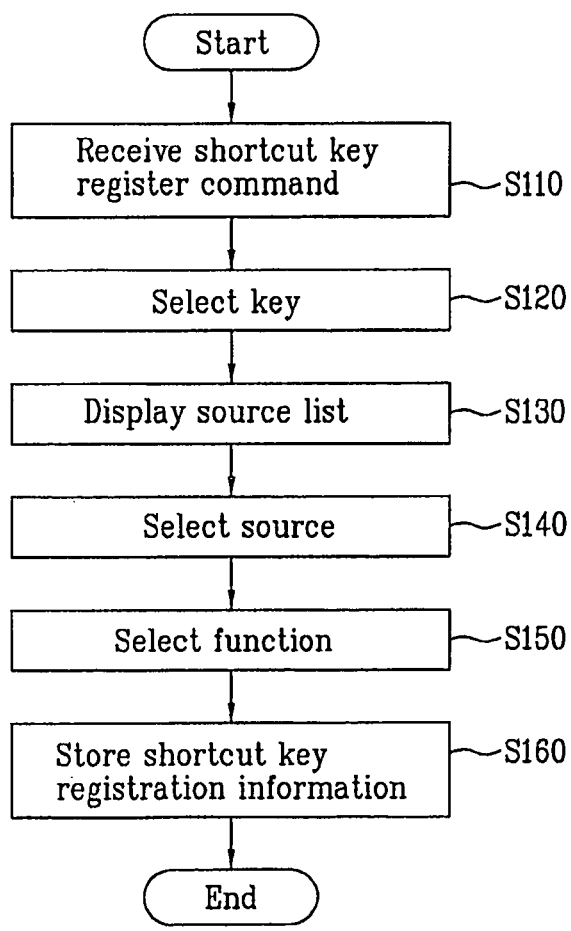
FIG. 22 is a flowchart of an input method according to an embodiment of the present invention.

FIG. 22 is a flowchart of an input method according to an embodiment of the present invention.

Referring to FIG. 22, if a user selects a shortcut key registration, an input apparatus receives a shortcut key register command [S110]. FIG. 23 shows an example of an image displayed after a shortcut key register command has been inputted. Subsequently, the user selects a key (e.g., key #1) to use as a shortcut key from a plurality of keys (e.g., numeral key) provided to the input apparatus [S120]. The input apparatus displays a list of sources usable for a mix signal [S130]. For instance, sources usable for a mix signal include a voice audio signal, a per-instrument audio signal (voice, piano, violin, flute, etc.). If so, the user selects a source to match a shortcut key by selecting one from a list of the sources [S140]. For instance, the user is able to select a piano. Subsequently, the user selects a function (e.g., sound mute) to use for a shortcut key from at least one or more functions (e.g., sound mute, ambience adjust, etc.) [S150]. Thus, if the use selects the key, the source and the function via the steps S120, S140 and S150, the input apparatus stores the selected key, the selected source and the selected function as shortcut key information [S160]. For instance, the input apparatus stores them in a manner of matching a sound mute command of a piano signal to a key #1. If so, in case that the key #1 is inputted, the input apparatus converts an input signal of the key #1 to a sound mute command of the piano signal.

Figure 24:
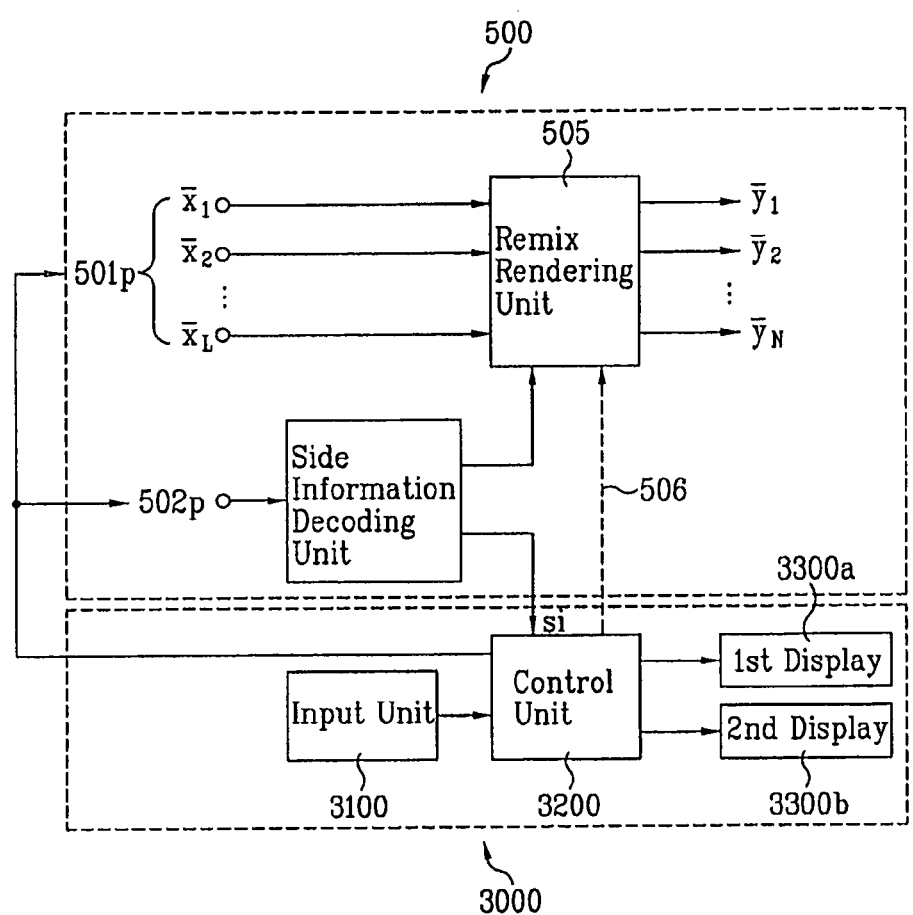
FIG. 24 is a block diagram of an interface displaying apparatus according to one embodiment of the present invention.
Figure 25A:
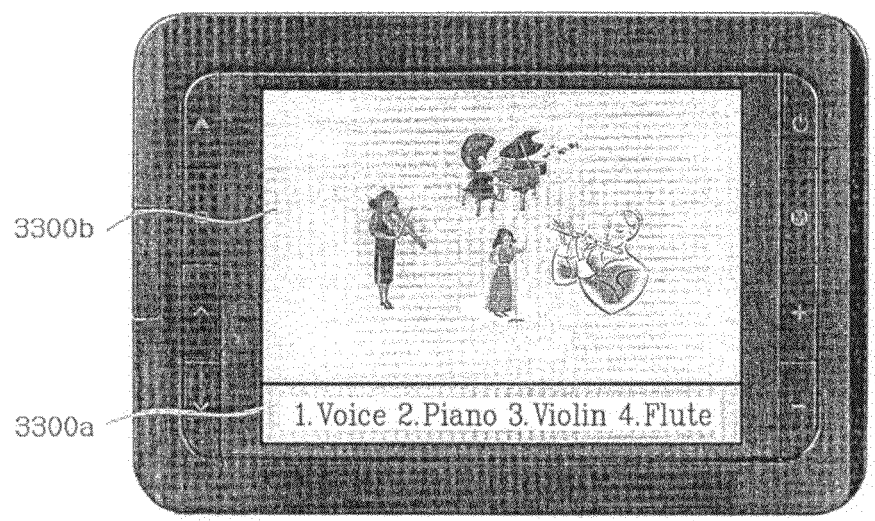
FIG. 25A and FIG. 25B are exemplary diagrams of implementations of an interface displaying apparatus according to one embodiment of the present invention.
Figure 25B:
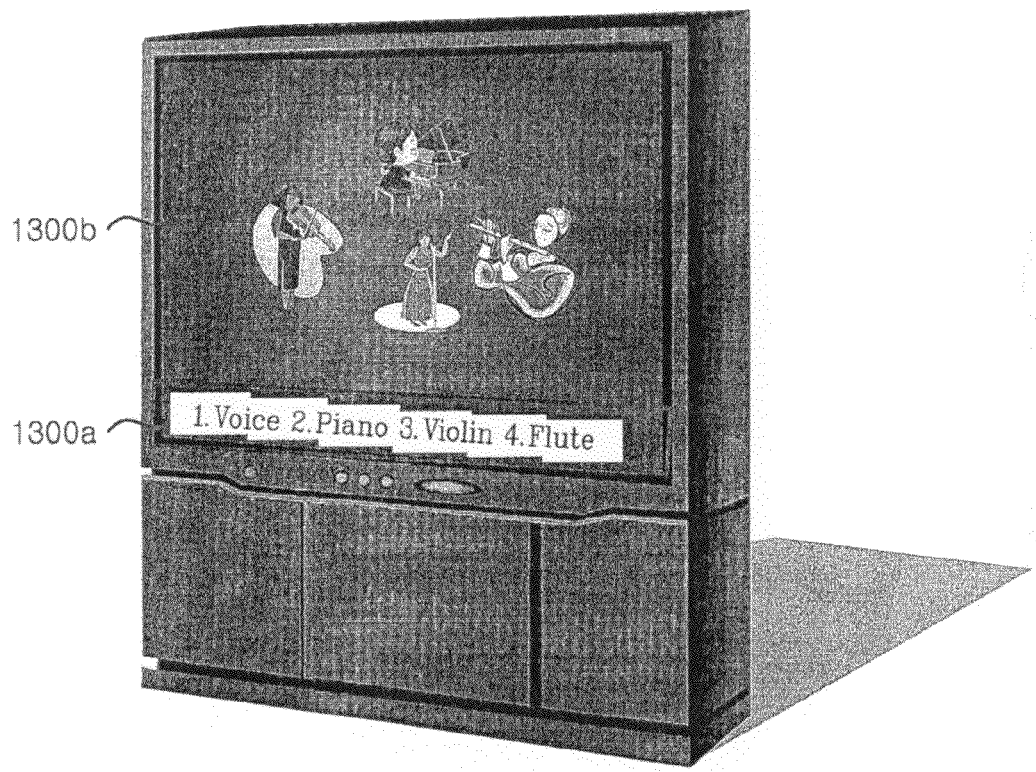

FIG. 24 is a block diagram of an interface displaying apparatus according to one embodiment of the present invention, and FIG. 25A and FIG. 25B are exemplary diagrams of implementations of an interface displaying apparatus according to one embodiment of the present invention.

Referring to FIG. 24, FIG. 25A and FIG. 25B, an interface displaying apparatus 3000 according to one embodiment of the present invention is interconnected to a first remix signal decoding device 500. And, the interface displaying apparatus 3000 includes an input unit 3100, a control unit 3200, a first display 330a, and a second display 3300b. In this case, the first remix signal decoding device 500 includes a side information decoding unit 503 and a remix rendering unit 505 and has the almost same configuration and functions of the former remix signal decoding device described with reference to FIG. 5, of which details shall be omitted in the following description.

The input unit 3100 is an input device to select one of a plurality of mix signals. In this case, the mix signal can include the per-channel audio signal 501 described with reference to FIG. 5. A mix signal 501p selected from a plurality of mix signals by the input unit 3100 and a side information signal 502p of the mix signal 501p are inputted to the first remix signal decoding device 500. The input unit 3100 may be provided to select one of sources included in a mix signal and may be further provided to input a command for level adjustment of a source signal, a command for per-subband level adjustment (equalizer adjustment) of a source signal, and a command for ambience adjustment of a source signal. The input unit 3100 can be implemented with a direction key, a touch-wheel or the like as well as such a pointing device as a mouse, a trackball, a touchpad and the like. And, it is also understood that the input unit 3100 can be implemented with a remote controller using wireless communication such as infrared communication.

The control unit 3200 inquires source signal information (si) corresponding to the mix signal 501p selected by the input unit 3100, configures a list of source signals (hereinafter called a list of source) based on the source signal information (si), and then displays the list of source on the first display 3300a. In this case, the source signal information (si) is the information about a source signal included in the mix signal 501p selected by the input unit 3100 and may be the information that includes a musical instrument name of each source signal and the like. Moreover, the source signal information (si) can be the information on the former source signal 102 described with reference to FIG. 1. Meanwhile, the source signal information (si) may further include metadata (instrument player name, manufacturing date, etc.). Meanwhile, the source signal information (si) may be the information received by the control unit 3200 from the side information decoding unit 503 of the first remix signal decoding device 500. In this case, the list of source can include at least one of a musical instrument name of the source signal 502p, a singer name and a character.

In case of receiving one of various commands (command for level adjustment of source signal, command for per-subband level adjustment of source signal, command for ambience adjustment of source signal, etc.) about remixing from the input unit 3100, the control unit 3200 converts the corresponding command to control information 506 and then inputs it to the remix rendering unit 505. In this case, the control information 506 may be identical to the former control information 506 described with reference to FIG. 5 or the control information 608 described with reference to FIG. 6, of which details shall be omitted in the following description.

The first display 3300a is a display on which the list of source is displayed under the control of the control unit 3200. The list of source displayed on the first display 3300a keeps being displayed on the first display 3300a while the mix signal is selected. In this case, 'while the mix signal is selected' means that 'a selected mix signal is being played or remixed (level adjustment, ambience adjustment, etc.)'. If a user selects a different mix signal, a list of source matching the different mix signal is displayed on the first display 3300a. In this case, the first display 3300a can be implemented with a liquid crystal display (LCD) or a matrix of a multitude of light emitting devices, by which various implementations of the present invention are not restricted. In case that the first display 3300a is implemented with a multitude of light emitting devices, a list of source can be displayed by flickering of a multitude of the light emitting devices.

Figure 26:
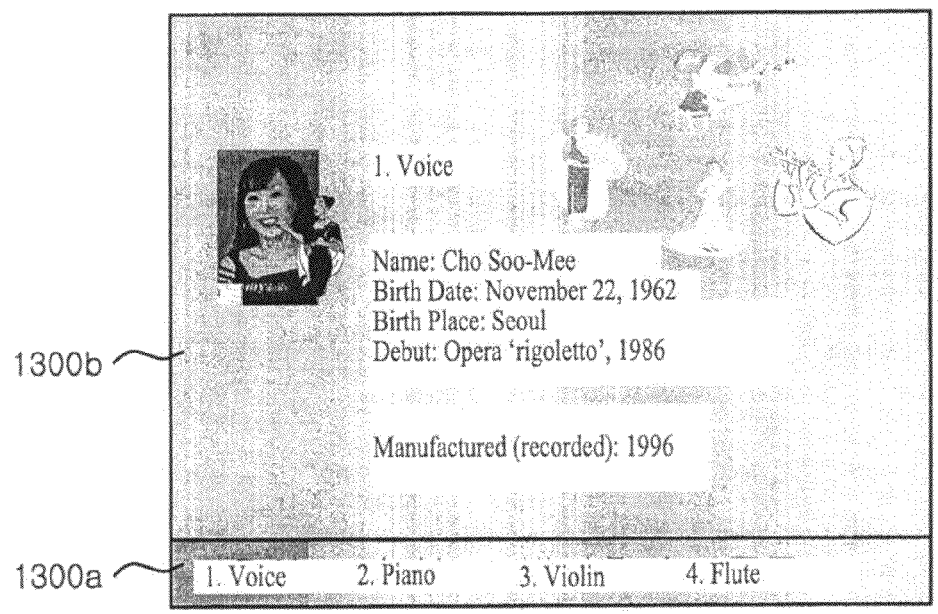
FIG. 26 is an exemplary diagram of an image displayed on a first display and a second display if a specific source is selected.
Figure 27:
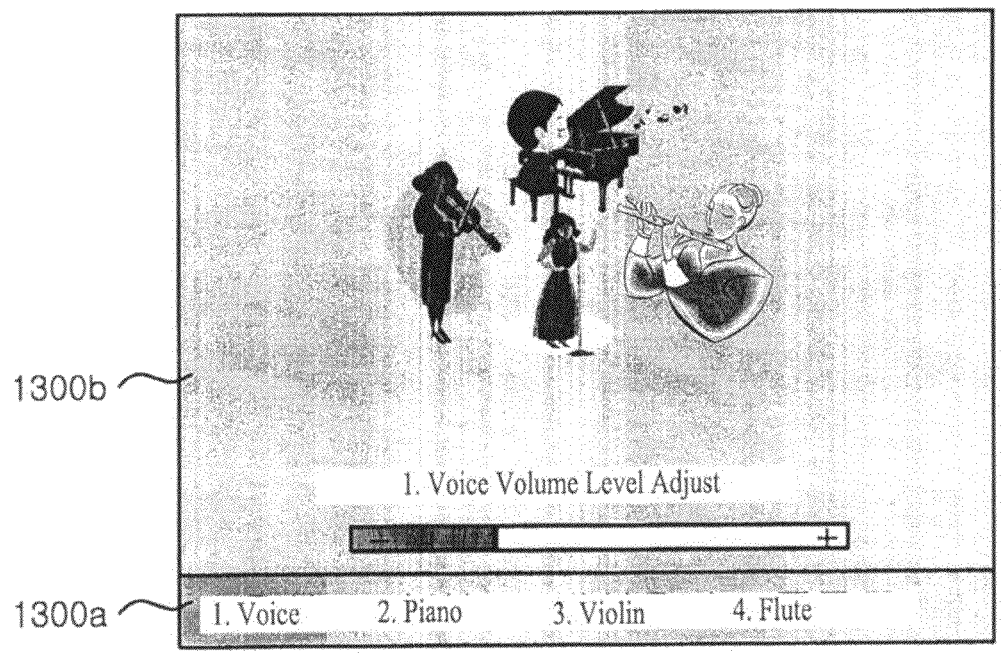
FIG. 27 is another exemplary diagram of an image displayed on a first display and a second display if a specific source is selected.
Figure 28:
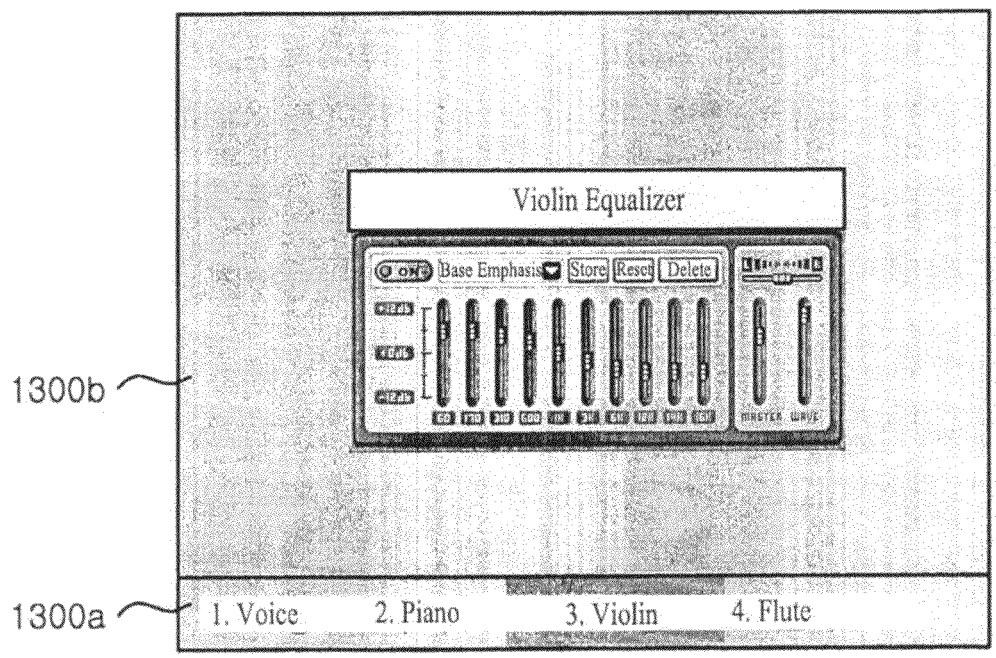
FIG. 28 is a further exemplary diagram of an image displayed on a first display and a second display if a specific source is selected.
Figure 29:
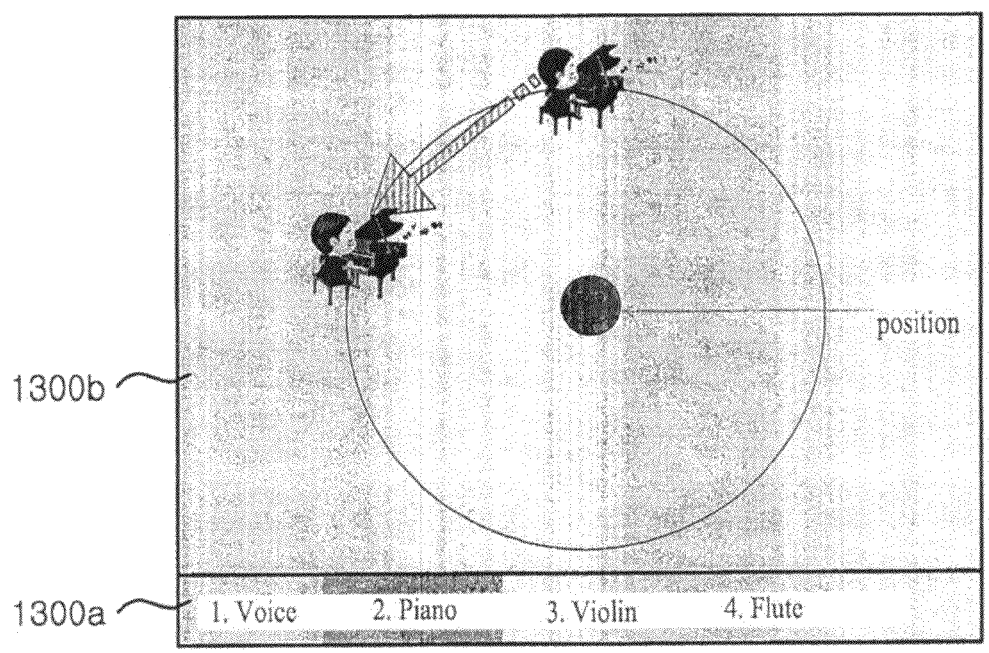
FIG. 29 is another further exemplary diagram of an image displayed on a first display and a second display if a specific source is selected.

The second display 3300b is a display on which metadata, a volume level adjust image, an equalizer adjust image, an ambience adjust image or the like is displayed. FIGS. 26 to 29 show examples of images displayed on the first or second display, respectively if a specific source is selected. In FIG. 26, in case that '1. Voice' is selected from a source list displayed on the first display 3300a, shown is a case that metadata of a selected source (1. Voice) is displayed on the second display 3300b. In FIG. 27, shown is a case that a volume level adjust image of the selected source (1. Voice) is displayed on the second display 3300b. In FIG. 28, shown is a case that an equalizer adjust image (per-subband level adjust image) of a selected source (3. Violin) is displayed on the second display 3300b. In FIG. 29, shown is a case that an ambience adjust image of a selected source (2. Piano) is displayed on the second display 3300b. Comparing FIGS. 26 to 29 to each other, even if the image displayed on the second display 3300b keeps being changed, it can be observed that the list of source keeps being displayed on the first display 3300a.

Meanwhile, since the second display 3300b and the first display 3300a need not to be separated from each other mechanically or in configuration, it is understood that both of the second display 3300b and the first display 3300a can be implemented with a single panel.

Figure 30:
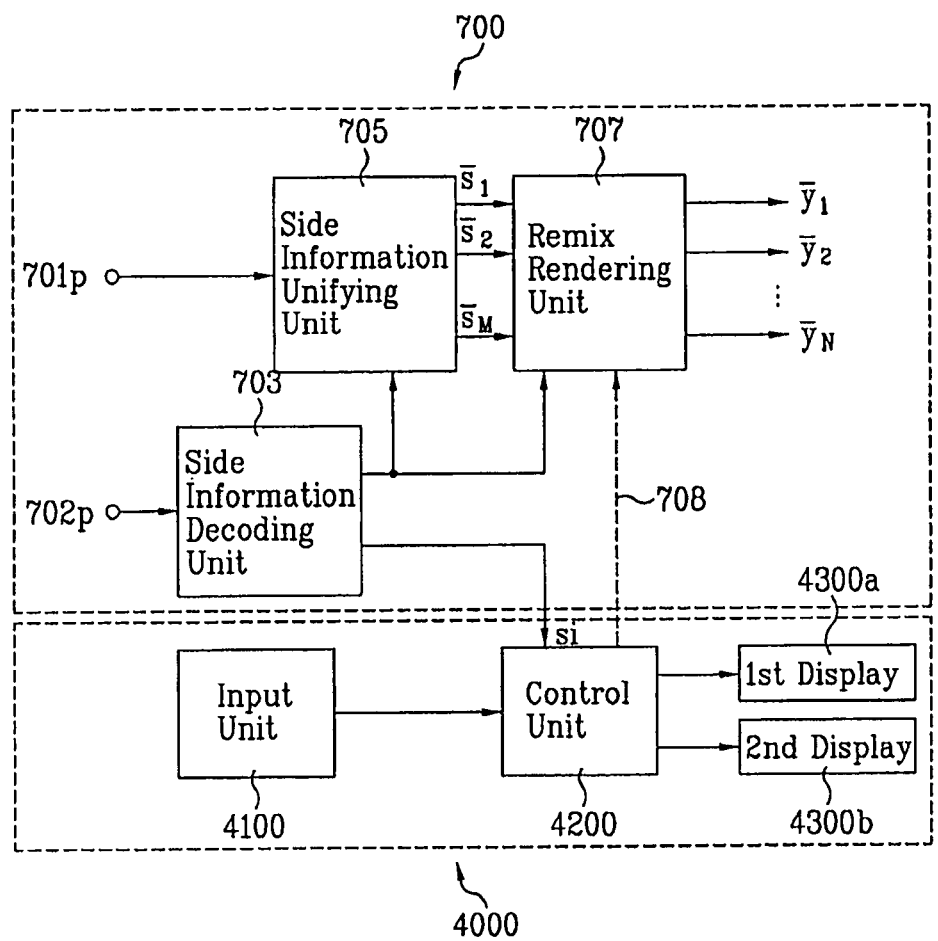
FIG. 30 is a block diagram of an interface displaying apparatus according to another embodiment of the present invention.

FIG. 30 is a block diagram of an interface displaying apparatus according to another embodiment of the present invention.

Referring to FIG. 30, an interface displaying apparatus 4000 according to another embodiment of the present invention includes an input unit 4100, a control unit 4200, a first display 4300a, and a second display 4300b and is interconnected to a second remix signal decoding device 700. In this case, the second remix signal decoding device 700 includes a side information decoding unit 703, a side information unifying unit 705, and a remix rendering unit 707. And, the second remix signal decoding device 700 has the almost same configuration and function of the former second remix signal decoding device described with reference to FIG. 7, of which details shall be omitted in the following description.

Meanwhile, comparing the interface displaying apparatus 4000 according to another embodiment of the present invention to the former interface displaying apparatus 4000 according to one embodiment of the present invention, it differs only in being interconnected to the second remix signal decoding device 700 instead of the first remix signal decoding device 500 and in that a synthetic object signal 701p is inputted instead of the mix signal 501p. Its respective elements 4100, 4200, 4300a and 4300b are almost identical to the elements 4100, 4200, 4300a and 4300b of the same names of the former interface displaying apparatus 4100 according to one embodiment of the present invention, of which details shall be omitted in the following description.

Figure 31:
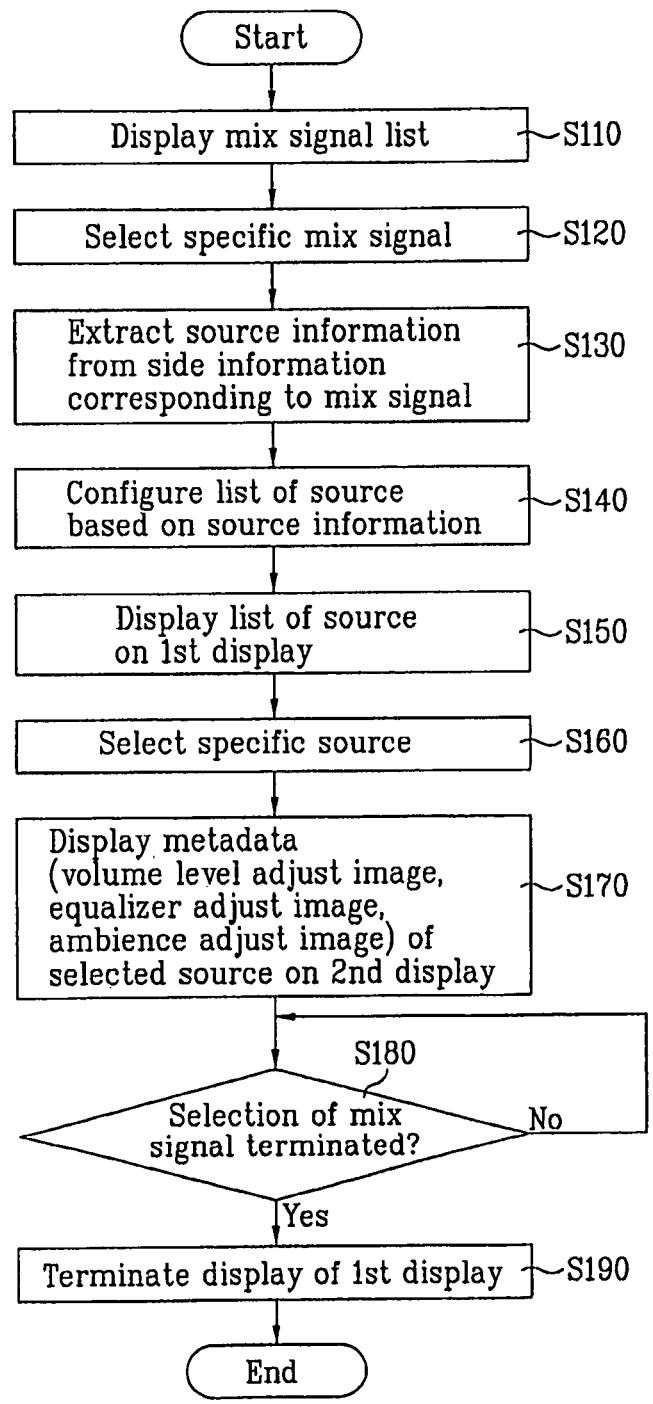
FIG. 31 is a flowchart of an interface displaying method according to an embodiment of the present invention.

FIG. 31 is a flowchart of an interface displaying method according to an embodiment of the present invention. First of all, a terminology 'mix signal' used in the following description should be understood as including a concept of a synthetic object signal. And, an interface displaying method according to an embodiment of the present invention can be carried out by the interface displaying apparatus 3000 according to one embodiment of the present invention or the other interface displaying apparatus 2000 according to another embodiment of the present invention.

Referring to FIG. 31, an interface displaying apparatus displays information on at least one or more mix signals, which are already stored or transferable, as a list of mix signals on a display [S210]. If so, a user selects a specific mix signal to play or remix from the list of the mix signals displayed in the step S210 using an input device [S220]. If so, the interface displaying apparatus extracts source signal information corresponding to the mix signal from side information corresponding to the mix signal selected in the step S220. Then, the interface displaying apparatus extracts source signal information corresponding to the mix signal from the side information corresponding to the mix signal selected in the step S220 [S230].

The interface displaying apparatus configures a list of source based on the source signal information extracted in the step S230. Subsequently, the interface displaying apparatus displays the list of source on a first display [S250].

A user checks the list of source displayed on the first display and then selects one from the list of source [S260]. If so, the interface displaying apparatus displays metadata (volume level adjust image, equalizer adjust image, ambience adjust image or the like in accordance with setup) of the source, which is selected in the step S260, on a second display [S270].

Subsequently, after completion of the selection of the mix signal selected in the step S220 (e.g., if the user terminates the playback of the corresponding mix signal or selects another mix signal), the display of the list of source having started from the step S250 is then terminated [S290].

Figure 32:
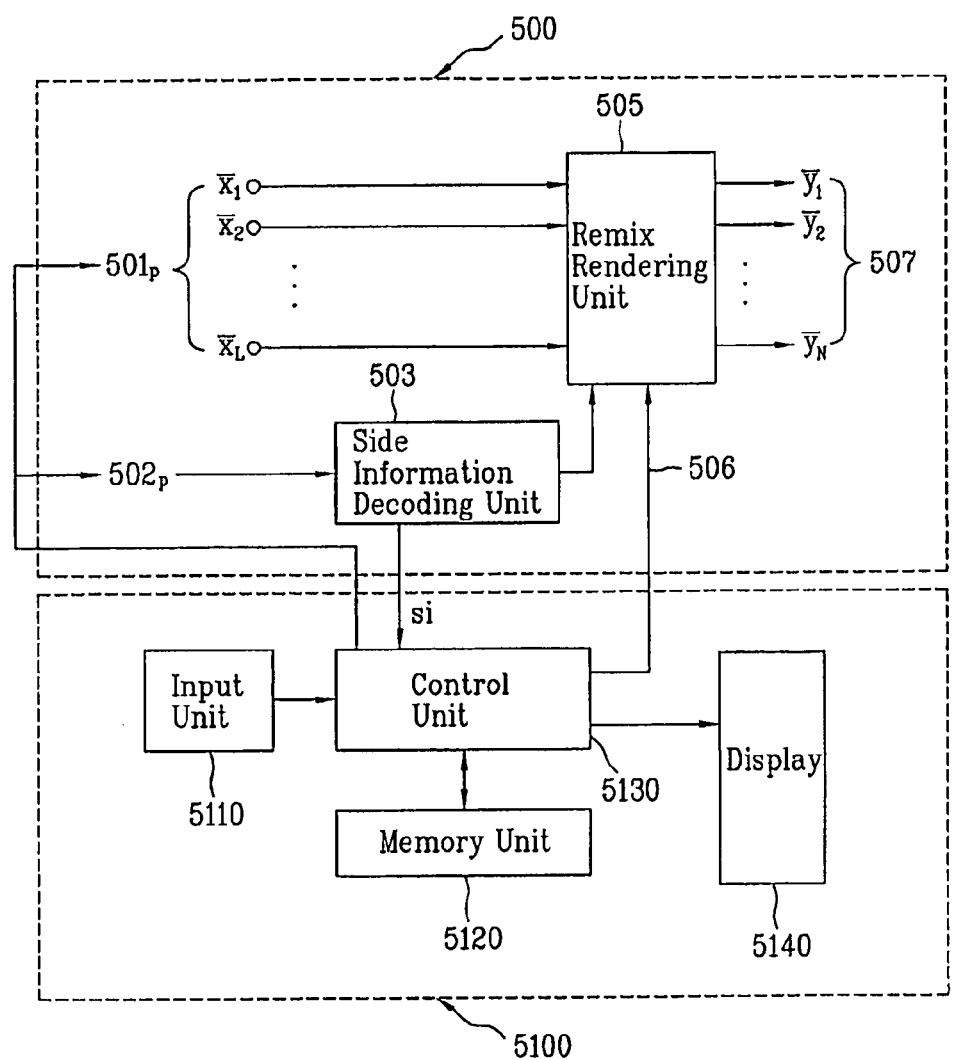
FIG. 32 is a block diagram of an interface displaying apparatus according to one embodiment of the present invention.

FIG. 32 is a block diagram of an interface displaying apparatus according to one embodiment of the present invention.

Referring to FIG. 32, an interface displaying apparatus 5100 according to one embodiment of the present invention includes an input unit 5110, a memory unit 5120, a control unit 5130, and a display 5140 and is interconnected to a first remix signal decoding device 500. In this case, the first remix signal decoding device 500 includes a side information decoding unit 503 and a remix rendering unit 506. And, the first remix signal decoding device 500 has the almost same configuration and function of the former first remix signal decoding device described with reference to FIG. 5, of which details shall be omitted in the following description.

The input unit 5110 is an input device to select one of a plurality of mix signals. In this case, the mix signal can include the former mix signal (per-channel audio signal) 501 described with reference to FIG. 5. A mix signal 501p selected from a plurality of the mix signals by the input unit 5110 and a side information signal 502p of the selected mix signal 501p are inputted to the first remix signal decoding device 500. The input unit 5110 may be provided to input a command for level adjustment of source signal, a command for per-subband level adjustment of source signal, and a command for ambience adjustment of source signal. The input unit 5110 can be implemented with a direction key, a touch-wheel or the like as well as a pointing device such as a mouse, a trackball, a touchpad, and the like. And, it is a matter of course that the input unit 5110 can be implemented with a remote controller using wireless communication such as infrared communication and the like.

The memory unit 5120 is a storage device in which per-icon image data is stored. In particular, a category and keyword corresponding to an icon can be stored in the memory unit 5120 together. And, the icon can be represented as not only a text but as an image using image data.

The control unit 5130 inquires source signal information (si) corresponding to the mix signal 501p selected by the input unit 5110 and then displays an icon corresponding to a source signal based on the source signal information (si). In this case, the source signal information (si) is the information about a source signal included in the mix signal 501p selected by the input unit 5110 and may be the information that includes a musical instrument name of each source signal and the like. Moreover, the source signal information (si) can be the information on the former source signal 102 described with reference to FIG. 1. Meanwhile, the source signal information (si) may further include metadata (instrument player name, vocalist name, etc.). Meanwhile, the source signal information (si) may be the information received by the control unit 5130 from the side information decoding unit 503 of the first remix signal decoding device 500.

Meanwhile, the icon corresponding to the source signal can be represented as a text or as an image using the image data stored in the memory unit 5120 as well.

In case of receiving one of various commands (command for level adjustment of source signal, command for per-subband level adjustment of source signal, command for ambience adjustment of source signal, etc.) about remixing from the input unit 5110, the control unit 5130 converts the corresponding command to control information 506 and then inputs it to the remix rendering unit 505. In this case, the control information 506 may be identical to the former control information 506 described with reference to FIG. 5 or the control information 608 described with reference to FIG. 6, of which details shall be omitted in the following description.

And, the display 5140 is a display device on which an icon corresponding to a source signal is displayed under the control of the control unit 5130.

FIGS. 33A to 33D are exemplary diagrams for implementations of an interface displaying apparatus according to one embodiment of the present invention.

Figure 33A:
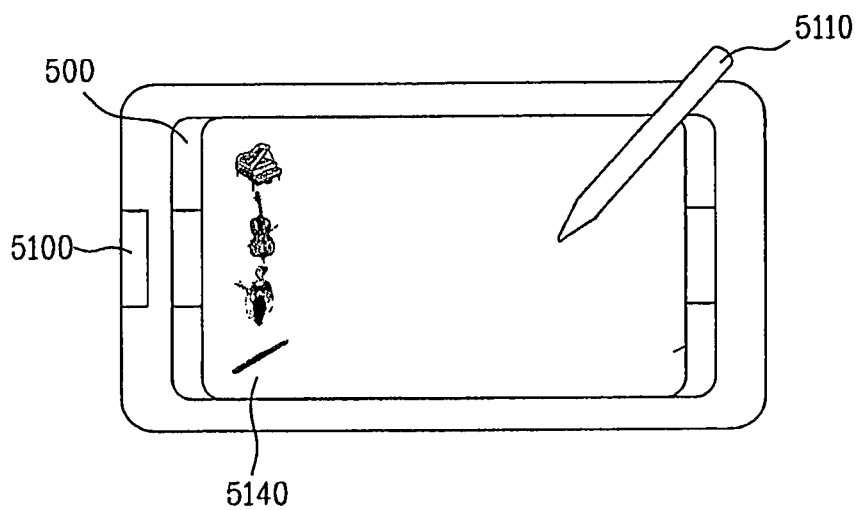
FIGS. 33A to 33D are exemplary diagrams for implementations of an interface displaying apparatus according to one embodiment of the present invention.
Figure 33B:
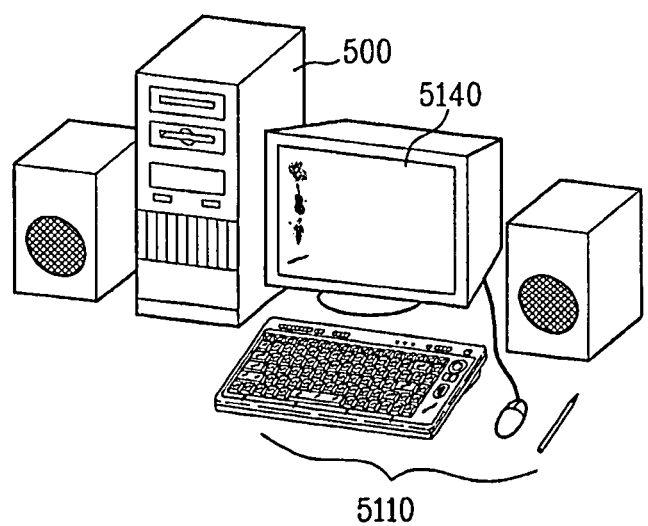
Figure 33C:
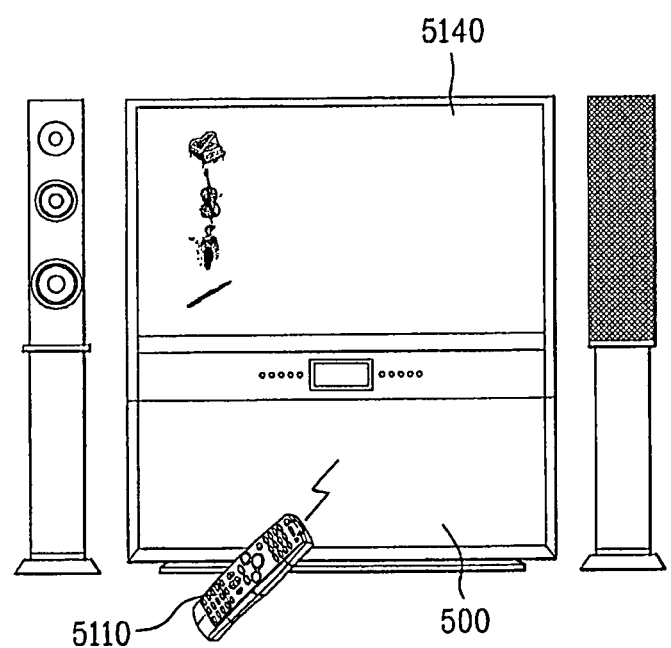
Figure 33D:
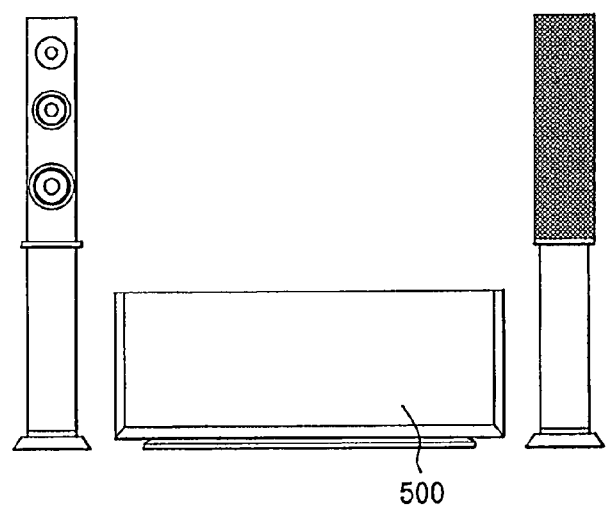
Figure 33D:
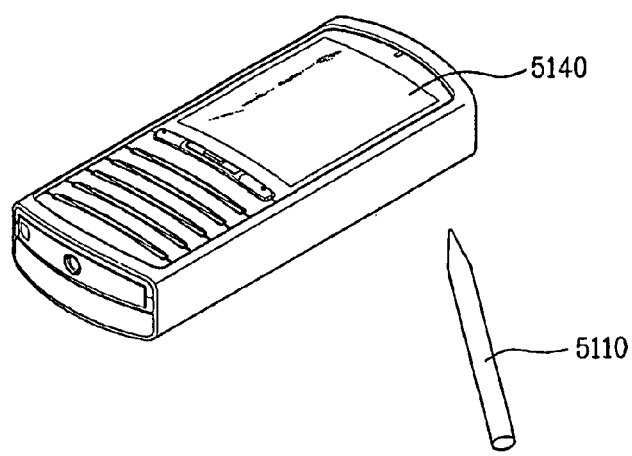

First of all, FIG. 33A shows that an interface displaying apparatus according to one embodiment of the present invention, which is built in one body of a first remix signal decoding device 500, into a mobile terminal. FIG. 33B shows that an input unit 51110 of an interface displaying apparatus 5100 according to one embodiment of the present invention is implemented with a mouse connected to a first remix signal decoding device 500 by wire and a touch-pen. And, it can be observed that a display 5140 is a monitor connected to the first remix signal decoding device 500 by wire like the input unit 5110. FIG. 33D shows that an input device 5110 is implemented with a remote controller performing wireless communication with a first remix signal decoding device 500 although a display 5140 of an interface displaying apparatus 5100 according to one embodiment of the present invention is connected to the first remix signal decoding device 500 by wire. Referring to FIG. 33D, it can be observed that the input unit 5110 of the interface displaying apparatus 5100 according to one embodiment of the present invention is implemented with a remote controller like the case shown in FIG. 33C. And, it is also observed that the display 5140 is provided to the remote controller. Thus, the interface displaying apparatus 5100 according to one embodiment of the present invention and the first remix signal decoding device 500 can be implemented in various configurations.

Figure 34:
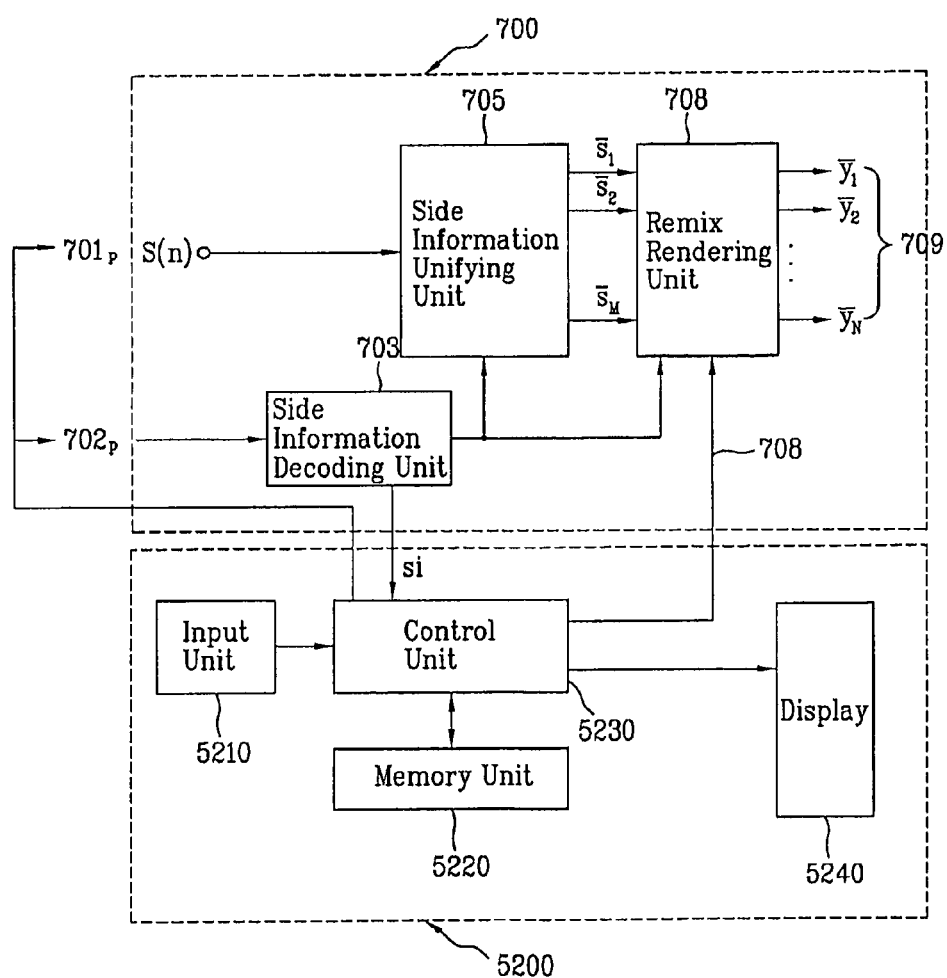
FIG. 34 is a block diagram of an interface displaying apparatus according to another embodiment of the present invention.

FIG. 34 is a block diagram of an interface displaying apparatus according to another embodiment of the present invention.

Referring to FIG. 34, an interface displaying apparatus 5200 according to another embodiment of the present invention includes an input unit 5210, a memory unit 5220, a control unit 5230, and a display 5240 and is interconnected to a second remix signal decoding device 700. In this case, the second remix signal decoding device 700 includes a side information decoding unit 703, a side information unifying unit 705, and a remix rendering unit 707. And, the second remix signal decoding device 700 has the almost same configuration and function of the former second remix signal decoding device described with reference to FIG. 7, of which details shall be omitted in the following description.

Meanwhile, comparing the interface displaying apparatus 5200 according to another embodiment of the present invention to the former interface displaying apparatus 5100 according to one embodiment of the present invention, it differs only in being interconnected to the second remix signal decoding device 700 instead of the first remix signal decoding device 500 and in that a synthetic object signal 701p is inputted instead of the mix signal 501p. Its respective elements 5210, 5220, 5230 and 5240 are almost identical to the elements 5110, 5120, 5130 and 5140 of the same names of the former interface displaying apparatus 5100 according to one embodiment of the present invention, of which details shall be omitted in the following description.

Figure 35A:
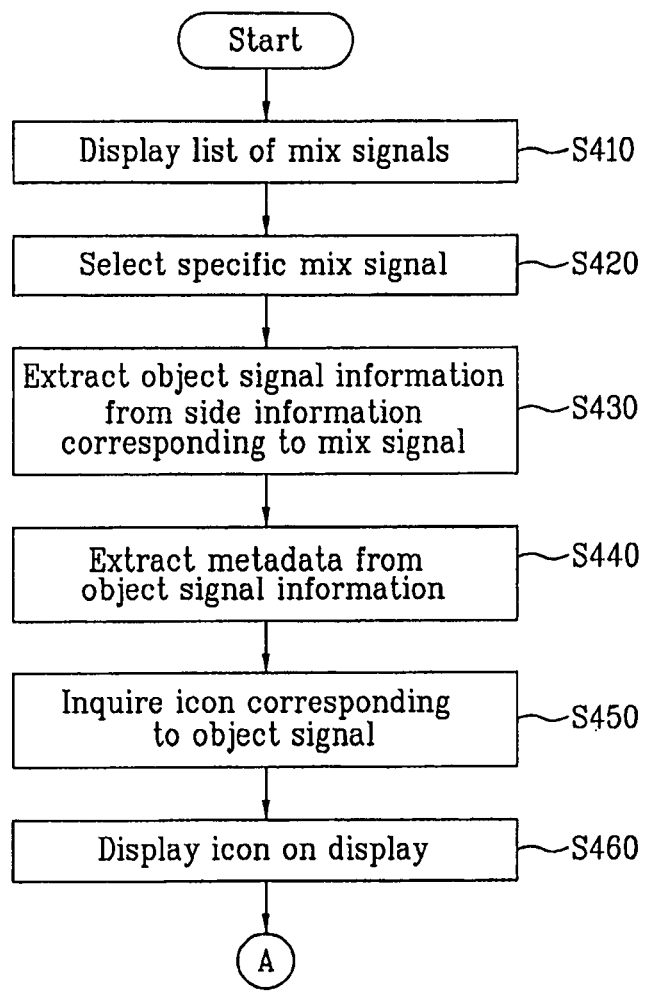
FIG. 35A and FIG. 35B are flowcharts of an interface displaying method according to one embodiment of the present invention.
Figure 35B:
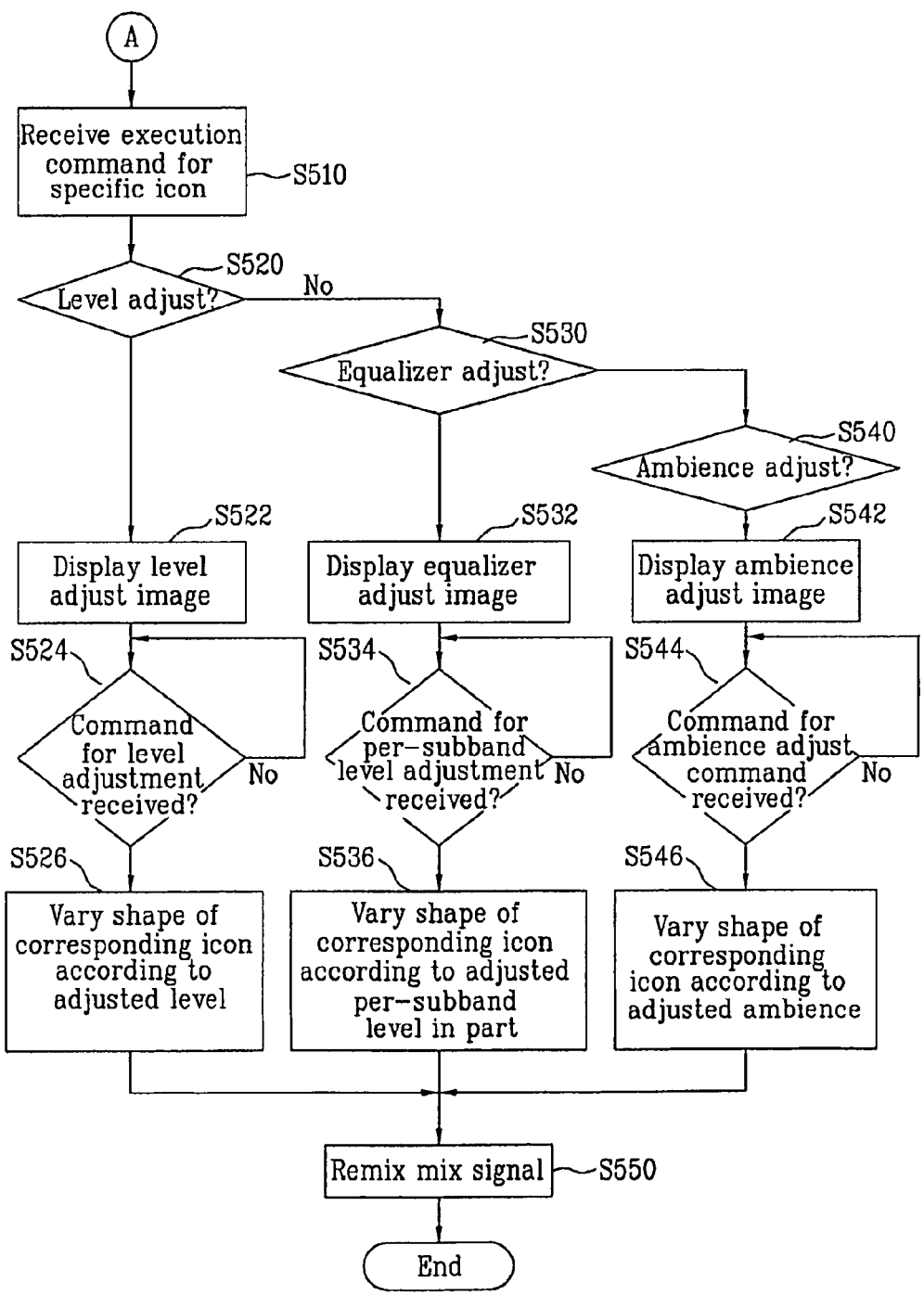

FIG. 35A and FIG. 35B are flowcharts of an interface displaying method according to one embodiment of the present invention. First of all, a terminology 'mix signal' used in the following description should be understood as including a concept of a synthetic object signal. And, an interface displaying method according to one embodiment of the present invention can be carried out by the interface displaying apparatus 5100 according to one embodiment of the present invention or the other interface displaying apparatus 5200 according to another embodiment of the present invention.

Referring to FIG. 35A, an interface displaying apparatus displays information on at least one or more mix signals, which are already stored or transferable, as a list of mix signals on a display [S410]. If so, a user selects a specific mix signal to play or know its source signal information from the list of the mix signals displayed in the step S410 using an input device [S420]. If so, the interface displaying apparatus extracts source signal information corresponding to the mix signal from side information corresponding to the mix signal selected in the step S420. Then, the interface displaying apparatus extracts source signal information corresponding to the mix signal from the side information corresponding to the mix signal selected in the step S420 [S430]. In case that metadata of the mix signal is included in the source signal information extracted in the step S430, the interface displaying apparatus extracts the metadata from the source signal information [S440].

Figure 36A:
FIG. 36A is an exemplary diagram of a screen on which an icon per a source signal of a specific mix signal is displayed.
Figure 36B:
FIG. 36B is an exemplary diagram of an image in which an icon per a source signal of a specific mix signal represents metadata.

Subsequently, the interface displaying apparatus inquires an icon corresponding to the source signal based on the source signal information extracted in the step S430 [S450]. In this case, the icon can be configured with text or image. In case that the metadata is extracted in the step S440, it is able to inquire an image that matches the extracted metadata. The icon inquired in the step S450 is then displayed on the display [S460]. FIG. 36A shows an example of a screen on which an icon per a source signal of a specific mix signal is displayed. Referring to FIG. 36A, in case that source signal information includes 'piano, violin, vocalist (female), flute', icons respectively corresponding to a piano, a violin, a vocalist (female) and a flute are displayed on a screen. Thus, by the interface displaying method according to the embodiment of the present invention, an icon for a specific mix signal is displayed through the steps S410 to S450. FIG. 36B shows an example of an image in which an icon per a source signal of a specific mix signal represents metadata. Referring to FIG. 36B, in case that metadata included in source signal information include 'piano player: Chung Myung-Hoon' and 'Vocalist: Cho Soo-Mee', an icon corresponding to a piano includes a picture of Chung Myung-Hoon and an icon corresponding to vocal music includes a picture of Cho Soo-Mee.

In the following description, a process following an execution of a specific one of icons displayed by the above-described steps is explained.

Referring to FIG. 35B, if a user selects one of icons displayed in the step S450 and then inputs an execution command for a specific icon, an interface displaying apparatus receives the execution command for the selected icon [S510]. An execution command for icon, i.e., a process carried out in case of executing an icon can differ in accordance with setup. And, three kinds of cases (level adjustment, equalizer adjustment, ambience adjustment) are explained as follows.

Figure 37A:
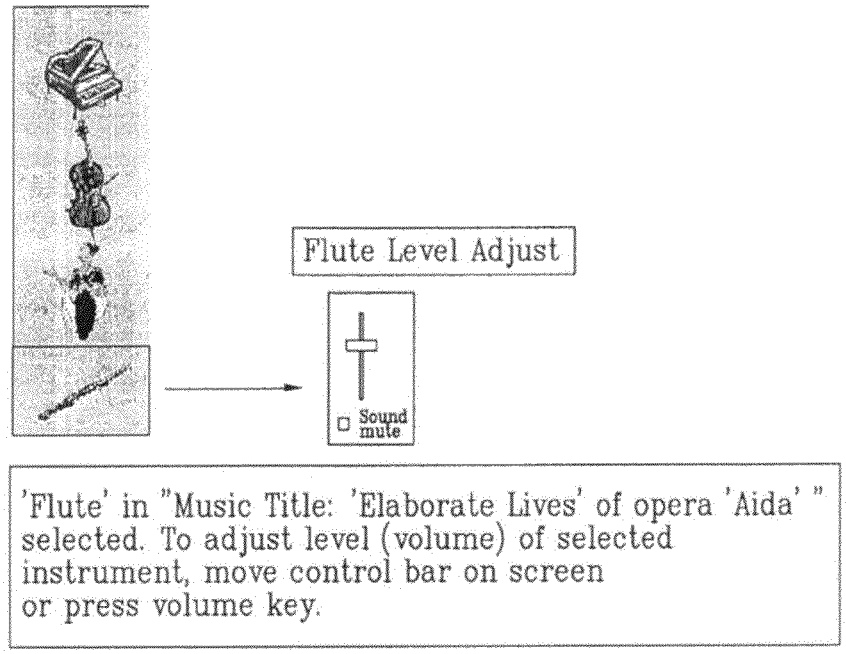
FIG. 37A is an exemplary diagram of a level adjust image.
Figure 37B:
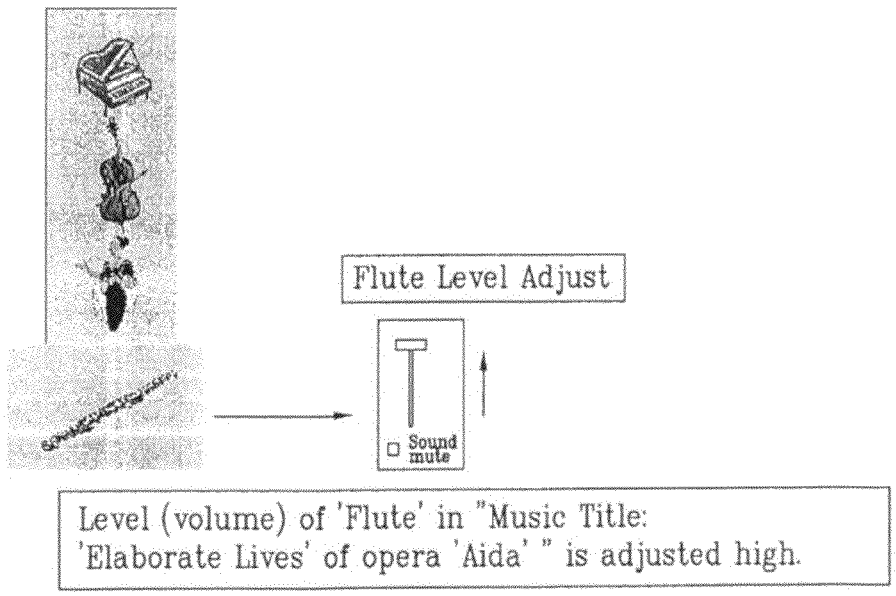
FIG. 37B is an exemplary diagram of an image on which a shape of an icon is modified in accordance with an adjusted level.

In case that an execution command of icon is set to a level adjustment (volume adjustment) ('yes' in the step S520), a level adjust image of a source signal corresponding to an icon executed in the step S510 is displayed [S522]. FIG. 37A is an exemplary diagram of a level adjust image. Referring to FIG. 37A, in case that an icon of 'flute' among total four icons is executed, a control bar capable of adjusting a level (volume) of a flute is displayed on a screen. A user is able to input a command for a level adjustment of a specific source signal (e.g., flute) by moving a control bar using a pointing device on the screen shown in FIG. 37A or using a direction key of a keypad or the like. Once the command for the level adjustment is received ('yes' in the step S524), a shape of an icon is modified in accordance with the adjusted level [S526]. In this case, the shape of the icon corresponds to a concept that includes at least one of size, color, and brightness. FIG. 37B is an exemplary diagram of an image on which a shape of an icon is modified in accordance with an adjusted level. Referring to FIG. 37B, as a level of a flute is adjusted high, it can be observed that a size of an icon corresponding to the flute is increased. Subsequently, by converting the level adjust command inputted in the step S524 to control information, the mix signal selected in the step S420 is remixed [S550]. In this case, the control information is the information inputted to the first remix signal decoding device or the second remix signal decoding device and has been explained in the description of the interface displaying apparatus according to one embodiment of the present invention. So, details thereof shall be omitted in the following description.

Figure 38:
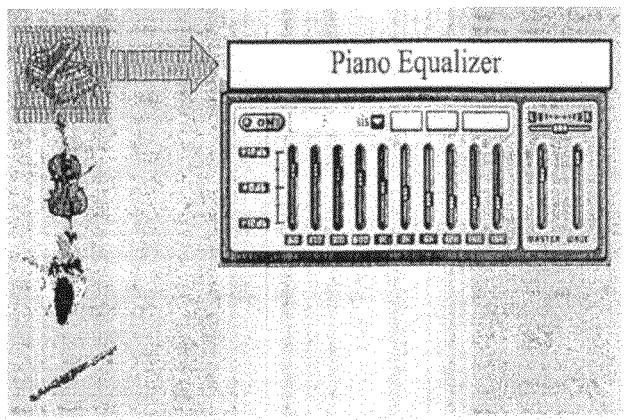
FIG. 38 is an exemplary diagram of an equalizer image (per-subband level adjust image)

In case that an execution command of icon is set to an equalizer adjustment (per-subband level adjustment) ('yes' in the step S530), a level adjust image of a source signal corresponding to the icon executed in the step S510 is displayed [S532]. FIG. 38 is an exemplary diagram of an equalizer image (per-subband level adjust image). In FIG. 3, shown is a screen on which per-subband control bars are displayed to adjust an equalizer of a piano in case that an icon 'piano' among total four icons is executed. A user is able to input a command for a per-subband level adjustment of a specific source signal (e.g., piano) on the screen shown in FIG. 38 in a manner of moving the per-subband control bars using a pointing device. Once the command for the per-subband level adjustment is received ('yes' in the step S534), a shape of an icon is partially modified in accordance with the adjusted per-subband level [S536]. For instance, in case that a level of low-frequency band is adjusted high, brightness of a portion corresponding to a left part of an icon can be dimmed down. Subsequently, by converting the per-subband level adjust command inputted in the step S534 to control information, the mix signal selected in the step S420 is remixed [S550].

Figure 39:
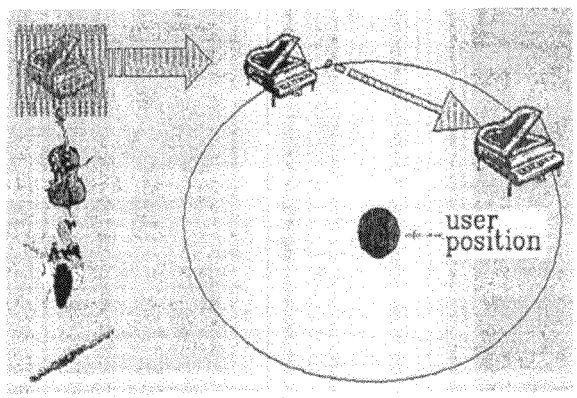
FIG. 39 is an exemplary diagram of an ambience adjust image (relative position adjust image)

In case that an execution command of icon is set to an ambience adjustment (relative position adjustment) ('yes' in the step S540), an ambience adjust image (relative position adjust image) of a source signal corresponding to the icon executed in the step S510 is displayed [S542]. FIG. 39 is an exemplary diagram of an ambience adjust image (relative position adjust image). In FIG. 39, shown is a screen on which a relative position of piano is displayed to enable an ambience of the piano to be adjusted in case that an icon 'piano' among total tour icons is executed. A user is able to input a command for an ambience adjustment of a specific source signal (e.g., piano) by moving icon using a pointing device, a direction key or the like on the screen shown in FIG. 39. Once the command for the ambience adjustment is received ('yes' in the step S544), a shape of icon is modified in accordance with the adjusted ambience [S546]. For instance, in case that an adjusted relative position of a source signal gets closer to a position of a user (listener), it is able to raise a brightness of the corresponding icon. Subsequently, by converting the ambience adjust command inputted in the step S544 to control information, the mix signal selected in the step S420 is remixed [S550].

Figure 40:
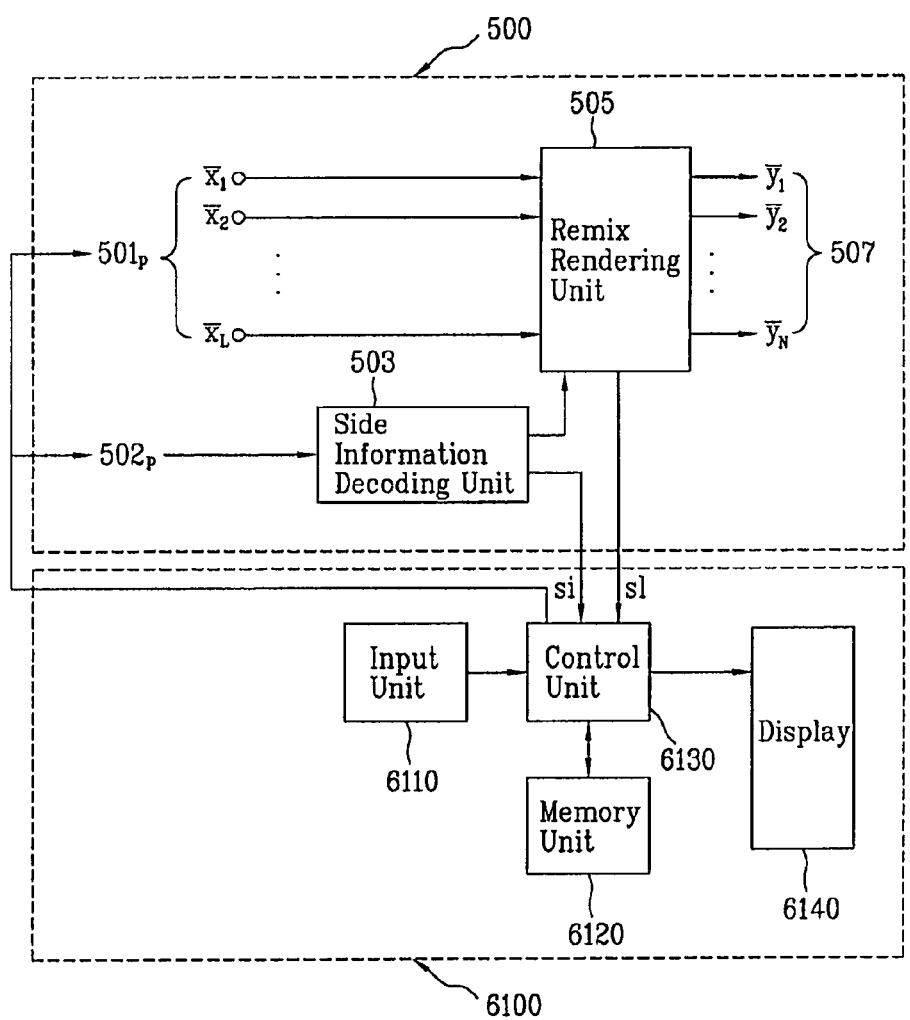
FIG. 40 is a block diagram of an interface displaying apparatus according to a further embodiment of the present invention.

FIG. 40 is a block diagram of an interface displaying apparatus according to a further embodiment of the present invention.

Referring to FIG. 40, an interface displaying apparatus 6100 according to a further embodiment of the present invention includes an input unit 6110, a memory unit 6120, a control unit 6130, and a display 6140 and is interconnected to a first remix signal decoding device 500. In this case, the first remix signal decoding device 500 includes a side information decoding unit 503 and a remix rendering unit 506. And, the first remix signal decoding device 500 has the almost same configuration and function of the former first remix signal decoding device described with reference to FIG. 5, of which details shall be omitted in the following description.

The input unit 6110 is an input device to input a playback command for a mix signal. And, the input unit 6110 can be implemented with a direction key, a touch-wheel or the like as well as a pointing device such as a mouse, a trackball, a touchpad, and the like.

The memory unit 6120 is a storage device in which an image per a source signal is stored. For instance, a per-instrument image (piano image, violin image, flute image, etc.) and a per-player picture (Chung Myung-Hoon picture, Cho Soo-Mee picture, etc.) can be stored in the memory unit 6120.

The control unit 6130 controls a shape of an image of a source signal to be displayed in a manner of being changed per a time as a level of the source signal corresponding to a mix signal changes per a time. In this case, the image can include a per-source signal image inquired from the memory unit 6120 based on source signal information (si) received from the side information encoding unit 503 or the remix rendering unit 505 of the first remix signal decoding device 500. And, the per-time level of the source signal may be extracted from source signal level information (sl) received from the remix rendering unit 505 of the first remix signal decoding device 500.

For instance, in case that a total playtime corresponds to 3 minutes and 45 seconds, each level of source signals (piano, violin, flute) is detected every second from a play start time (t=0 minute and 0 second) to a play completion time (t=3 minutes and 45 seconds and a shape (size, color, brightness, position within an image, etc.) of the corresponding image (piano image, violin image, flute image) is then displayed by being varied. In case that a level of a piano (violin or the like) at a specific timing point is high, it is able to increase a size of a piano image (violin image or the like). In case that a level of a piano (violin or the like) at a specific timing point is high, it is able to raise a brightness of a piano image (violin image or the like).

And, the display 6140 is a display device on which an image corresponding to a source signal is displayed.

Figure 41:
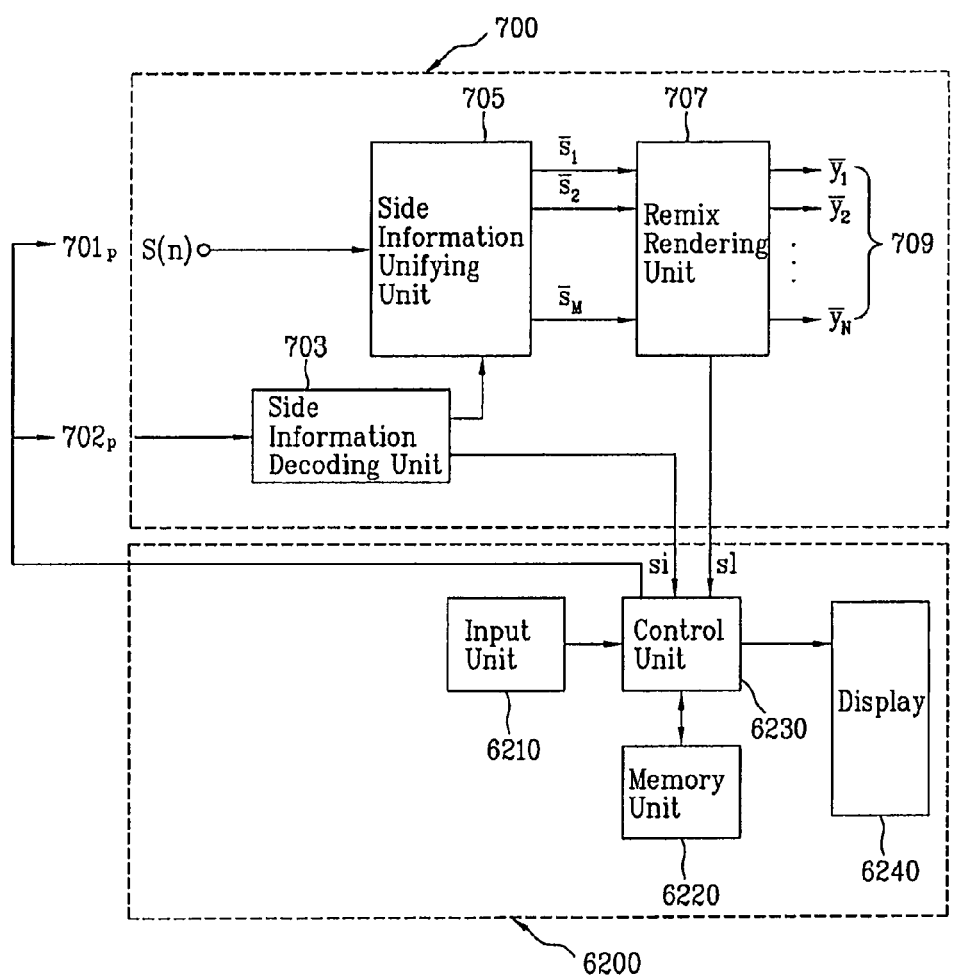
FIG. 41 is a block diagram of an interface displaying apparatus according to another further embodiment of the present invention.

FIG. 41 is a block diagram of an interface displaying apparatus according to another further embodiment of the present invention.

Referring to FIG. 41, an interface displaying apparatus 6200 according to another further embodiment of the present invention includes an input unit 6210, a memory unit 6220, a control unit 6230, and a display 6240 and is interconnected to a second remix signal decoding device 700. In this case, the second remix signal decoding device 700 includes a side information decoding unit 703, a side information unifying unit 705, and a remix rendering unit 707. And, the second remix signal decoding device 700 has the almost same configuration and function of the former second remix signal decoding device described with reference to FIG. 7, of which details shall be omitted in the following description.

Meanwhile, comparing the interface displaying apparatus 6200 according to another further embodiment of the present invention to the former interface displaying apparatus 6100 according to a further embodiment of the present invention, it differs only in being interconnected to the second remix signal decoding device 700 instead of the first remix signal decoding device 500 and in that a synthetic object signal 701 is inputted instead of the mix signal 501. Its respective elements are almost identical to the elements of the former interface displaying apparatus 6100 according to a further embodiment of the present invention, of which details shall be omitted in the following description.

Figure 42:
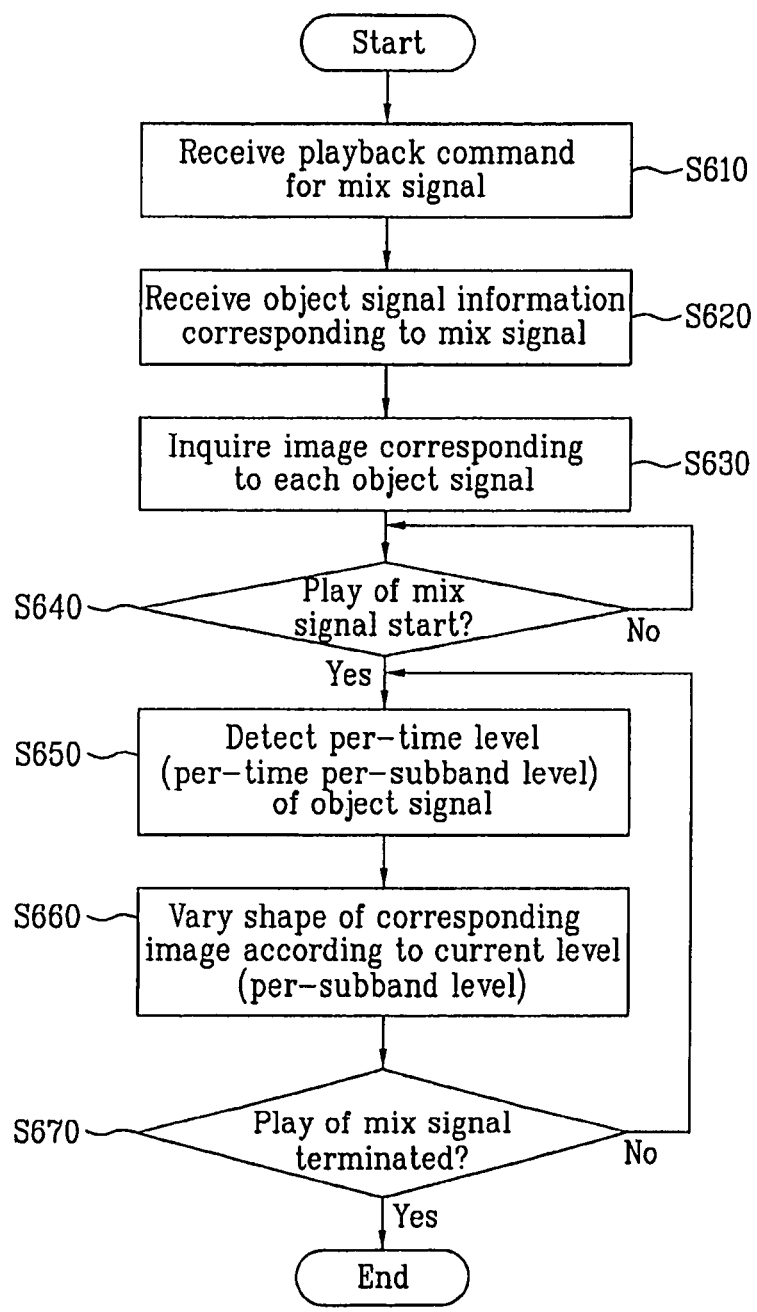
FIG. 42 is a flowchart of an interface displaying method according to another embodiment of the present invention.

FIG. 42 is a flowchart of an interface displaying method according to another embodiment of the present invention. First of all, a terminology 'mix signal' used in the following description should be understood as including a concept of a synthetic object signal. And, an interface displaying method according to one embodiment of the present invention can be carried out by the interface displaying apparatus 6100 according to a further embodiment of the present invention or the other interface displaying apparatus 6200 according to another further embodiment of the present invention.

Referring to FIG. 42, if a user input a playback command for a specific mix signal using an input device, an interface displaying apparatus receives the inputted command [S610]. Subsequently, the interface displaying apparatus receives source signal information corresponding to the mix signal [S620]. The interface displaying apparatus then inquires an image corresponding to each source signal based on the source signal information received in the step S620 [S630].

Figure 43:
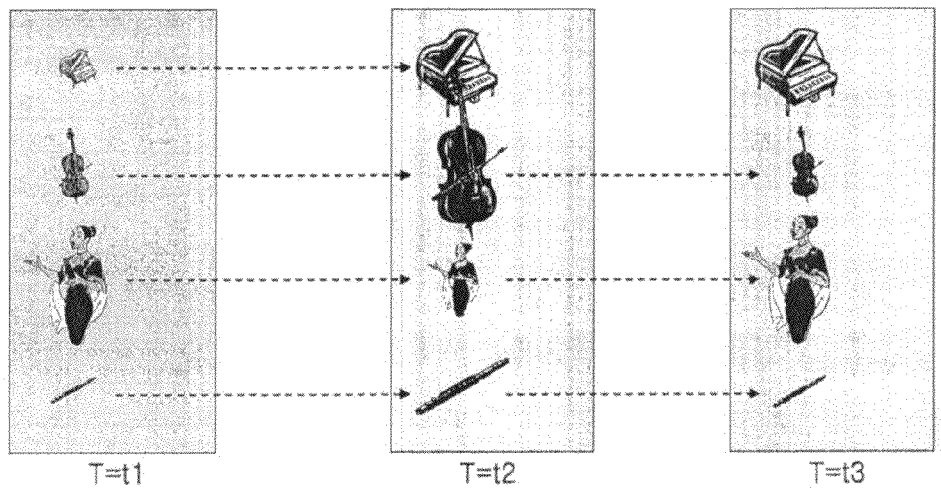
FIG. 43 is an exemplary diagram of a screen on which a size of an image varies in proportion to a level of a source signal.
Figure 44:
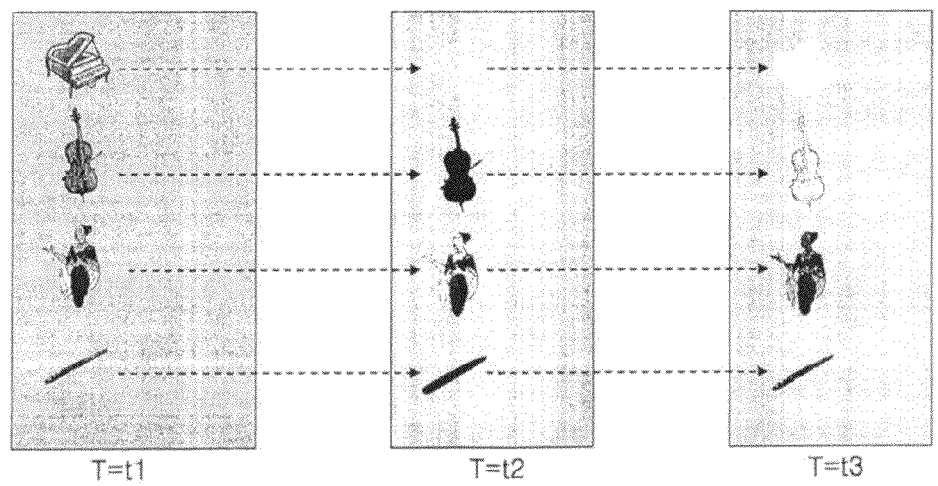
FIG. 44 is an exemplary diagram of a screen on which a brightness of an image varies in proportion to a level of a source signal.

Subsequently, if a playback of the mix signal starts ('yes' in a step S640), the interface displaying apparatus detects a level of a source signal (or a per-subband level) of a source signal corresponding to the mix signal per a time [S650]. Subsequently, in accordance with the level (per-subband level) inquired in the step S640, the interface displaying apparatus varies and displays a shape (size, color, brightness, position within a screen, etc.) of the image inquired in the step S630 [S660]. FIG. 43 is an exemplary diagram of a screen on which a size of an image varies in proportion to a level of a source signal. Looking into a size of an image per an object in FIG. 43, if a current play time is 't1', it can be observed that each level of musical instruments (piano, violin, flute) except a female vocalist is low, while a level of the female vocalist is high. If a current play time is 't2', it can be observed that a level of the female vocalist is lower than those of the rest of the musical instruments only. If a current play time is 't3', it can be observed that levels of the female vocalist and the piano are high only. FIG. 44 is an exemplary diagram of a screen on which a brightness of an image varies in proportion to a level of a source signal. Referring to FIG. 44, at a timing point that a current time is t1, t2, or t3, it can be observed that a brightness of an image per an object varies in accordance with each variation of a level of a source signal.

Figure 45:
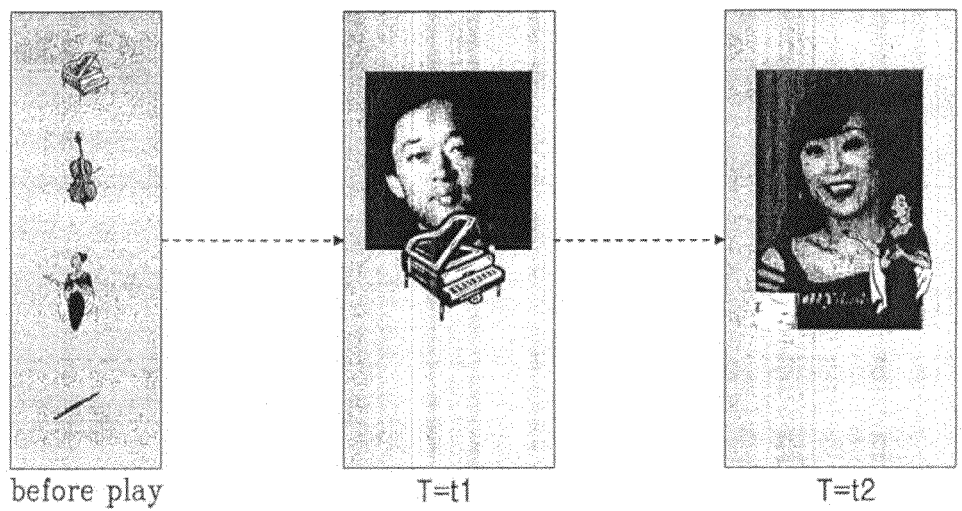
FIG. 45 and FIG. 46 are exemplary diagrams of a screen on which an image having a highest level in a source signal is displayed only.
Figure 46:
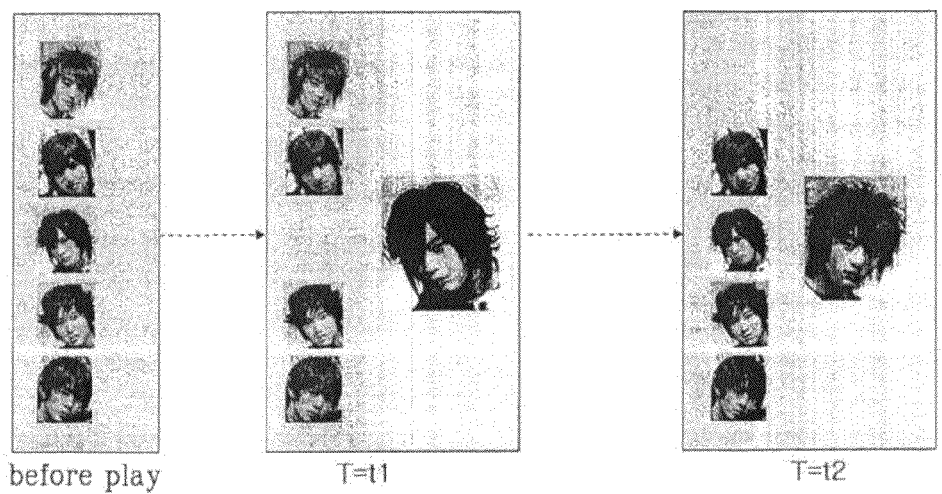

Meanwhile, it is able to vary a size of an image corresponding to a source signal in accordance with a variation of a level of the source signal. In particular, an image of a source signal having a highest level at a specific timing point is displayed only and images of the rest of the source signals are not displayed by setting their sizes to zero. FIG. 45 and FIG. 46 are exemplary diagrams of a screen on which an image having a highest level in a source signal is displayed only. Referring to FIG. 45, when a play time is t1 after a play start, a level of piano is highest among total four source signals. Hence, it can be observed that images of other source signals (violin, vocalist, flute) disappear and that a piano image (picture of a pianist Chung Myung-Hoon) is displayed on a screen only. When a play time is t2, a level of vocalist (female) is highest among total four source signals. Hence, it can be observed that a vocalist (female) image (picture of a vocalist Cho Soo-Mee) is displayed on a screen only. Referring to FIG. 46, when a play time is t1 after a play start, it can be observed that a third image of a singer at a highest level is placed in the middle. When a play time is t2, it can be observed that a first image of a singer at a highest level is placed in the middle.

In case that an image is varied in accordance with a per-subband level of a source signal, it is able to partially vary a shape of the image of the source signal. For instance, by making a horizontal axis of an image correspond to a frequency axis of a source signal and also making a vertical axis of the source signal correspond to a level axis, if a level of a low-frequency band is high and if a level of a high-frequency band is high, a left part of the image is represented as thin while a right part of the image is represented as thick. The above-explained steps S650 and S660 continue until the playback of the mix signal is terminated [S670].

A user is able to be provided with remix information by a sever for providing the remix information (hereinafter named a remix information providing server). The remix information providing sever is able to provide a mix signal modified in a manner of excluding some source signals from a mix signal including a plurality of source signals. In particular, assuming that a mix signal includes a plurality of source signals, the remix information providing server may provide a modified mix signal from which at least one of the source signals constructing the mix signal is excluded. Hereinafter, a mix signal generated from excluding some source signals from a plurality of source signals included in an original mix signal is named a modified mix signal to be discriminated from the original mix signal. In case that a remix information providing server provides a modified mix signal, a user is able to receive and listen to the modified signal prior to receiving a mix signal. After the user has listened to the modified mix signal, if the user attempts to listen to an original mix signal from which any source signal is excluded, it is able to make a request for a transmission of the original mix signal having the entire source signals included therein to the remix information providing server.

A remix information providing server may provide free remix information to a user or may provide partial or whole remix information with a charge to a user. In case that a remix information providing server provides remix information with a charge to a user, the user pays the charge for the remix information and then received the corresponding remix information. A remix information providing server is able to provide a user with a free modified mix signal or an original mix signal with a charge. A method, in which a user receives a modified mix signal generated from excluding some source signal(s) from a mix signal from a remix information providing server and then uses the received modified mix signal, and a method, in which payment is made if a remix information providing server provides remix information with a charge, are explained with reference to FIGS. 47 to 52 as follows.

Figure 47:
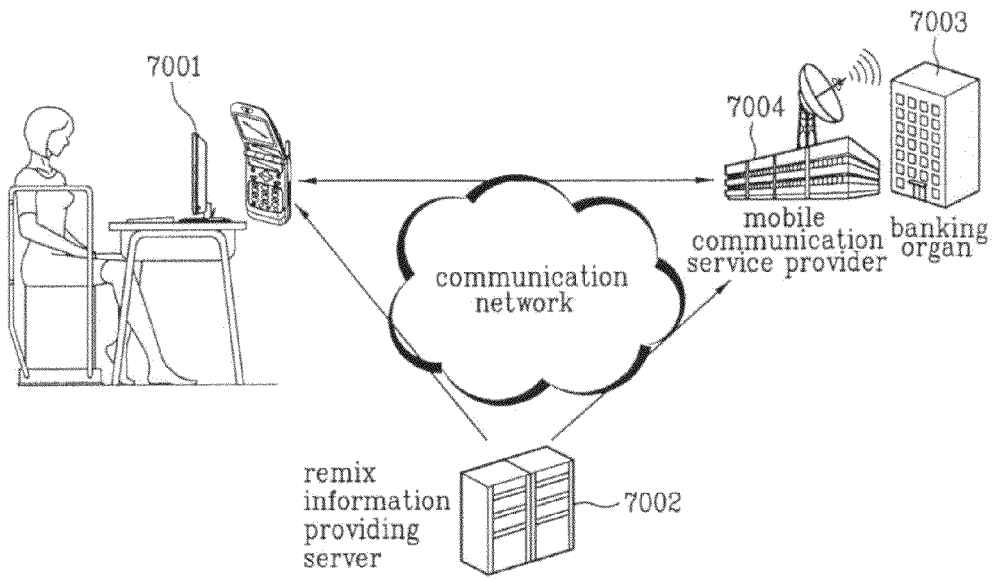
FIG. 47 is a diagram of a remix information providing system according to an embodiment of the present invention.

FIG. 47 is a diagram of a remix information providing system according to an embodiment of the present invention.

Referring to FIG. 47, a remix information providing system includes a user terminal 7001, a remix information providing server 7002, a banking organ 7003, and a mobile communication service provider 7004.

A user needs a mix signal or a source signal and side information on the source signal to remix a source signal. The side information includes an encoder-mix parameter generated by an encoding device, a blind-mix parameter generated by a decoding device, a user-mix parameter generated using control information inputted by a user, and the like.

A user is able to adjust a source signal included in a remixed mix signal by adjusting an icon representing each source signal via a user interface (not shown in the drawing) or the like included in the user terminal 7001. A user is able to vary a size or position of a source signal, a feature of sound, and the like in a manner of adjusting an icon representing a source signal. An icon is able to include an emoticon representing human feeling, a picture or caricature of a singer or an instrument player, a picture or drawing of a musical instrument, and the like. In the following description, a set of information, which is necessary to remix a mix signal per a source signal, including a mix signal, a source signal of each sound source, a mix parameter to control a mix signal per a source signal, an upmix parameter to upmix a mix signal, an icon for representing a source signal, and the like is named remix information.

A user accesses the remix information providing server 7002 using the user terminal 7001. In this case, the user terminal 7001 includes such a device, which is capable of performing wire/wireless communication with another user terminal and also capable of generating a mix signal, as a user PC (laptop, desktop, etc.), a mobile terminal (mobile phone, etc.), PDA (personal digital assistants), PMP (portable multimedia player), and the like.

The user terminal 7001 selects specific remix information from the remix information providing server 7002. The remix information providing server 7002 searches a database (not shown in the drawing) for the remix information selected by the user and then extracts the searched remix information. The remix information providing server 7002 transmits the extracted remix information to the user terminal.

The remix information providing server 7001 is able to provide a modified mix signal generated from excluding a predetermined source signal from source signals included within a specific section of a mix signal or included in a mix signal. For instance, if a user attempts to listen to a piano trio 'Memory of Great Artist', which was composed by Tchaikovsky using piano, violin and cello, the user is able to listen to a modified mix signal thereof prior to listening to a mix signal thereof. In case that the user makes a request for the modified mix signal of the piano trio 'Memory of Great Artist' to the remix information providing server 7002, the remix information providing server 7002 extracts the modified mix signal named 'Memory of Great Artist' having a cello signal excluded therefrom from the database and then transmits the extracted modified mix signal to the user. In case that the modified mix signal for 'Memory of Great Artist' is not stored in the database, the remix information providing server is able to modify a mix signal into various forms by excluding a prescribed source signal (i.e., piano signal, violin signal, cello signal) included in the mix signal.

The remix information providing server 7002 is able to generate a modified mix signal in a manner of excluding a specific source signal from source signals included in a mix signal randomly or in accordance with a request made by a user. If a user makes a request for generating a modified mix signal by excluding a piano signal from source signals included in a mix signal, the remix information providing server generates a modified mix signal including violin and cello signals only and then transmits the generated signal to the user.

The user receives the modified mix signal from the remix information providing server 7002 and then listens to the received modified mix signal. Having listened to the modified mix signal, if the user attempts to listen to a mix signal, the user makes a request for transmission of a mix signal of 'Memory of Great Artist' to the remix information providing server 7002. The user is able to listen to the modified mix signal or the mix signal received from the remix information providing server 7002 using the user terminal 7001. The user is able to use a mix signal as a call sound or a bell sound of the user terminal 7001 such as a mobile terminal. And, the user is able to use a mix signal or the like as a background music of a homepage or the like. And, the user is also able to generate a remixed mix signal in a manner of adjusting a mix signal per a source signal by receiving side information on a mix signal or a modified mix signal from the remix information providing server 7002.

In some cases, the remix information providing server 7002 is able to provide whole or partial remix information with a charge. The remix information may provide server 7002 provides basic remix information free of charge and may provide other remix information with a charge. In case that remix information use is charged for, the remix information providing server 7002 makes a request for payment to a user. For payment processing, the remix information providing server 7002 can make a request for authentication information to the user terminal 7001 to check whether the user is an authorized user. In response to the request made by the remix information providing server 7002, the user inputs user information for authentication to the user terminal 7001. The remix information providing server 7002 is able to authenticate whether the user is the authorized user or not by receiving the user-inputted user information from the user terminal 7001.

In case that a user attempts to settle remix information use payment using a credit card, the remix information providing server 7002 makes a request for confirmation of a presence or non-presence of user authorization by transmitting the user information to the banking organ 700 such as a credit card company, a bank, and the like. The banking organ 7003 checks whether the user is an authorized user having subscribed in the banking organ and then transmits a corresponding result to the remix information providing server 7002.

Then, the remix information providing server 7002 makes a request for payment of a remix information use fee to the banking organ 7003. If so, the banking organ 7003 withdraws the remix information use fee from an account of the user and then notifies the remix information providing server 7002 that the payment has been made. The banking organ 7003 transfers the withdrawn remix information use fee to an account of the remix information providing server 7002 by real time or periodically. In case that the user wants to make payment of the remix information use fee by account transfer, the banking organ 7003 notifies the remix information providing server 7002 that the user has paid the remix information use fee on the account of the remix information providing server 7002. Having received the notification of the payment completion from the banking organ 7003, the remix information providing server 7002 extracts the remix information having been selected by the user and then transmits the extracted remix information to the user terminal 7001.

The user terminal 7001 is provided with the remix information by the remix information providing server 7002 and may listen to it as it is. Yet, the user terminal 7001 is able to use the remix information in a manner that the user modifies the remix information. In this case, the user terminal 7001 can include a signal decoding device for processing remixing.

The user receives a source signal and a mix signal together with or separate from side information and is then able to remix the source signal using the user terminal 7001. In case that the user terminal 7001 receives a mix signal from the remix information providing server 7002 only, the user terminal 7001 generates side information on the mix signal in direct and is then able to adjust the mix signal per a source signal using the generated side information. The user generates a remixed mix signal by adjusting the mix signal by adjusting the mix signal per a source signal and is then able to upload the remixed mix signal to the remix information providing server 7002. And, the user generates an icon for representing a source signal or modifies an icon received from the remix information providing server 7002 and is then able to upload the generated or modified icon to the remix information providing server 7002. In this case, remix information includes the remixed mix signal uploaded by the user, the icon generated/modified and uploaded by the user, and the like.

The remix information providing server 7002 stores the remixed mix signal, which is uploaded by the user using the user terminal 7001, in a database (not shown in the drawing). If a second user different from the former user makes a request for a transmission of the remixed mix signal, the remix information providing server 7002 is able to transmit the remixed mix signal to a second user terminal free or with a charge. The remix information providing server 7002, the former user having uploaded the remixed mix signal, the icon or the like to the remix information providing server 7002, and the second user attempting to use the remixed signal, the icon or the like can mutually make pay the remix information use fee in accordance with preset agreements. In case of transmitting the remixed mix signal to the second user with a charge, the remix information providing server 7002 cam make a request for payment to the second user by the above-mentioned method. And, the remix information providing server 7002 may pay a predetermined portion of the remix information use fee having been paid by the second user to the former user having uploaded the remixed mix signal, the icon or the like to the remix information providing server 7002.

A user may pay a remix information use fee using the user terminal 7001 such as a mobile phone and the like. If the user input a number of the user terminal such as a mobile phone and the like to the remix information providing server 7002, the remix information providing server 7002 transmits the number of the user terminal 7001 of the user to the mobile communication service provider 7004 and makes a request for an authentication number for user authentication. In response to the request made by the remix information providing server 7002, the mobile communication service provider 7004 transmits the authentication number to both of the remix information providing server 7002 and the user terminal 7001. The user inputs the received authentication number to the remix information providing server 7002. If the authentication number inputted by the user matches the authentication number received from the mobile communication service provider 7004, the remix information providing server 7002 decides that the user is an authorized user. In case of deciding that the user is authorized, the remix information providing server 7002 makes a request for a payment of a remix information use fee to the mobile communication service provider 7004. If so, the mobile communication service provider 7004 adds the remix information use fee to a normal use fee of the user terminal 7001. If the payment for the remix information use fee is made, the mobile communication service provider 7004 notifies the remix information providing server 7002 that the payment has been made. Having received the notification of the payment completion, the remix information providing server 7002 transmits the remix information having been selected by the user to the user terminal 7001.

Subsequently, the user generates a remixed mix signal using the received remix information. The user is able to a unique mix signal by adjusting a size, position, tone or the like of a source signal using the user terminal 7001. The user is able to upload the remixed mix signal to the remix information providing server 7002 using the user terminal 7001. As mentioned in the foregoing description, a second user downloads remixed mix signals, which have been uploaded by other users to the remix information providing server 7002, and is then able to use the downloaded remixed mix signals.

Figure 48:
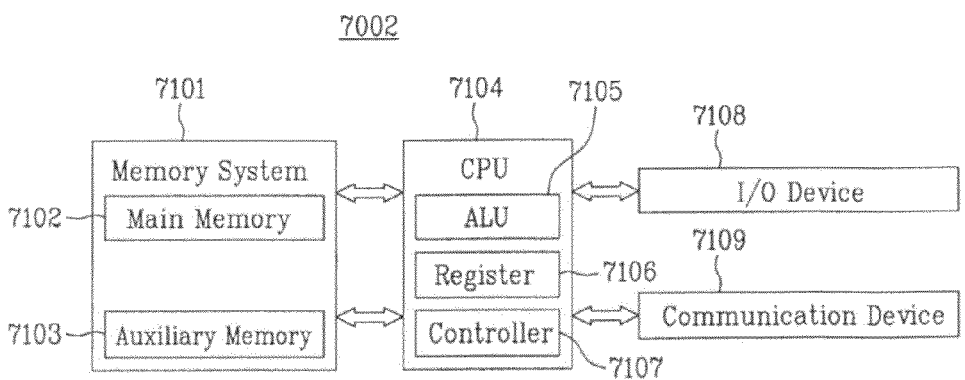
FIG. 48 is a block diagram of a remix information providing server according to an embodiment of the present invention.

FIG. 48 is a block diagram of a remix information providing server according to an embodiment of the present invention.

Referring to FIG. 48, a remix information providing server 7002 includes a memory system 7001, a central processing unit (CPU) 7104, an input/output device 7108, and a communication device 7109. The central processing unit 7104 includes an arithmetic logic unit (ALU) 7105 for performing calculation, a register for temporary storage of data and commands, and a controller 7107 for controlling an operation of the remix information providing server 7002. The memory system 7001 includes a high-speed main memory 7102 having a storage medium configuration such as a random access memory (RAM) and a read-only memory (ROM), an auxiliary memory having a long-term storage medium configuration such as a floppy disc, a hard disc, a tape, a CD-ROM, a flash memory, and the like, and a device for storing data using other electric, magnetic or optical storage medium. The main memory 7102 can include a video display memory for displaying remix information such as a list of mix signals or modified mix signals, icons, and the like via a display device. The input/output device 7108 includes a keyboard, a mouse, and a physical transducer such as a touchscreen and a microphone, and the like. And, the communication device 7109 may include a network interface for performing wire/wireless communication with a user terminal 7001 or a device such as an RF transceiving antenna.

Figure 49:
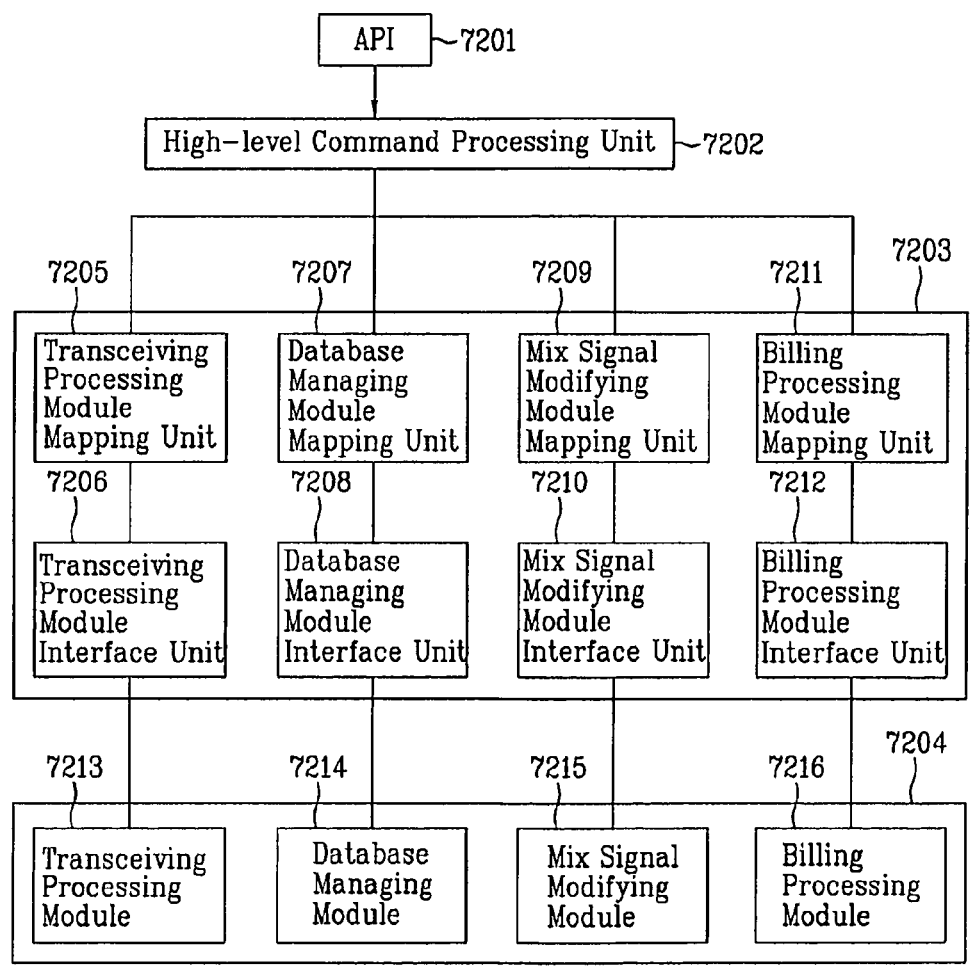
FIG. 49 is a block diagram of modules of a remix information providing server according to an embodiment of the present invention.

FIG. 49 is a block diagram of modules of a remix information providing server according to an embodiment of the present invention.

Referring to FIG. 49, a remix information providing server 7002 includes a transceiving processing module 7213 for processing communication between a user terminal 7001, a banking organ 7003 and a mobile communication service provider 7004, a database managing module 7214 storing and managing remixing information including a mix signal, a modified mix signal and the like, a mix signal modifying module 7215 generating the modified mix signal, and a billing processing module 7216 authenticating whether a user is authorized in case that the remix information is charged for, the billing processing module 7216 processing a payment.

An overall configuration of the remix information providing server is explained through the above application modules as follows.

First of all, the remix information providing server is able to use various operating systems (hereinafter abbreviated OS) as a system OS. The OS controls operations of the respective application modules 7206 by providing high-level commands to an application program interface (hereinafter abbreviated API) 7201. The remix information providing server includes a high-level command processing unit 7202 identifying each of the application modules 7204 in accordance with a corresponding one of the high-level commands provided by the API 7201, the high-level command processing unit 7202 decoding the corresponding high-level command, the high-level command processing unit 7202 providing the decoded command to a corresponding place. An application module control unit 7203 controls an operation of the application module 7204 in accordance with the command provided by the high-level command processing unit 7202. In particular, the high-level command processing unit 7202 identifies whether there exists the application module 7204 corresponding to the high-level command provided via the API 7201. If there exists the application module 7204 corresponding to the high-level command provided via the API 7201, the high-level command processing unit 7202 decodes the provided command into a command recognizable by the corresponding application module 7204 and then transmits the decoded command to a corresponding mapping unit or controls a message transmission.

Hence, the application module control unit 7203 includes mapping units 7205, 7207, 7209 and 7211 for the transceiving processing module 7213, the database managing module 7214, the mix signal modifying module 7215, and the billing processing module 7216, respectively and interface units 7206, 7208, 7210 and 7212 for the transceiving processing module 7213, the database managing module 7214, the mix signal modifying module 7215, and the billing processing module 7216, respectively.

The transceiving processing module mapping unit 7205 is provided with a high-level command for performing communication with the user terminal 7202, the banking organ 7003 or the mobile communication service provider 7004 by the high-level command processing unit 7202, maps the provided command to a device level that can be processed by the transceiving processing module 7213, and then provides the mapped command to the transceiving processing module 7213 via the transceiving processing module interface unit 7206.

The database managing module mapping unit and the database managing module interface unit 7208 store a mix signal or a modified mix signal and then extracts the stored signal in case of receiving a mix signal request or a modified mix signal request from the user terminal 7001. The data base managing module mapping unit 7207 is provided with a high-level command for using the database managing module 7214 by the high-level command processing unit 7202, maps the provided command to a command at a device level, and then provides the mapped command to the database managing module 7214 via the database managing module interface unit 7208.

The mix signal modifying module 7215 generates a modified mix signal by excluding a predetermined source signal included in a mix signal in case that the mix signal needs to be modified for a case that the modified mix signal is requested from a user and the like. The mix signal modifying module mapping unit 709 is provided with a high-level command applied via the high-level command processing unit 7202 and then maps the provided command to a command at a device level recognizable by the mix signal modifying module 7215. The device-level command is provided to the mix signal modifying module 7215 via the mix signal modifying module interface unit 7210.

The billing processing module 7216 checks whether a user is an authorized user. If the user is the authorized user, the billing processing module 7216 imposes a remix information use fee. In case that a second user wants to use a remixed mix signal generated and uploaded by another user, the billing processing module 7216 processes the remix information use fee between the remix information providing server 7002, the user having uploaded the remixed mix signal, and the second user. The billing processing module mapping unit 7211 is provided with a high-level command applied via the high-level command processing unit 7202 and then maps the provided command to a command at a device level recognizable by the billing processing module interface unit 7216. The device-level command is provided to the billing processing module 7216 via the billing processing module interface unit 7212.

Figure 50:
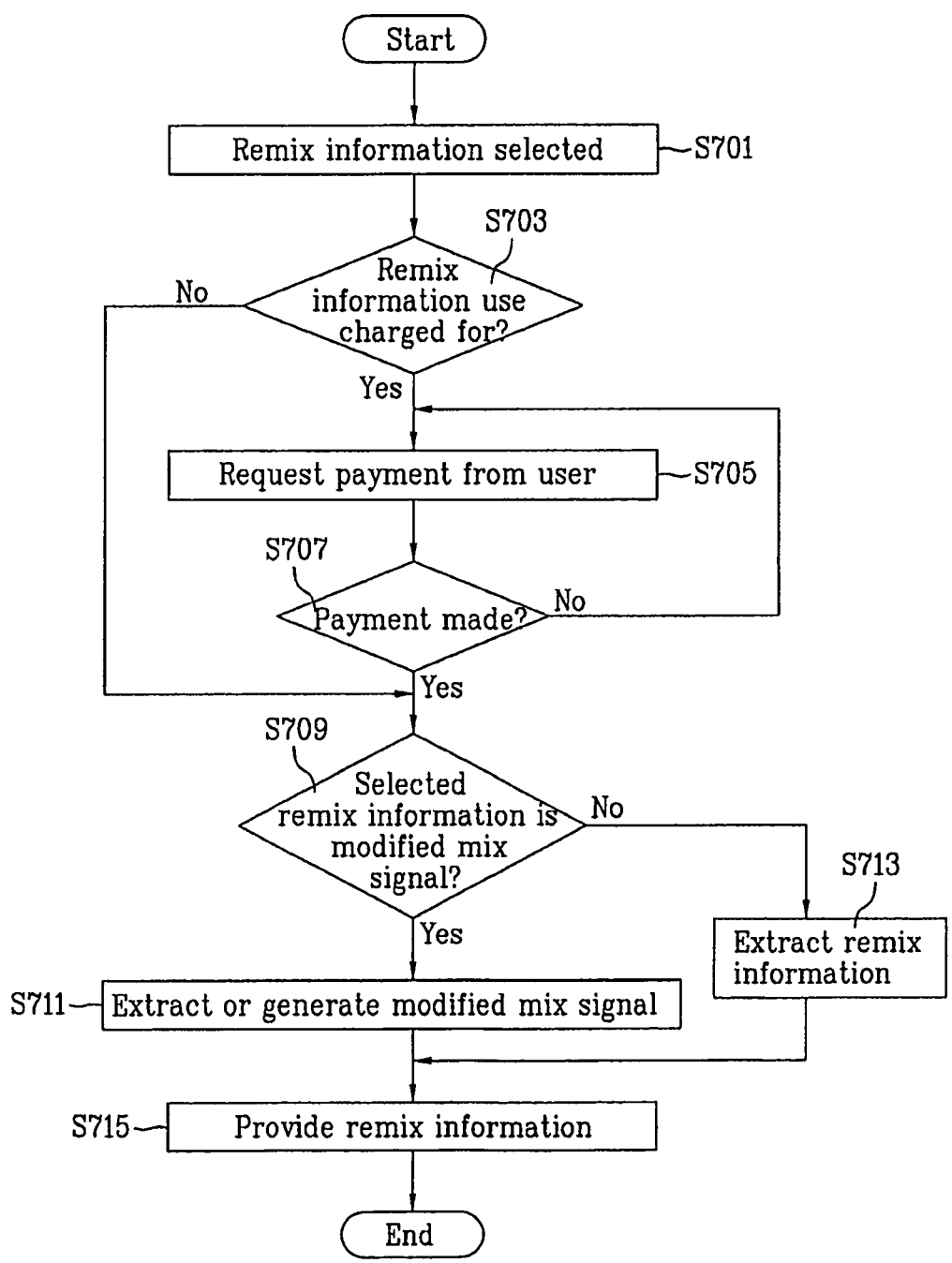
FIG. 50 is a flowchart of a method of providing remix information from a remix information providing server according to an embodiment of the present invention.

FIG. 50 is a flowchart for a method of providing remix information from a remix information providing server according to an embodiment of the present invention.

Referring to FIG. 50, a user accesses a remix information providing server 7002 using a user terminal 7001. The remix information providing server 7002 has remix information selected by the user terminal 7001 [S701]. The remix information providing server 7002 may transmit the user-selected remix information to the user terminal 7001 free of charge. And, the remix information providing server 7002 can transmit the user-selected remix information to the user terminal 7001 with a charge as well. The remix information providing server 7002 decides whether the user-selected remix information is free or charged for [S703]. If the user-selected remix information is charged for, the remix information providing server 7002 makes a request for payment to the user [S705]. For the payment, the remix information providing server 7002 is able to perform user authentication to confirm whether the user is an authorized user or not. The remix information providing server 7002 is able to make a request for inputting user authentication information for the user authentication such as a credit card number, an account number, a social security number, a password (personal identification number), and the like to the user terminal 7001. If the user inputs the user authentication information using the user terminal 7001, the remix information providing server 7002 transmits the user-inputted user authentication information to the banking organ 7003, the mobile communication service provider 7004 or the like and then makes a request for confirming whether the user is authorized or not.

The banking organ 7003 or the mobile communication service provider 7004 searches a database (not shown in the drawing) for the user authentication information transmitted by the remix information providing server 7002 and then notifies a corresponding result to the remix information providing server 7002.

If the user is decided as authorized, the remix information providing server 7002 transmits payment information to the banking organ 7003 or the mobile communication service provider 7004 and makes a request for making payment. The remix information providing server 7002 may include a mix signal modifying unit (not shown in the drawing). If the payment is made ('yes' in the step S707), the remix information providing server 7002 decides whether the user-selected remix information is a modified mix signal generated from excluding a prescribed source signal [S709]. If the user-specific remix information is a modified mix signal, the remix information providing server 7002 modifies a mix signal using the mix signal modifying unit or extracts a previously-stored modified signal [S711]. The remix information providing server 7002 provides the modified mix signal to the user terminal 7001 [S715]. If the user-selected remix information is not a modified mix signal, the remix information providing server 7002 extracts previously-stored remix information [S713]. And, the remix information providing server 7002 provides the extracted remix information to the user terminal 7001 [S715].

Figure 51:
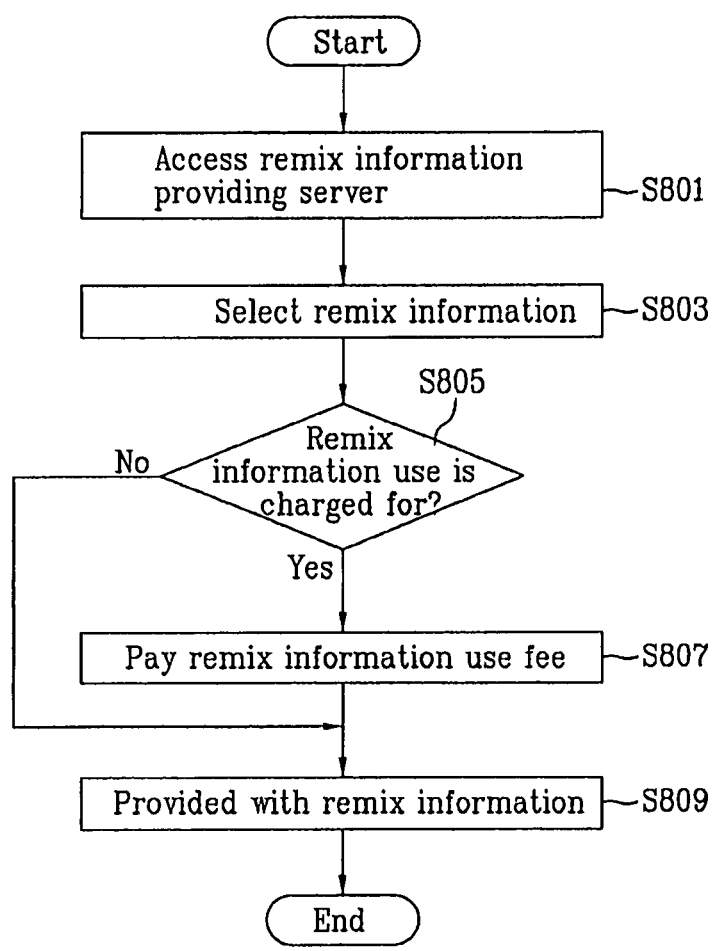
FIG. 51 is a flowchart of a method of providing remix information to a user terminal according to an embodiment of the present invention.

FIG. 51 is a flowchart for a method of providing remix information to a user terminal according to an embodiment of the present invention.

Referring to FIG. 51, a user accesses a remix information providing server 7002 using a user terminal 7001 [S801]. The user selects specific information from remix information provided by the remix information providing server 7002 using the user terminal 7001 [S803]. As mentioned in the foregoing description, the remix information includes a mix signal, a modified mix signal, a source signal, side information, an icon representing the source signal, and an emoticon. And, the remix information includes remix information and the like having been uploaded to the remix information providing server 7002 by other users. The user terminal 7001 decides whether the user-selected remix information is charged for [S805]. If the user-selected remix information is charged for, the user pays a remix information use fee [S807]. In this case, the remix information use fee may vary in accordance with a type or size of remix information, a bit rate or the like. For instance, in case that a user attempts to receive a specific source signal only, the user may pay a use fee less than that for a case of receiving a mix signal including the specific source signal. In case that a user receives side information on a mix signal or side information on a source signal not included in the mix signal, an amount to be paid by the user may vary. After completion of payment, the user receives the remix information from the remix information providing server 7002 [S809].

Figure 52:
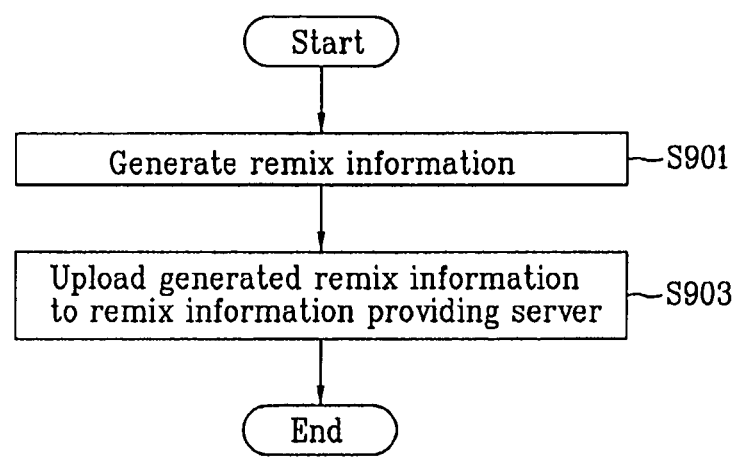
FIG. 52 is a flowchart for a method of transferring remix information to a remix providing server from a user according to an embodiment of the present invention.

FIG. 52 is a flowchart for a method of transferring remix information to a remix providing server from a user according to an embodiment of the present invention.

Referring to FIG. 52, a user receives remix information using a user terminal 7001. The remix information can be transmitted by an encoding device such as a remix information providing server 7002 and the like. The user terminal 7001 can include a remix rendering unit (not shown in the drawing) that remixes a source signal included in a mix signal using the remix information and control information. In case that the user terminal 7001 includes the remix rendering unit, the user is able to directly generate remix information using a mix signal, a source signal and side information for the same using the user terminal 7001. And, the user is able to generate new remix information by modifying remix information stored in the user terminal 7001 using the remix rendering unit as well [S901]. In particular, the user is able to generate a mix signal remixed by adjusting a size, position, tone and/or the like of a source signal using remix information possessed by the user. Moreover, the user is able to modify an icon or emoticon representing a source signal or is able to directly generate an icon and/or the like. The user transmits to upload the generated remix information to the remix information providing server 7002 [S903]. The remix information providing server 7002 stores the new remix information uploaded by the user in a database. If a second user wants the stored remix information, the remix information providing server 7002 extracts the wanted remix information from the database and then transmits the extracted remix information to a second user terminal.

INDUSTRIAL APPLICABILITY

Accordingly, the present invention is applicable to an input device of a media signal player, a remote controller and the like. And, the present invention is applicable to an interface controller of a media signal player and the like. Moreover, the present invention is applicable to a media signal information providing server and the like.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. An inputting apparatus, comprising:
an input unit;
a side information decoding unit configured to obtain side information from a side information signal corresponding to a mix signal, the side information including gain factors of at least two source signals in the mix signal;
a control unit configured to
convert an input signal received via the input unit into a per-source menu display command,
receive the side information from the side information decoding unit, and
control a per-source menu display image to be outputted based on the side information when the per-source menu display command is generated; and,
a display for outputting the per-source menu display image,
wherein the mix signal is one or more channel signals,
wherein the side information includes information regarding the at least two source signals, and
wherein the per-source menu display image comprises a list of the at least two source signals.

2. The inputting apparatus of claim 1, further comprising:
a pointing device or a direction key,
wherein the control unit converts input signal received via the pointing device or the direction key to a per-source level adjust command.

3. The inputting apparatus of claim 1, wherein the control unit is configured to generate a control information based on an input signal via the per-source menu display image, the control information being usable to control a gain of the at least two source signals.

4. The inputting apparatus of claim 3, further comprising:
a remix rendering unit configured to
receive the control information,
generate a remix parameter based on the side information and the control information, and
generate a multi channel audio signal based on the remix parameter.

5. The inputting apparatus of claim 3, wherein the control unit is configured to
convert the input signal via the per-source menu display image into a voice mute command or a voice level adjust command, and
output the control information based on the voice mute command or the voice level adjust command.

6. The inputting apparatus of claim 1, further comprising:
a wireless communication unit configured to transmit the command converted by the control unit to an external device.

7. An inputting apparatus, comprising:
an input unit;
a side information decoding unit configured to obtain side information from a side information signal corresponding to a mix signal, the side information including gain factors of at least two source signals in the mix signal;
a control unit configured to
convert an input signal received via the input unit into an ambience image display command,
receive the side information from the side information decoding unit, and
control an ambience image to be outputted based on the side information when the ambience image display command is generated; and
a display to which the ambience image is outputted,
wherein the mix signal is one or more channel signals,
wherein the side information includes information regarding the at least two source signals, and
wherein the at least two source signals are displayed in a list via a source menu display.

8. The inputting apparatus of claim 5, further comprising:
a pointing device or a direction key,
wherein the control unit converts an input signal received via the pointing device or the direction key to an ambience adjust command and then outputs a control information on the mix signal based on the ambience adjust command.

* * * * *